United States Patent
Pejsa et al.

(10) Patent No.: US 12,354,204 B2
(45) Date of Patent: *Jul. 8, 2025

(54) AUDIOVISUAL PRESENCE TRANSITIONS IN A COLLABORATIVE REALITY ENVIRONMENT

(71) Applicant: Magic Leap, Inc., Plantation, FL (US)

(72) Inventors: Tomislav Pejsa, Sunnyvale, CA (US); Koichi Mori, San Jose, CA (US); Richard St. Clair Bailey, Plantation, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/651,314

(22) Filed: Apr. 30, 2024

(65) Prior Publication Data

US 2024/0282038 A1  Aug. 22, 2024

Related U.S. Application Data

(63) Continuation of application No. 17/308,897, filed on May 5, 2021, now Pat. No. 12,014,455.

(60) Provisional application No. 63/020,781, filed on May 6, 2020.

(51) Int. Cl.
  *G06T 13/80* (2011.01)
  *G06T 19/00* (2011.01)

(52) U.S. Cl.
  CPC ............ *G06T 13/80* (2013.01); *G06T 19/006* (2013.01)

(58) Field of Classification Search
  CPC ....... G06T 19/006; G06T 13/80; G06F 3/011; G06F 2203/012; G06F 3/012
  See application file for complete search history.

(56) References Cited

U.S. PATENT DOCUMENTS

| | | |
|---|---|---|
| 10,917,613 B1 | 2/2021 | Chiarella et al. |
| 10,984,607 B1 | 4/2021 | Wang et al. |
| 2010/0081508 A1 | 4/2010 | Bhogal et al. |
| 2011/0055727 A1 | 3/2011 | Dawson et al. |
| 2018/0005429 A1 | 1/2018 | Osman et al. |
| 2019/0356999 A1 | 11/2019 | Raghuvanshi et al. |
| 2020/0051336 A1 | 2/2020 | Ichikawa et al. |
| 2021/0116776 A1 | 4/2021 | Jiang et al. |
| 2021/0135895 A1 | 5/2021 | Cheung |
| 2021/0290319 A1* | 9/2021 | Poltaretskyi ............ G06T 11/00 |
| 2021/0304515 A1* | 9/2021 | Hutten .................... G06T 13/40 |

* cited by examiner

*Primary Examiner* — Phi Hoang
(74) *Attorney, Agent, or Firm* — Fish & Richardson P.C.

(57) ABSTRACT

Examples of systems and methods to facilitate audiovisual presence transitions of virtual objects such as virtual avatars in a mixed reality collaborative environment are disclosed. The systems and methods may be configured to produce different audiovisual presence transitions such as appearance, disappearance and reappearance of the virtual avatars. The virtual avatar audiovisual transitions may be further indicated by various visual and sound effects of the virtual avatars. The transitions may occur based on various colocation or decolocation scenarios.

40 Claims, 35 Drawing Sheets

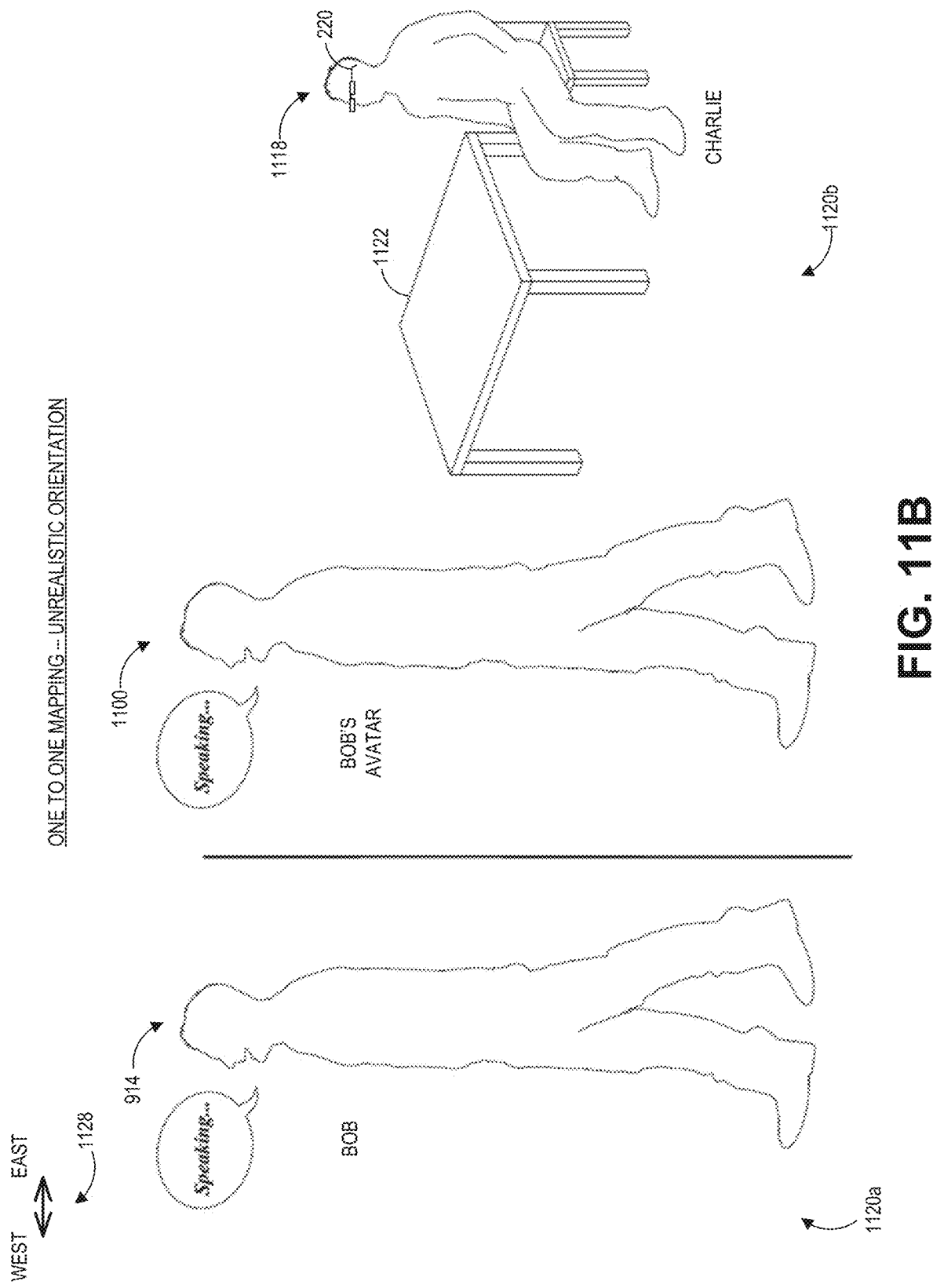

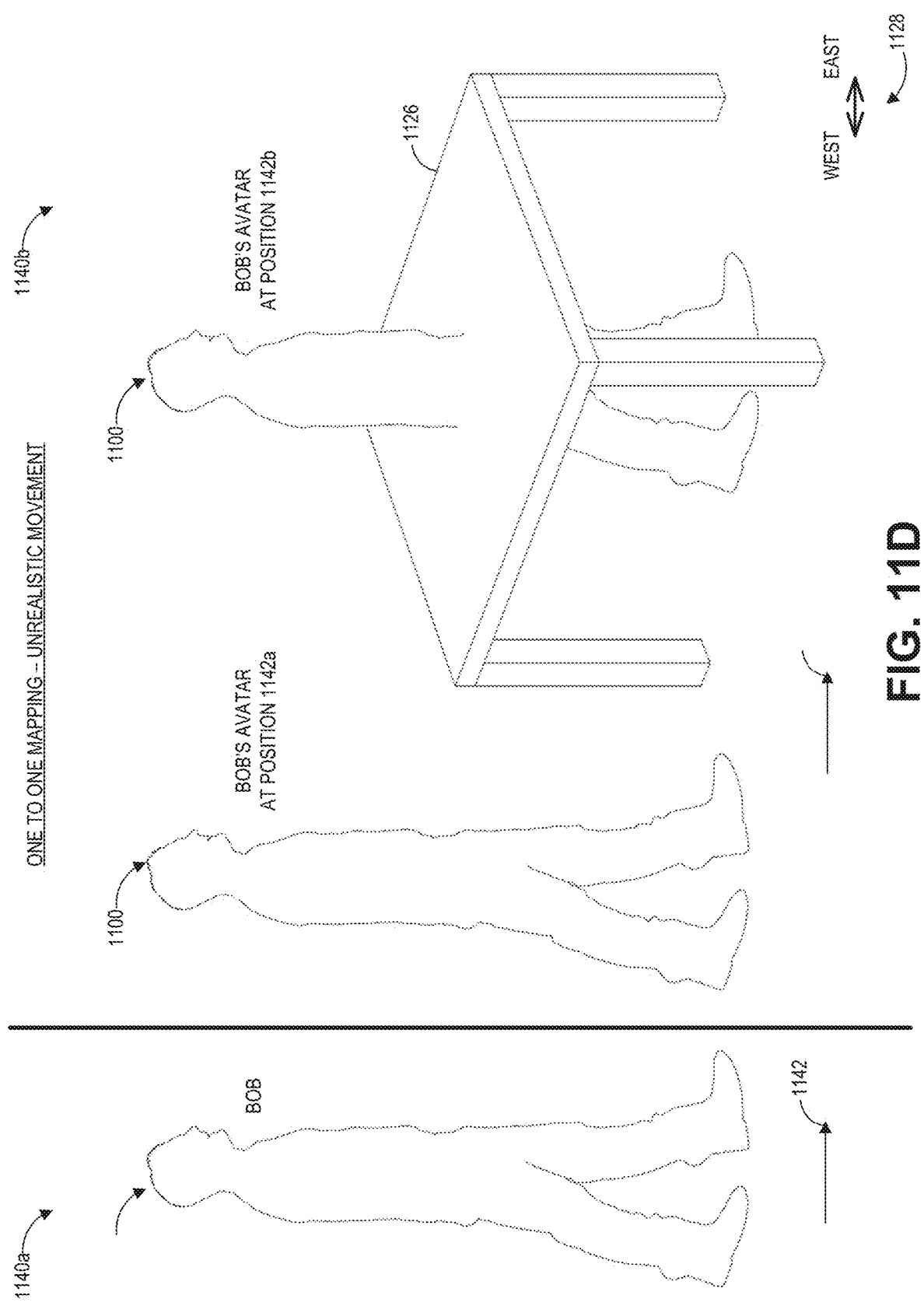

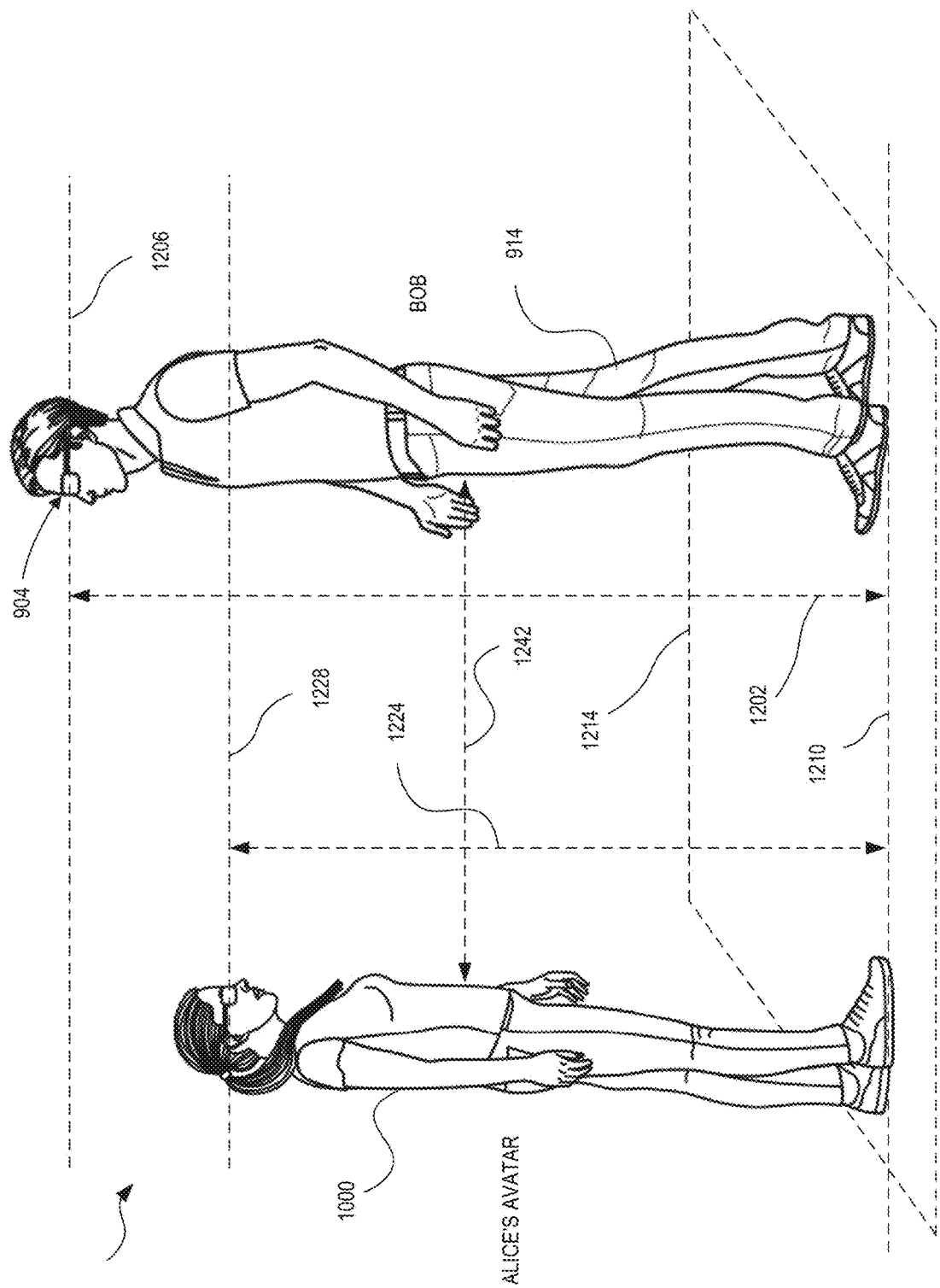

AUDIOVISUAL PRESENCE TRANSITIONS IN A COLLABORATIVE REALITY ENVIRONMENT

CROSS-REFERENCE TO RELATED APPLICATIONS

This application is a continuation of U.S. patent application Ser. No. 17/308,897, filed May 5, 2021, which claims the benefit of priority under 35 U.S.C. § 119 (e) to U.S. Provisional Application No. 63/020,781, filed on May 6, 2020, the disclosures of which are hereby incorporated herein by reference in their entirety.

TECHNICAL FIELD

The present disclosure relates to systems and methods to facilitate audiovisual presence transitions of virtual objects in a virtual, augmented, or mixed reality collaborative environment.

BACKGROUND

Modern computing and display technologies have facilitated the development of systems for so called "virtual reality", "augmented reality", or "mixed reality" sessions, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario involves presentation of digital or virtual image information as an augmentation to visualization of the actual world around the user; a mixed reality, or "MR", related to merging real and virtual worlds to produce new environments where physical and virtual objects coexist and interact in real time. As it turns out, the human tactile and visual perception systems are very complex. Producing a VR, AR, or MR technology that facilitates a comfortable, natural-looking, rich presentation and interaction of virtual image elements, such as virtual avatars amongst other virtual or real-world imagery elements, to a user is challenging. Additionally, collaborating with other users in the same VR, AR, or MR session adds to the challenges of such technology. Systems and methods disclosed herein address various challenges related to VR, AR, and MR technology.

SUMMARY

Embodiments of the present disclosure are directed to systems and methods for facilitating audiovisual presence transitions in physically copresent, avatar-mediated, collaboration in a virtual, augmented or mixed reality environment. As one example embodiment, one or more input devices (e.g., controllers) paired with a head-mounted display system may be used by a user to view, interact, and collaborate in a VR, AR, or MR session with one or more other users. Such sessions may include virtual elements such as virtual avatars (e.g., a graphical representation of a character, person, and/or user) and objects (e.g., a graphical representation of a table, chair, painting, and/or other object) in a three-dimensional space. The disclosed technology introduces mechanisms for disabling and enabling audiovisual presence of virtual objects, such as virtual avatars representing users, to other users in the mixed reality session. In general, any discussion herein of transition effects with reference to virtual avatars, such as enabling or disabling audiovisual presence of the virtual avatars, may also be applied to any other virtual object. The disabling and enabling of the audiovisual presence of the virtual avatar occurs during transitions in physical copresence states of the user. The transitions of the user are gracefully signaled to the other users via audiovisual effects as disclosed herein.

Further, examples of systems and methods for rendering a virtual avatar and colocating a virtual avatar to facilitate the audiovisual presence transitions in a mixed reality environment are disclosed. The systems and methods may be configured to automatically scale a virtual avatar or to render a virtual avatar based on a determined intention of a user, an interesting impulse, environmental stimuli, or user saccade points. The disclosed systems and methods may apply discomfort curves when rendering a virtual avatar. The disclosed systems and methods may provide a more realistic natural feeling interaction between a human user and a virtual avatar.

For ease of reading and understanding, certain systems and methods discussed herein refer to a mixed reality environment or other "mixed reality" or "MR" components. These descriptions of mixed reality" or "MR" should be construed to include "augmented reality", "virtual reality," "VR," "AR," and the like, as if each of those "reality environments" were specifically mentioned also.

Details of one or more implementations of the subject matter described in this specification are set forth in the accompanying drawings and the description. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

The following drawings and the associated descriptions are provided to illustrate embodiments of the present disclosure and do not limit the scope of the claims. The relative placement of features and elements may have been modified for the purpose of illustrative clarity. Where practical, the same or similar reference numbers denote the same or similar or equivalent structures, features, aspects, or elements, in accordance with one or more embodiments.

The drawings illustrate the design and utility of various embodiments of the present disclosure. It should be noted that the figures are not necessarily drawn to scale and that elements of similar structures or functions are represented by like reference numerals throughout the figures. Understanding that these drawings depict only example embodiments of the disclosure and are not therefore to be considered limiting of its scope, the disclosure will be described and explained with additional specificity and detail through the use of the accompanying drawings in which:

FIGS. 11A-11D illustrate example scenes of an avatar in various environments, where the avatar has an unnatural appearance or interaction, according to some embodiments.

FIGS. 12A-12B illustrate two scenes of scaling an avatar, where the avatar is spawned on the same surface as the viewer, according to some embodiments.

DETAILED DESCRIPTION

Terms

Figure 1A:
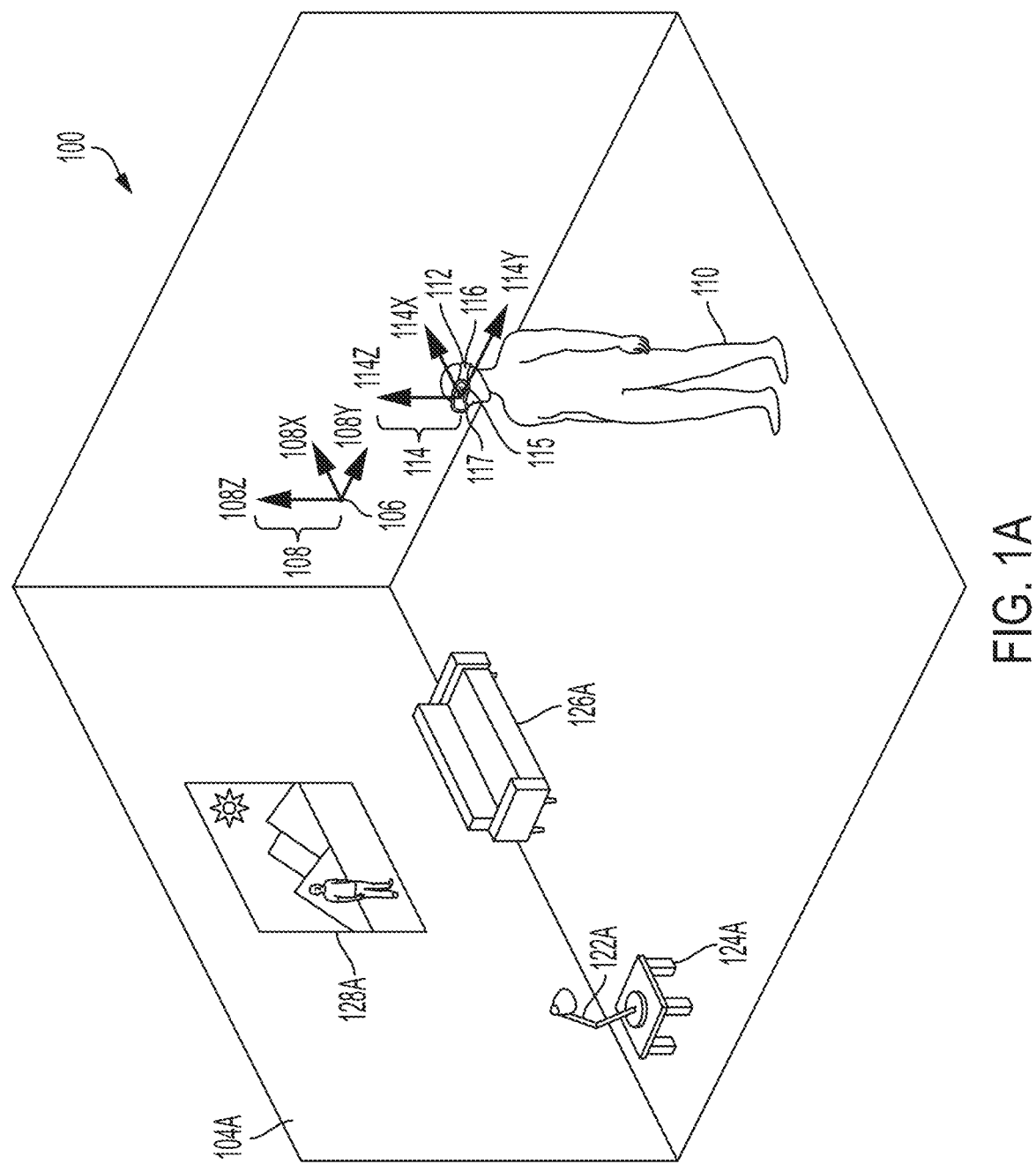
FIGS. 1A-1C illustrates an example mixed reality environment, according to some embodiments.

To facilitate an understanding of the systems and methods discussed herein, several terms are described herein. These terms, as well as other terms used herein, should be construed to include the provided descriptions, the ordinary and customary meanings of the terms, and/or any other implied meaning for the respective terms, wherein such construction is consistent with context of the term. Thus, the descriptions do not limit the meaning of these terms, but only provide example descriptions.

Audiovisual Presence—An audio and/or video representation of an object, such as a digital representation of a user as an animated avatar and voice audio.

Remote Users—Users in a collaborative session who are not physically copresent with one another, meaning they are located in physically remote locations from other users, such as different rooms in a building or different cities or countries, and/or are located a large distance from one another (e.g., on opposite sides of a large conference hall or outdoor area). Remote users may communicate using voice chat and animated avatars.

Copresent (or "Colocated") Users—Users in a collaborative session who are physically copresent, meaning they are in close enough proximity to one another to see and hear each other directly, such as when the users are in the same room and/or within a threshold distance (e.g., 10 meters) of each other.

Colocation—In mixed reality collaboration, colocation refers to the process of adjusting virtual content shared between copresent users so that it appears in the same physical position and orientation for all of them, thereby facilitating communication and collaboration involving that content. In some embodiments, a colocation service determines whether two or more users in a collaborative session are physically copresent, and may then compute and broadcast a shared coordinate frame for virtual content of colocated users.

Relative Spatial Consistency—When remote users collaborate, each can see the avatars of the other users in her or his own physical space, as well as shared virtual content (e.g., documents, drawings, 3D models). The collaboration is said to have relative spatial consistency if the avatars and virtual content have the same spatial relationships in all spaces of the users (e.g., if a first avatar corresponding to a first user is 30 degrees and 2 meters to the right of a second user, then the second avatar corresponding to the second user should be 30 degrees and 2 meters to the left of the first user).

Absolute Spatial Consistency—When physically copresent users collaborate, they often need to share virtual content (e.g., documents, drawings, 3D models). When these objects appear in the same position and orientation in the physical world for all the copresent users, they are said to have absolute spatial consistency.

Presence Transitions—Changes to audiovisual representation(s) of a user (and/or other virtual objects) that occur when the user goes from being remote to being physically copresent with another user, and vice versa. They may involve effects such as muting or unmuting the users' audio and hiding or showing their avatars.

Overview

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

One of the most compelling applications of immersive mixed reality is collaboration, where users can communicate, jointly view/create virtual content (e.g., presentations, drawings, CAD models), play games, or watch videos. In such collaboration, users can be either physically copresent or remote. Remote users may be represented as avatars that are animated using tracking data from hardware sensors via head-mounted MR systems. The users may communicate with each other using microphone audio from the head-mounted MR system.

MR systems (e.g., head-mounted MR systems) may display the virtual and real world content to a user during an MR session. For example, this content may be displayed on a head-mounted display system (e.g., as part of eyewear) that projects image information to the eyes of the user. In addition, in an MR system, the display may also transmit light from the surrounding environment to the eyes of the user, to allow a view of that surrounding environment. As used herein, a "head-mounted" or "head mountable" display system (also referred to as an "HMD") includes a display that may be mounted on the head of a user. Such displays may be understood to form parts of a display system. Further, MR display systems may include one or more user input devices such as a hand-held controller (e.g., a multi-degree of freedom game controller) to interact in the three-dimensional space during an MR session such as described herein.

As MR systems proliferate and achieve more market penetration, demands for MR system capabilities may also increase. While an isolated user of an MR system may expect an MR system to display persistent virtual content (e.g., virtual content that can persist in a location relative to the environment, rather than virtual content that can only persist in a location relative to a display), multiple users of MR systems interacting with each other may have more demanding expectations. For example, multiple users of MR systems that inhabit the same real world space (e.g., same room) may expect to experience the same mixed reality environment. Because users may be inhabiting the same real world environment, users may also expect to inhabit the same virtual environment (both of which may combine to form a mixed reality environment). Specifically, a first user may view a virtual object (e.g., a virtual avatar) in the mixed reality environment of the first user, and the first user may expect that a second user in the same real environment also be able to see the virtual object (e.g., the virtual avatar) in the same location. It can therefore be desirable to colocate virtual content across multiple MR systems.

Virtual object colocation may include placing a virtual object in a mixed reality environment such that it appears in a consistent position relative to the mixed reality environment across more than one MR system. For example, a virtual avatar may be displayed as sitting on a real couch. Virtual object persistence may enable a single MR system to move around the mixed reality environment and continually display the virtual avatar as sitting at the same spot on the real couch. Virtual object colocation may enable two or more MR systems to move around the mixed reality environment while both continually displaying the virtual avatar as resting at the same spot on the real couch. In other words, a goal of virtual object colocation can be to treat virtual objects like real objects (e.g., objects that can be observed by multiple people simultaneously in a manner that is consistent across each person and their positions respective to the object).

When the users are remote (e.g., isolated), the collaborative app achieves relative spatial consistency by computing an origin transform for each user and broadcasting it to all the other users. Upon the receipt of their origin transform, the application instance of the user can position and orient its coordinate frame such that the avatar of the user and shared content are placed consistently across the app instances. In some embodiments, the collaborative application uses a client-server model, where the origin transform can be computed by the server. In some embodiments, the collaborative application uses a peer-to-peer model, where one of the peer instances can be designated as the master or host and compute origin transforms for each user. Computing the origin transform can vary depending on the desired placement. For example, some implementations may compute the origin transform such that users get evenly distributed in the physical space so each user can see each other more easily.

When two or more users are physically copresent (e.g., located in the same physical environment), the users may see each other directly, so there is no need to display their virtual avatars. Nevertheless, the users can still jointly view virtual content (e.g., a video or a drawing), so the collaborative application ensures that the content appears in the same position and orientation in the physical space for all the copresent users. Thus, absolute spatial consistency is achieved via colocation as described herein.

Accordingly, described herein are systems and methods for transitioning audiovisual presence of a user in response to changes in colocation state. When users become colocated or decolocated, the corresponding virtual avatars of the users are hidden or shown and their voice chat muted or unmuted. Moreover, at least one coordinate frame of the user changes upon colocation. Thus, virtual avatars and shared virtual content may also change location as a result. These changes in audiovisual presence are graceful transitions rather than abrupt shifts, as otherwise users may become confused or think the MR system is faulty.

Example Mixed Reality Environment

FIG. 1A illustrates an example real environment 100 in which a user 110 uses a mixed reality system 210. Mixed reality system 210 may be a HMD that includes a display (e.g., a transmissive display), one or more speakers, and one or more sensors (e.g., a camera), for example. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100.

As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 210 was powered on. In some embodiments, the origin point 106 of the environment/world coordinate system 108 may be reset during operation. In some examples, user 110 may be considered a real object in real environment 100; similarly, the body parts (e.g., hands, feet) of user 110 may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 210 is located. The origin point 115 of the user/listener/head coordinate system 114 may be defined relative to one or more components of the mixed reality system 210. For example, the origin point 115 of the user/listener/head coordinate system 114 may be defined relative to the display of the mixed reality system 210 such as during initial calibration of the mixed reality system 210. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the head of the user, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
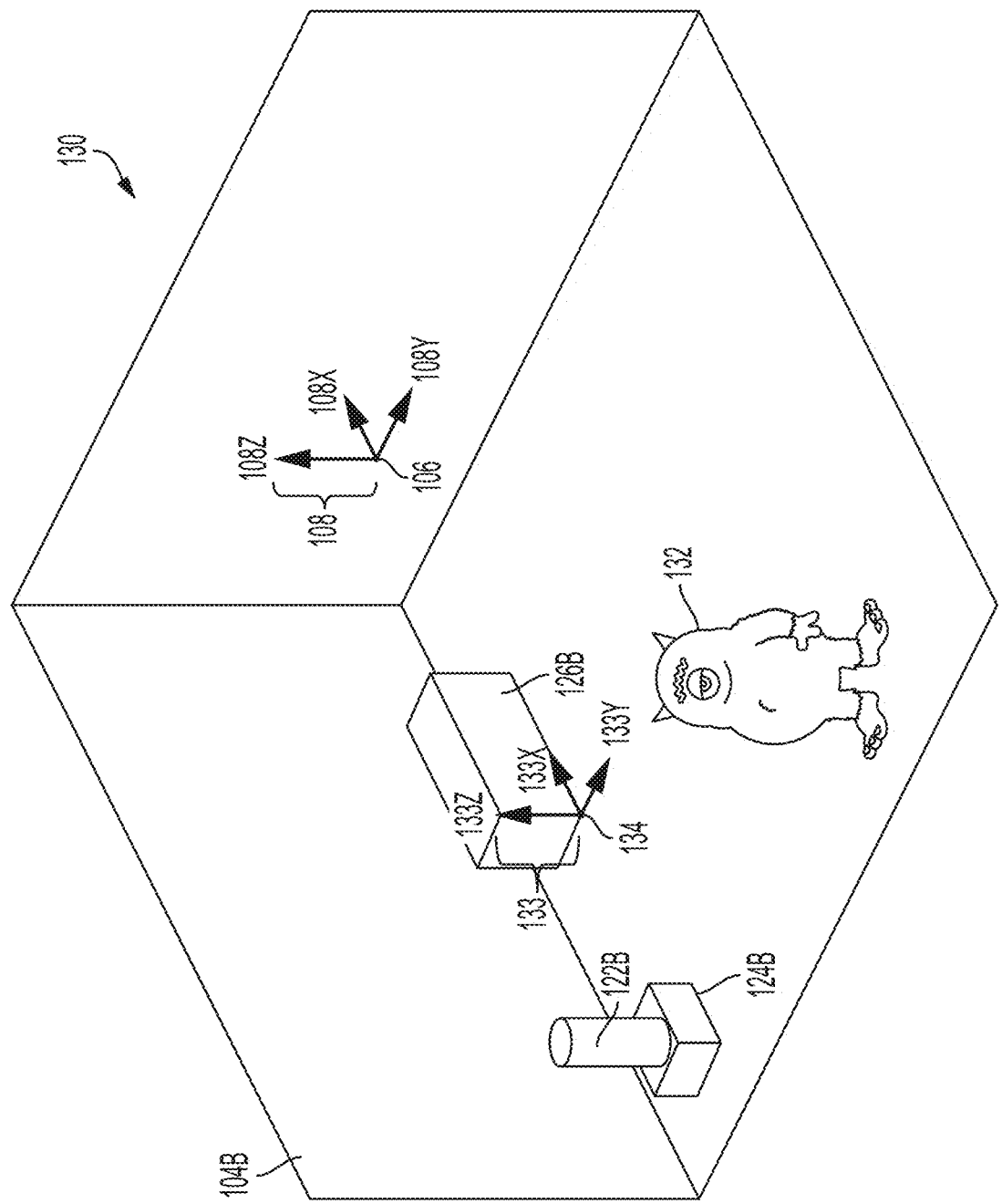

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 210) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. An MR user may look at the corner, see the virtual content, look away from the corner (where the virtual content may no longer be visible), and look back to see the virtual content in the corner (similar to how a real object may behave).

In some embodiments, an instance of persistent coordinate data (e.g., a persistent coordinate system) can include an origin point and three axes. For example, a persistent coordinate system may be assigned to a center of a room by an MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, an MR system may use simultaneous localization and mapping to generate persistent coordinate data (e.g., the MR system may assign a persistent coordinate system to a point in space). In some embodiments, an MR system may map an environment by generating persistent coordinate data at regular intervals (e.g., an MR system may assign persistent coordinate systems in a grid where persistent coordinate systems may be at least within five feet of another persistent coordinate system).

In some embodiments, persistent coordinate data may be generated by an MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, an MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 11B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
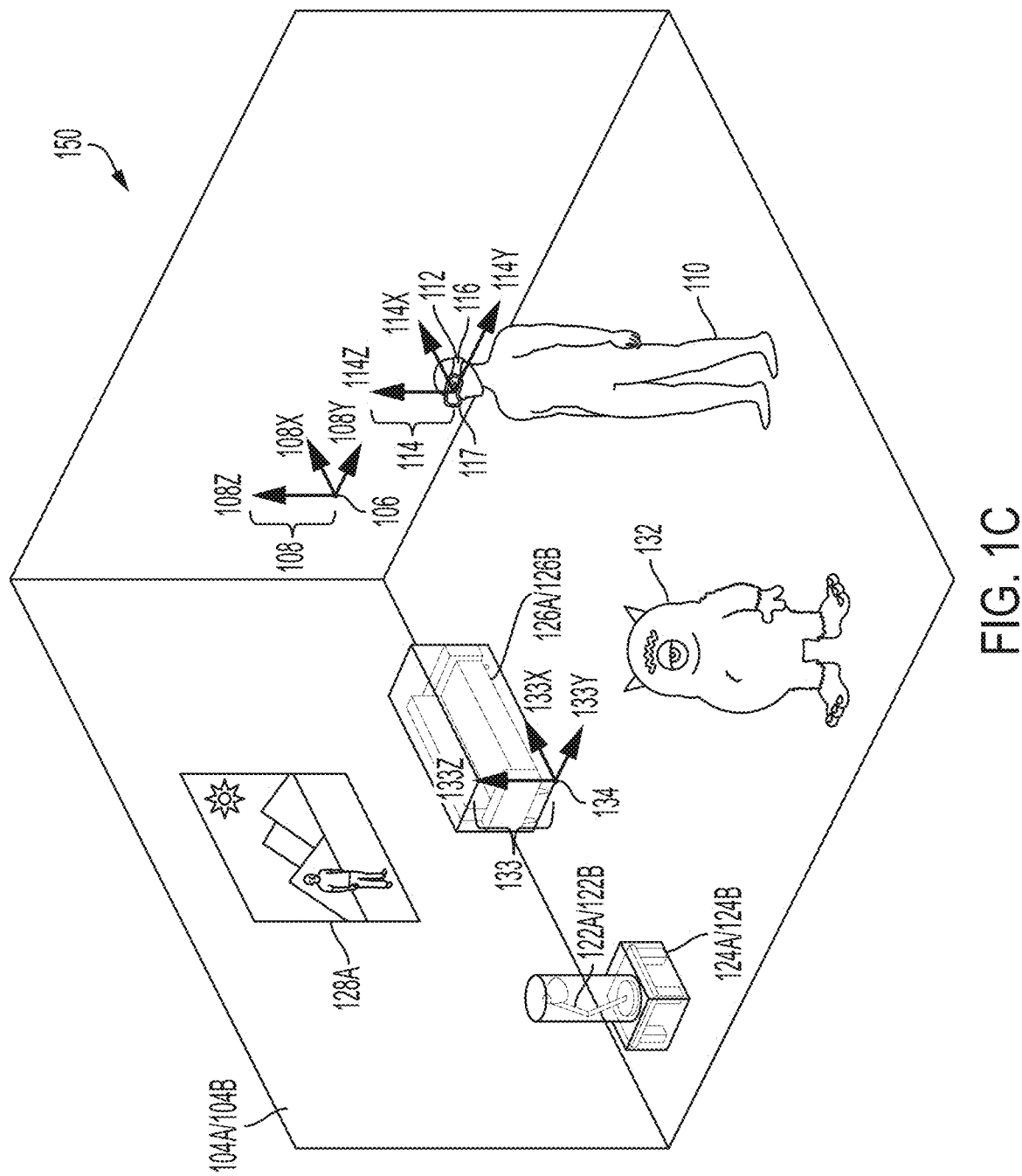

FIG. 1C illustrates an example mixed reality environment (MRE) 150 that simultaneously presents aspects of real environment 100 and virtual environment 130 to user 110 via mixed reality system 210. In the example shown, MRE 150 simultaneously presents user 110 with real objects 122A, 124A, 126A, and 128A from real environment 100 (e.g., via a transmissive portion of a display of mixed reality system 210); and virtual objects 122B, 124B, 126B, and 132 from virtual environment 130 (e.g., via an active display portion of the display of mixed reality system 210). Origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual monster 132 could be associated with one or more audio signals, such as a footstep sound effect that is generated as the monster walks around MRE 150. As described further herein, a processor of mixed reality system 210 can compute an audio signal corresponding to a mixed and processed composite of all such sounds in MRE 150, and present the audio signal to user 110 via one or more speakers included in mixed reality system 210 and/or one or more external speakers. Examples of the mixed reality system 210 and one or more user input devices 220 are further illustrated in FIGS. 2A-C and disclosed further herein.

Example User Input and Display Devices

Figure 2A:
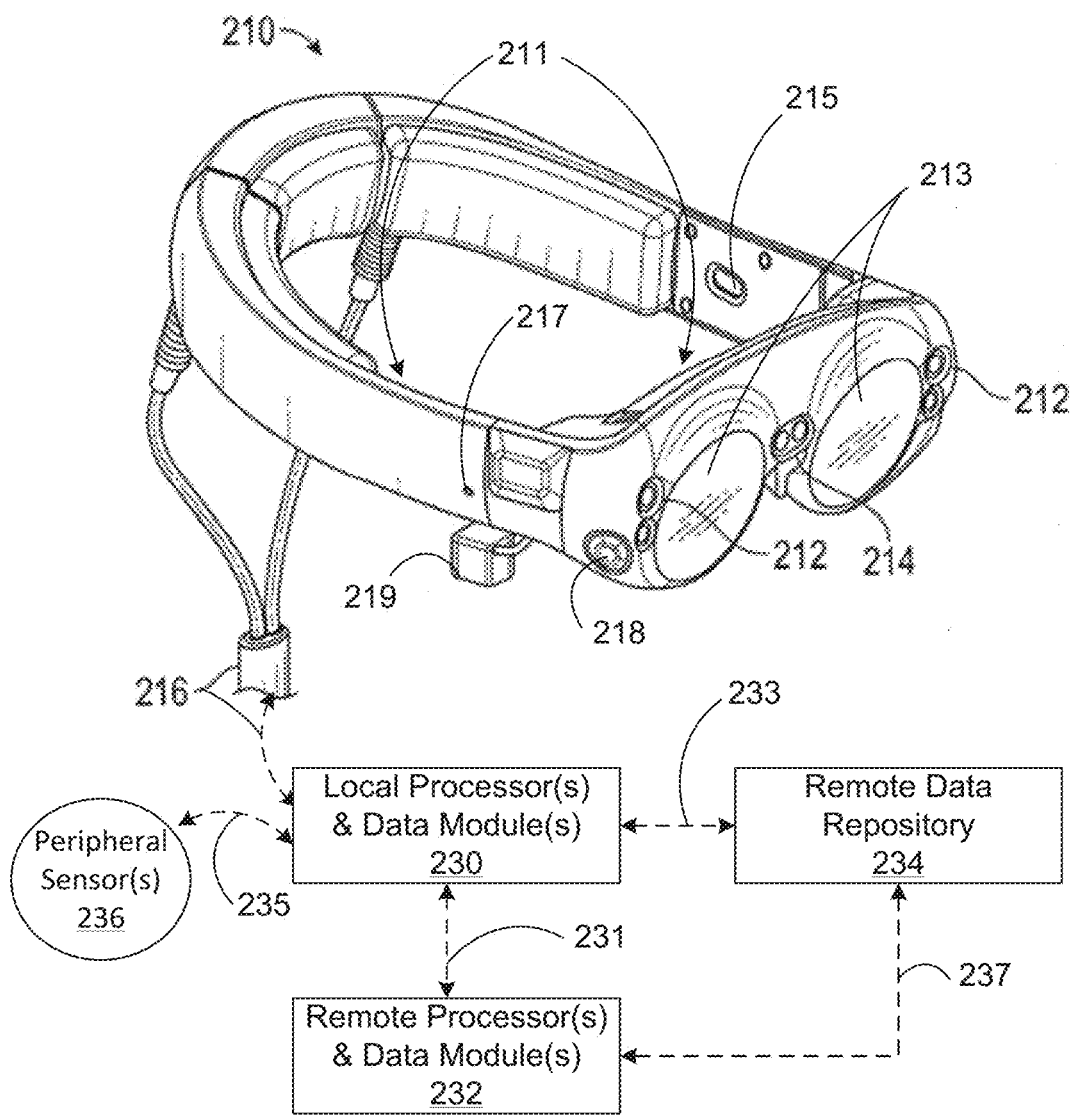
FIG. 2A illustrates an example head-mounted display system that can be used to generate and interact with a mixed reality environment, according to some embodiments.

FIG. 2A illustrates an example head-mounted display system 210 (e.g., head-mounted display MR system) for simulating, generating and interacting with three-dimensional imagery in a mixed reality session. The head-mounted display system 210 may include various integrated waveguides and related systems as disclosed herein. The waveguide assembly may be part of a display 213. In some embodiments, the head-mounted display system 210 may include a stereoscopic display as the display 213.

With continued reference to FIG. 2A, the display 213 is coupled to a frame 211, which is wearable by a viewer and/or user (e.g., the user 110 illustrated in FIG. 1 and avatars 912, 914, 1112, 1114, and 1116 illustrated in FIGS. 9B, 11A-D, and 12A-B) and which is configured to position the display 213 in front of the eyes of the user. The display 213 may be considered eyewear in some embodiments. In some embodiments, a speaker 215 is coupled to the frame 211 and configured to be positioned near the ear of the user. In some embodiments, another speaker, may optionally be positioned near the other ear of the user to provide stereo/shapeable sound control. The head-mounted display system 210 may also include one or more microphones 217 or other devices to detect sound. In some embodiments, the microphones 217 are configured to allow the user to provide inputs or commands to the system 210 (e.g., the selection of voice menu commands, natural language questions, etc.), and/or may allow audio communication with other persons (e.g., with other users of similar MR display systems). The microphone may further be configured as a peripheral sensor to collect audio data (e.g., sounds from the user and/or environment). In some embodiments, the head-mounted display system 210 includes one or more peripheral sensors 236, which may be separate from the frame 211 and attached to the body of the user (e.g., on the head, torso, an extremity, etc. of the user). The peripheral sensors 236 may be configured to acquire data characterizing a physiological state of the user in some embodiments (e.g., the sensor 236 may be electrodes, inertial measurement units, accelerometers, compasses, GPS units, radio devices, gyros, and/or other sensors disclosed herein).

With continued reference to FIG. 2A, the head-mounted display system 210 is operatively coupled by communications link 216, such as by a wired or wireless connectivity, to a local data processing module 230 which may be mounted in a variety of configurations, such as fixedly attached to the frame 211, fixedly attached to a helmet or hat worn by the user, embedded in headphones, or otherwise removable attached to the user (e.g., in a backpack-style configuration, in a belt-coupling style configuration). In some embodiments, the head-mounted display system 210 includes and/or is in communication with the local data processors and data modules 230. Thus, functions described herein with reference to the head-mounted display system 210 may be partially or fully performed by the local data processing module 230. Similarly, the sensor 236 may be operatively coupled by communications link 235 (e.g., a wired or wireless connectivity) to the local processor and data module 230. The local processor and data module 230 may comprise a hardware processor, as well as digital memory, such as non-volatile memory (e.g., flash memory or hard disk drives), both of which may be utilized to assist in the processing, caching, and storage of data. Optionally, the local processor and data module 230 may include one or more central processing units (CPUs), graphics processing units (GPUs), dedicated processing hardware, among other processing hardware. The data may include data a) captured from sensors (which may be operatively coupled to the frame 211 or otherwise attached to the user), such as image capture devices (e.g., cameras 212, 214, 218), microphones (e.g., microphone 217), inertial measurement units, accelerometers, compasses, GPS units, radio devices, gyros, and/or other sensors disclosed herein; and/or b) acquired and/or processed using remote processor and data module 232 and/or remote data repository 234 (including data relating to virtual content), possibly for passage to the display 213 after such processing or retrieval. The local processor and data module 230 may be operatively coupled by communication links 231, 233, 237 such as via a wired or wireless communication links, to the remote processor and data module 232 and remote data repository 234 such that these remote modules 232, 234 are operatively coupled to each other and available as resources to the local processor and data module 230. In some embodiments, the local processor and data module 230 may include one or more of the image capture devices, microphones, inertial measurement units, accelerometers, compasses, GPS units, radio devices, and/or gyros. In some other embodiments, one or more of these sensors may be attached to the frame 211, or may be standalone structures that communicate with the local processor and data module 230 by wired or wireless communication pathways.

With continued reference to FIG. 2A, in some embodiments, the remote processor and data module 232 may comprise one or more processors configured to analyze and process data and/or image information, for instance including one or more central processing units (CPUs), graphics processing units (GPUs), dedicated processing hardware, and so on. In some embodiments, the remote data repository 234 may comprise a digital data storage facility, which may be available through the internet or other networking configuration in a "cloud" resource configuration. In some embodiments, the remote data repository 234 may include one or more remote servers, which provide information, (e.g., information for generating mixed reality content) to the local processor and data module 230 and/or the remote processor and data module 232. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, local processor and data module 230, remote processor and data module 232, and remote data repository 234, for instance via wireless or wired connections.

Figure 2B:
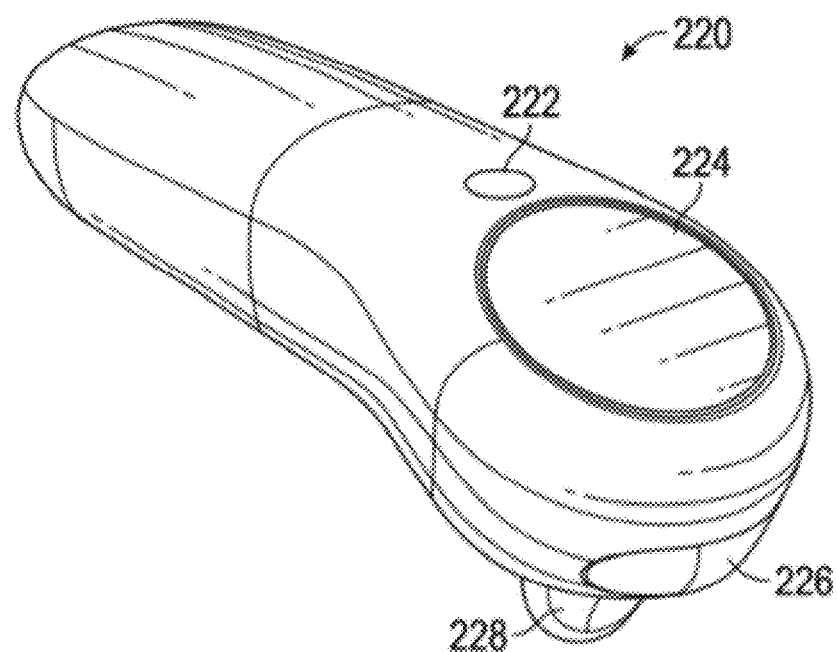
FIG. 2B illustrates an example user input device for providing input to a mixed reality environment, according to some embodiments.

FIG. 2B illustrates an example user input device 220 (e.g., a hand-held controller) for interacting in a mixed reality session. The user inputs may be received through controller buttons or input regions on the user input device 220. In particular, FIG. 2B illustrates that a controller 220, which may be a part of the head-mounted display system 210 illustrated in FIG. 2A and which may include a home button 222, trigger 228, bumper 226, and touchpad 224. Further, in some embodiments the controller 220 is electromagnetically tracked with the head-mounted display system 210. The controller 220 includes an emitter and the head-mounted display system 210 includes a receiver 219 for electromagnetic tracking.

Potential user inputs that can be received through controller 220 include, but are not limited to, pressing and releasing the home button 222; half and full (and other partial) pressing of the trigger 228; releasing the trigger 228; pressing and releasing the bumper 226; touching, moving while touching, releasing a touch, increasing or decreasing pressure on a touch, touching a specific portion such as an edge of the touchpad 224, or making a gesture on the touchpad 224 (e.g., by drawing a shape with the thumb).

Physical movement of controller 220 and of a head-mounted display system 210 may form user inputs into the system. The head-mounted display system 210 may comprise the head-worn components 211-219 of the head-mounted display system 210. In some embodiments, the controller 220 provides three degree-of-freedom (3 DOF) input, by recognizing rotation of controller 220 in any direction. In other embodiments, the controller 220 provides six degree-of-freedom (6 DOF) input, by also recognizing translation of the controller in any direction. In still other embodiments, the controller 220 may provide less than 6 DOF or less than 3 DOF input. Similarly, the head-mounted display system 210 may recognize and receive 3 DOF, 6 DOF, less than 6 DOF, or less than 3 DOF input.

The user inputs may have different durations. For example, certain user inputs may have a short duration (e.g., a duration of less than a fraction of a second, such as 0.25 seconds) or may have a long duration (e.g., a duration of more than a fraction of a second, such as more than 0.25 seconds). In at least some embodiments, the duration of an input may itself be recognized and utilized by the system as an input. Short and long duration inputs can be treated differently by the head-mounted display system 210. For example, a short duration input may represent selection of an object, whereas a long duration input may represent activation of the object (e.g., causing execution of an app associated with the object).

Figure 2C:
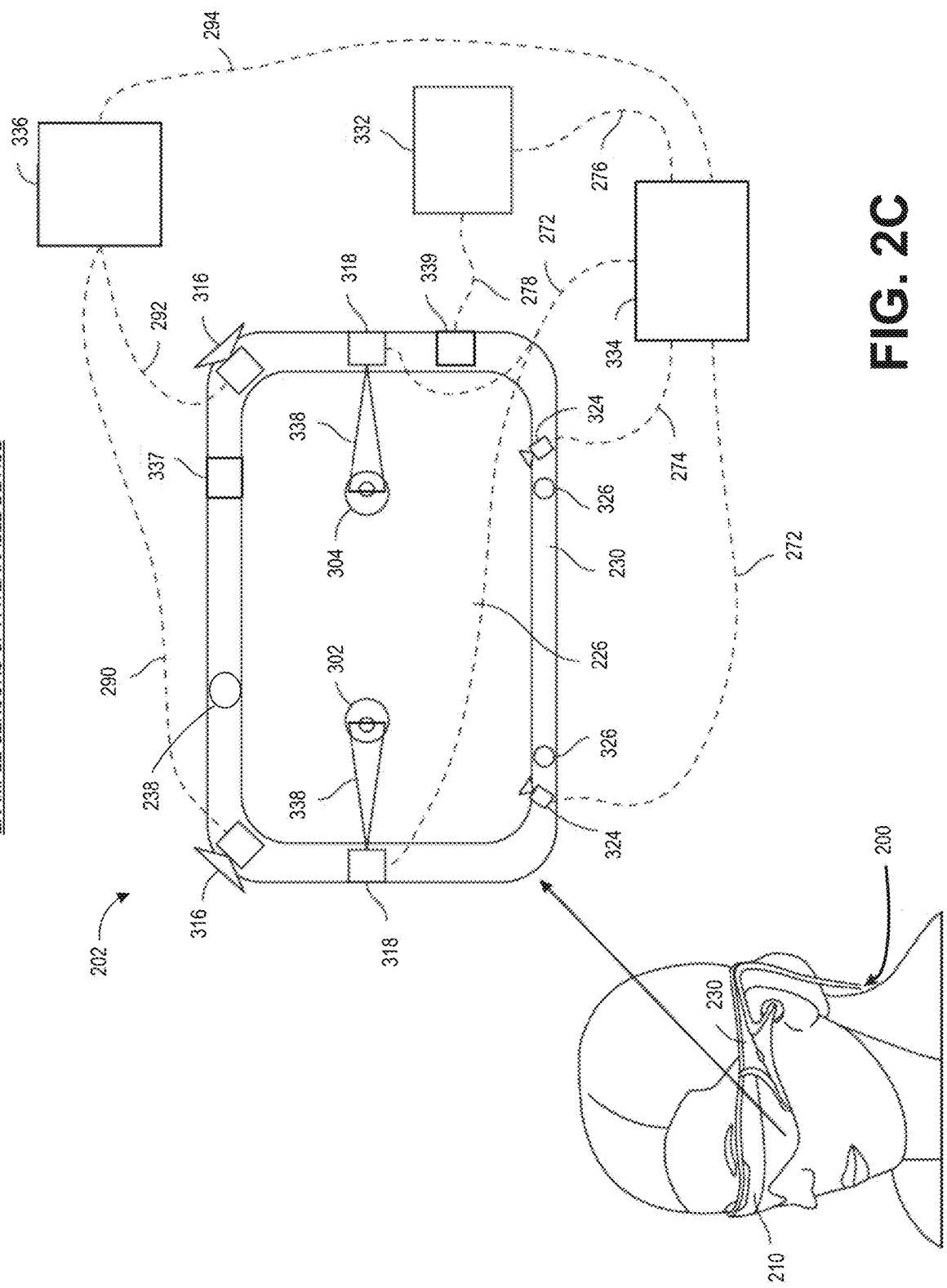
FIG. 2C illustrates example components of the head-mounted display system, according to some embodiments.

FIG. 2C schematically illustrates example components of the head-mounted display system 210. FIG. 2C shows a head-mounted display system 210 which can include a display 213 and a frame 211. A blown-up view 202 schematically illustrates various components of the head-mounted display system 210. In certain implements, one or more of the components illustrated in FIG. 2C can be part of the display 213. The various components alone or in combination can collect a variety of data (such as e.g., audio or visual data) associated with the user of the head-mounted display system 210 or the environment of the user. It should be appreciated that other embodiments may have additional or fewer components depending on the application for which the head-mounted display system is used. Nevertheless, FIG. 2C provides a basic idea of some of the various components and types of data that may be collected, analyzed, and stored through the head-mounted display system.

FIG. 2C shows an example head-mounted display system 210 which can include the display 213. The display 213 comprises a right display lens and a left display lens that may be mounted to the head of the user which corresponds to the housing 211. The display 213 may comprise one or more transparent mirrors positioned by the housing 211 in front of the eyes 302, 304 of the user and may be configured to bounce projected light 338 into the eyes 302, 304 and facilitate beam shaping, while also allowing for transmission of at least some light from the local environment. The wavefront of the projected light 338 beam may be bent or focused to coincide with a desired focal distance of the projected light 338. As illustrated, two wide-field-of-view machine vision cameras 316 (also referred to as world cameras) can be coupled to the housing 211 to image the environment around the user. These cameras 316 can be dual capture visible light/non-visible (e.g., infrared) light cameras. The cameras 316 may be part of the outward-facing imaging system 464 shown in FIG. 3. Images acquired by the world cameras 316 can be processed by the pose processor 336. For example, the pose processor 336 can implement one or more object recognizers 708 (e.g., shown in FIG. 7) to identify a pose of a user or another person in the environment of the user or to identify a physical object in the environment of the user.

With continued reference to FIG. 2C, a pair of scanned-laser shaped-wavefront (e.g., for depth) light projector modules with display mirrors and optics configured to project light 338 into the eyes 302, 304. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 3. The head-mounted display system 210 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU sensor 236 described with reference to FIG. 2A. The depicted system 210 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 230 shown in FIG. 2A.

The head-mounted display system can also include one or more depth sensors 238. The depth sensor 238 can be configured to measure the distance between an object in an environment to a wearable device. The depth sensor 238 may include a laser scanner (e.g., a lidar), an ultrasonic depth sensor, or a depth sensing camera. In certain implementations, where the cameras 316 have depth sensing ability, the cameras 316 may also be considered as depth sensors 238.

Also shown is a processor 332 configured to execute digital or analog processing to derive pose from the gyro, compass, or accelerometer data from the sensor assembly 339. The processor 332 may be part of the local processing and data module 230 shown in FIG. 2A. The head-mounted display system 210 as shown in FIG. 2C can also include a position system (e.g., a GPS 337 (global positioning system)) to assist with pose and positioning analyses. In addition, the GPS may further provide remotely-based (e.g., cloud-based) information about the environment of the user. This information may be used for recognizing objects or information in the environment of the user.

The head-mounted display system may combine data acquired by the GPS 337 and a remote computing system (such as, e.g., the remote processing module 232 shown in FIG. 2A, another ARD of the user, etc.), which can provide more information about the environment of the user. As one example, the head-mounted display system can determine the location of the user based on GPS data and retrieve a world map (e.g., by communicating with a remote processing module 232 shown in FIG. 2A) including virtual objects associated with the location of the user. As another example, the head-mounted display system 210 can monitor the environment using the world cameras 316 (which may be part of the outward-facing imaging system 464 shown in FIG. 3). Based on the images acquired by the world cameras 316, the head-mounted display system 210 can detect objects in the environment (e.g., by using one or more object recognizers 708 shown in FIG. 7). The head-mounted display system can further use data acquired by the GPS 337 to interpret the characters.

The head-mounted display system 210 may also comprise a rendering engine 334 which can be configured to provide rendering information that is local to the user to facilitate operation of the scanners and imaging into the eyes 302, 304 of the user, for the view of the world of the user. The rendering engine 334 may be implemented by a hardware processor (such as, e.g., a central processing unit or a graphics processing unit). In some embodiments, the rendering engine is part of the local processing and data module 230. The rendering engine 334 can be communicatively coupled (e.g., via wired or wireless links) to other components of the head-mounted display system 210. For example, the rendering engine 334, can be coupled to the eye cameras 324 via communication link 274, and be coupled to a projecting subsystem 318 (which can project light 338 into the eyes 302, 304 of the user via a scanned laser arrangement in a manner similar to a retinal scanning display) via the communication link 272. The rendering engine 334 can also be in communication with other processing units (e.g., the sensor pose processor 332 and the image pose processor 336 via links 276 and 294, respectively).

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 2C are for illustration purposes only. Multiple sensors and other functional modules are shown together for ease of illustration and description. Some embodiments may include only one or a subset of these sensors or modules. Further, the locations of these components are not limited to the positions depicted in FIG. 2C. Some components may be mounted to or housed within other components, such as a belt-mounted component, a hand-held component, or a helmet component. As one example, the image pose processor 336, sensor pose processor 332, and rendering engine 334 may be positioned in a belt pack and configured to communicate with other components of the head-mounted display system via wireless communication, such as ultra-wideband, Wi-Fi, Bluetooth, etc., or via wired communication. The depicted housing 211 preferably is head-mountable and wearable by the user. However, some components of the head-mounted display system 210 may be worn to other portions of the body of the user. For example, the speaker 215 may be inserted into the ears of a user to provide sound to the user.

Regarding the projection of light 338 into the eyes 302, 304 of the user, in some embodiment, the cameras 324 may be utilized to measure where the centers of a the eyes 302, 304 of the user are geometrically verged to, which, in general, coincides with a position of focus, or "depth of focus", of the eyes 302, 304. A 3-dimensional surface of all points the eyes 302, 304 verge to can be referred to as the "horopter". The focal distance may take on a finite number of depths, or may be infinitely varying. Light projected from the vergence distance appears to be focused to the subject eye while light in front of or behind the vergence distance is blurred.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes 302, 304 to fixate upon an object) of the two eyes 302, 304 relative to each other are closely associated with focusing (or "accommodation") of the lenses of the eyes 302, 304. Under normal conditions, changing the focus of the lenses of the eyes 302, 304, or accommodating the eyes 302, 304, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 210 renders to the user at a frame rate of about 60 frames per second or greater. As described herein, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system 210 has latency of less than about 20 milliseconds for visual object alignment, less than about 0.1 degree of angular alignment, and about 1 arc minute of resolution, which, without being limited by theory, is believed to be approximately the limit of the human eye. The display system 210 may be integrated with a localization system, which may involve GPS elements, optical tracking, compass, accelerometers, or other data sources, to assist with position and pose determination; localization information may be utilized to facilitate accurate rendering in the view of the pertinent world of the user (e.g., such information would facilitate the glasses to know where they are with respect to the real world).

In some embodiments, the head-mounted display system 210 is configured to display one or more virtual images based on the accommodation of the eyes 302, 304 of the user. Unlike prior 3D display approaches that force the user to focus where the images are being projected, in some embodiments, the head-mounted display system is configured to automatically vary the focus of projected virtual content to allow for a more comfortable viewing of one or more images presented to the user. For example, if the eyes 302, 304 of the user have a current focus of 1 m, the image may be projected to coincide with the focus of the user. If the user shifts focus to 3 m, the image is projected to coincide with the new focus. Thus, rather than forcing the user to a predetermined focus, the head-mounted display system 210 of some embodiments allows the eyes of the user to function in a more natural manner.

Such a head-mounted display system 210 may eliminate or reduce the incidences of eye strain, headaches, and other physiological symptoms typically observed with respect to virtual reality devices. To achieve this, various embodiments of the head-mounted display system 210 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the present state of focus of the user.

In both the multi-plane focus systems and variable plane focus systems, head-mounted display system 210 may employ eye tracking to determine a vergence of the eyes 302, 304 of the user, determine the current focus of the user, and project the virtual image at the determined focus. In other embodiments, head-mounted display system 210 comprises a light modulator that variably projects, through a fiber scanner, or other light generating source, light beams of varying focus in a raster pattern across the retina. Thus, the ability of the display of the head-mounted display system 210 to project images at varying focal distances not only eases accommodation for the user to view objects in 3D, but may also be used to compensate for user ocular anomalies. In some other embodiments, a spatial light modulator may project the images to the user through various optical components. For example, as described further herein, the spatial light modulator may project the images onto one or more waveguides, which then transmit the images to the user.

Waveguide Stack Assembly

Figure 3:
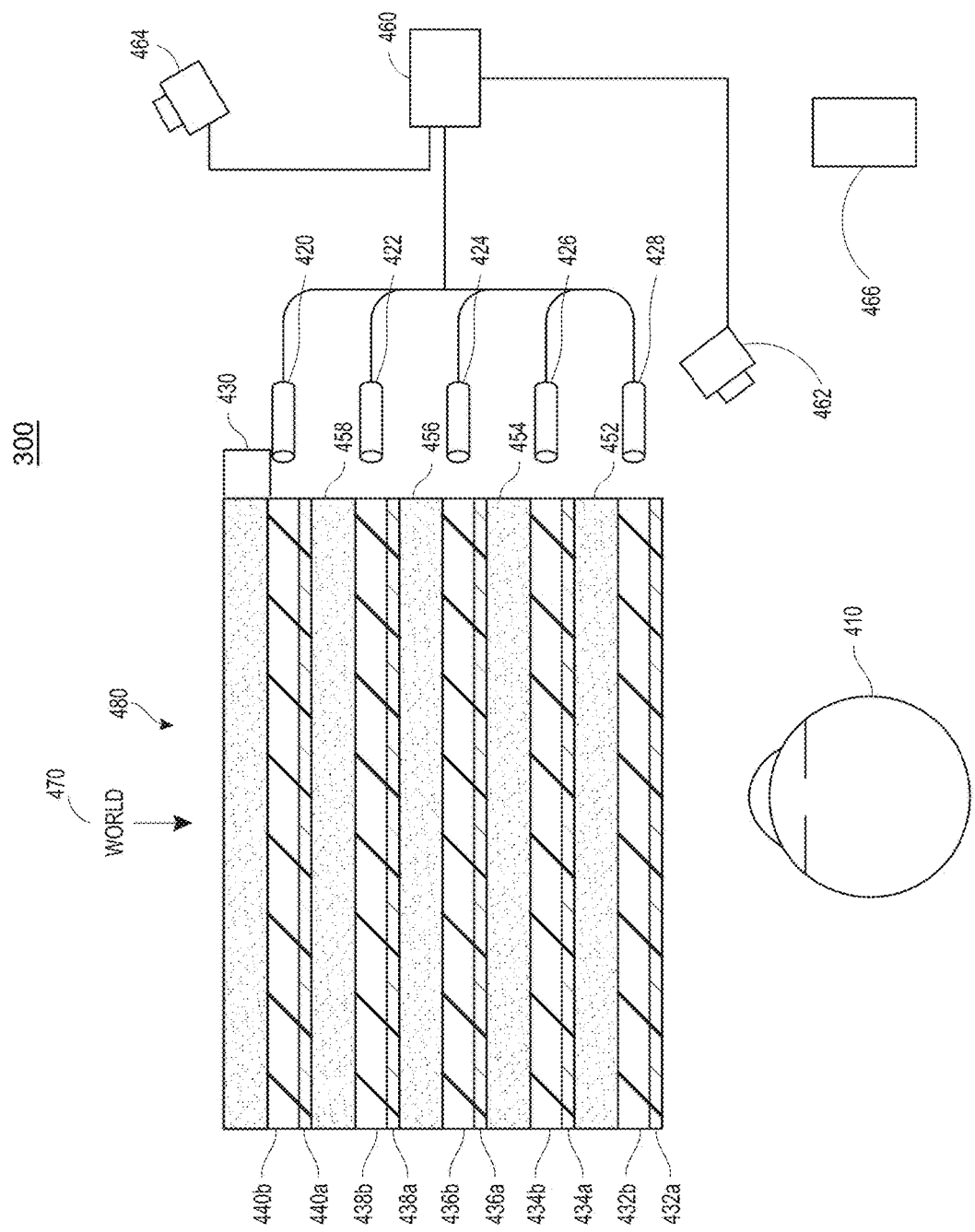
FIG. 3 illustrates an example of a waveguide stack of the head-mounted display system for outputting image information to a user, according to some embodiments.

FIG. 3 illustrates an example of a waveguide stack for outputting image information to a user. A wearable system 300 (e.g., head-mounted display MR system 210 illustrated in FIGS. 2A-2C) includes a stack of waveguides, or stacked waveguide assembly 480 that may be utilized to provide three-dimensional perception to the eye/brain using a plurality of waveguides 432b, 434b, 436b, 438b, 440b. In some embodiments, the wearable system 300 may correspond to wearable system 210 of FIGS. 2A-2C, with FIG. 3 schematically showing some parts of that wearable system 210 in greater detail. For example, in some embodiments, the waveguide assembly 480 may be integrated into the display 213 of FIG. 2A.

With continued reference to FIG. 3, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 490, 492, 494, 496, 498 may be utilized to inject image information into the waveguides 440b, 438b, 436b, 434b, 432b, each of which may be configured to distribute incoming light across each respective waveguide, for output toward the eye 310. Light exits an output surface of the image injection devices 490, 492, 494, 496, 498 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 310 at particular angles (and amounts of divergence) corresponding to the depth plane associated with a particular waveguide.

In some embodiments, the image injection devices 490, 492, 494, 496, 498 are discrete displays that each produce image information for injection into a corresponding waveguide 440b, 438b, 436b, 434b, 432b, respectively. In some other embodiments, the image injection devices 490, 492, 494, 496, 498 are the output ends of a single multiplexed display which may, e.g., pipe image information via one or more optical conduits (such as fiber optic cables) to each of the image injection devices 490, 492, 494, 496, 498.

A controller 460 controls the operation of the stacked waveguide assembly 480 and the image injection devices 490, 492, 494, 496, 498. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 230 or 232 illustrated in FIG. 2A in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 310. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 3, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 310. The collimated light may be representative of the optical infinity focal plane. The next waveguide up 434b may be configured to send out collimated light which passes through the first lens 452 (e.g., a negative lens) before it can reach the eye 310. First lens 452 may be configured to create a slight convex wavefront curvature so that the eye/brain interprets light coming from that next waveguide up 434b as coming from a first focal plane closer inward toward the eye 310 from optical infinity. Similarly, the third up waveguide 436b passes its output light through both the first lens 452 and second lens 454 before reaching the eye 310. The combined optical power of the first and second lenses 452 and 454 may be configured to create another incremental amount of wavefront curvature, so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 3, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 310 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 310 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a pupil size of the viewer. As a result, as the sizes of the pupils of the eyes of the viewer decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the eyes of the user are unable to distinguish between two depth planes associated with two waveguides, then the controller 460 (which may be an embodiment of the local processing and data module 230) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the pupils of the viewer. In some embodiments, this condition is met over a wide range of pupil sizes by varying the size of the exit beam in response to determinations of the size of the pupil of the viewer. For example, as the pupil size decreases, the size of the exit beam may also decrease. In some embodiments, the exit beam size may be varied using a variable aperture.

The wearable system 300 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a display which encompasses a portion of the world 470 the display perceives at a given time. For example, in some situations, the FOV of the world camera may be larger than the display of the display of the wearable system 300. The entire region available for viewing or imaging by a viewer may be referred to as the field of regard (FOR). The FOR may include 4π steradians of solid angle surrounding the wearable system 300 because the wearer can move his body, head, or eyes to perceive substantially any direction in space. In other contexts, the movements of the wearer may be more constricted, and accordingly the FOR of the wearer may subtend a smaller solid angle. Images obtained from the outward-facing imaging system 464 can be used to track gestures made by the user (e.g., hand or finger gestures), detect objects in the world 470 in front of the user, and so forth.

The wearable system 300 can include an audio sensor 217, e.g., a microphone, to capture ambient sound. As described herein, in some embodiments, one or more other audio sensors can be positioned to provide stereo sound reception useful to the determination of location of a speech source. The audio sensor 217 can comprise a directional microphone, as another example, which can also provide such useful directional information as to where the audio source is located. The wearable system 300 can use information from both the outward-facing imaging system 464 and the audio sensor 217 in locating a source of speech, or to determine an active speaker at a particular moment in time, etc. For example, the wearable system 300 can use the voice recognition alone or in combination with a reflected image of the speaker (e.g., as seen in a mirror) to determine the identity of the speaker. As another example, the wearable system 300 can determine a position of the speaker in an environment based on sound acquired from directional microphones. The wearable system 300 can parse the sound coming from the position of the speaker with speech recognition algorithms to determine the content of the speech and use voice recognition techniques to determine the identity (e.g., name or other demographic information) of the speaker.

The wearable system 300 can also include an inward-facing imaging system 462 (e.g., a digital camera), which observes the movements of the user, such as the eye movements and the facial movements. The inward-facing imaging system 462 may be used to capture images of the eye 310 to determine the size and/or orientation of the pupil of the eye 310. The inward-facing imaging system 462 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 310 (e.g., using only a single camera per pair of eyes) is determined and assumed to be similar for both eyes of the user. The images obtained by the inward-facing imaging system 462 may be analyzed to determine the eye pose or mood of the user, which can be used by the wearable system 300 to decide which audio or visual content should be presented to the user. The wearable system 300 may also determine head pose (e.g., head position or head orientation) using a pose sensor, e.g., sensors such as IMUs, accelerometers, gyroscopes, etc.

The wearable system 300 can include a user input device 466 (e.g., user input device 220 illustrated in FIG. 2B) by which the user can input commands to the controller 460 to interact with the wearable system 300. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 300 (e.g., to provide user input to a user interface provided by the wearable system 300). The user input device 466 may be held by the hand of the user during the use of the wearable system 300. The user input device 466 can be in wired or wireless communication with the wearable system 300.

Example Block Diagram of System

Figure 4:
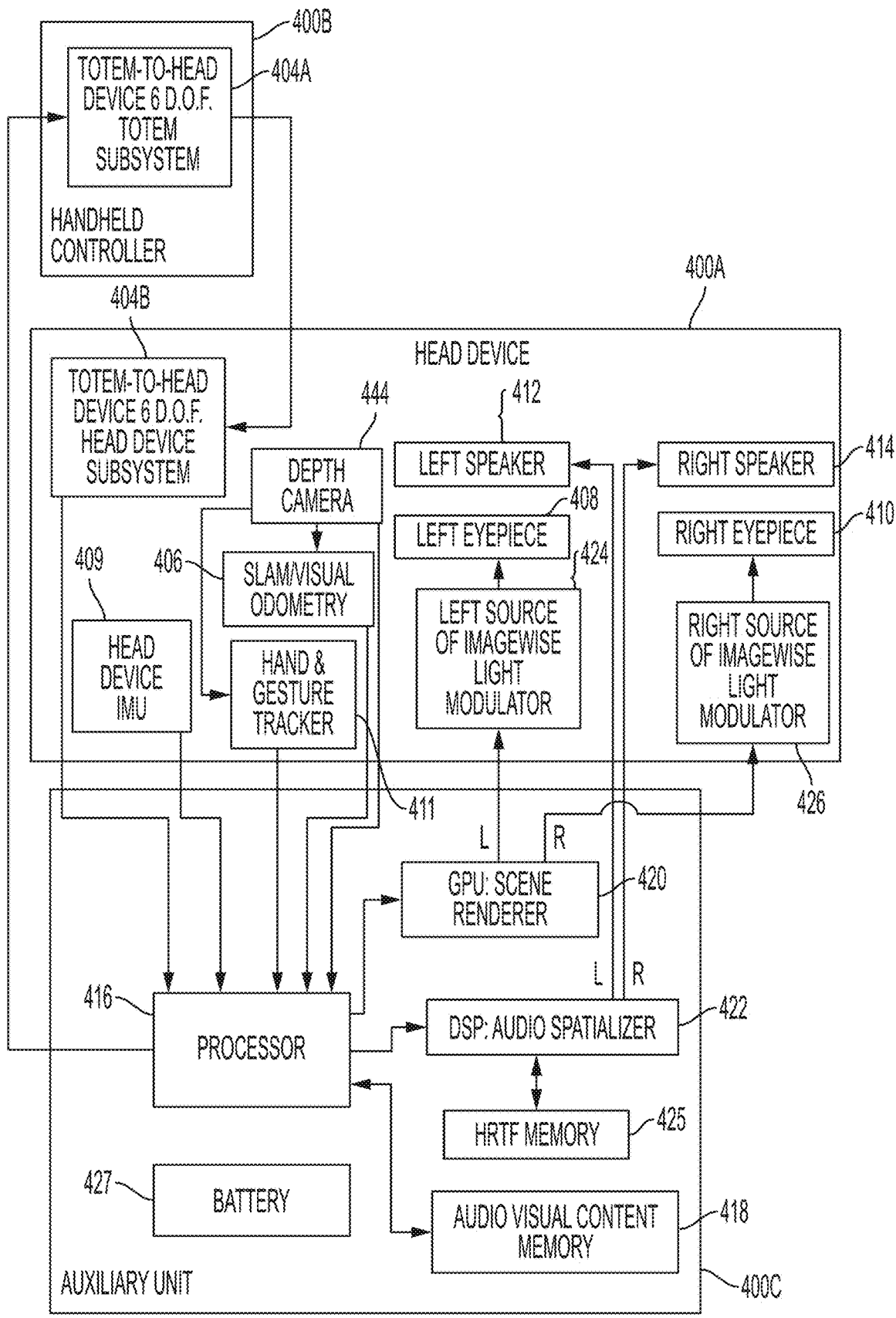
FIG. 4 illustrates an example functional block diagram for an example mixed reality system, according to some embodiments.

FIG. 4 shows an example functional block diagram that may correspond to an example mixed reality system, such as mixed reality system described herein (which may correspond to mixed reality system 210 with respect to FIGS. 1A, 1C, 2A, 2C and 3). As shown in FIG. 4, example handheld controller 400B (which may correspond to handheld controller 220 (a "totem") illustrated in FIG. 2B), includes a totem-to-wearable head device six degree of freedom (6DOF) totem subsystem 404A and example wearable head device 400A (which may correspond to wearable head device 210) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 222, 224, 226, 228 of handheld controller 220 as described herein, or dedicated optical targets included in the handheld controller 220) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the position and orientation of the wearable head device), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the head of the user, which can then be used to identify a transformation between a head coordinate space and another coordinate space (e.g., an inertial coordinate space). Similarly, in some examples, an additional source of information on the head pose and location of the user is obtained from an IMU 409. Information from the IMU 409 can be integrated with information from the SLAM/visual odometry block 406 to provide improved accuracy and/or more timely information on rapid adjustments of the head pose and position of the user.

In some examples, the depth cameras 444 can supply 3D imagery to a hand gesture tracker 411, which may be implemented in a processor of the wearable head device 400A. The hand gesture tracker 411 can identify hand gestures of the user, for example by matching 3D imagery received from the depth cameras 444 to stored patterns representing hand gestures. Other suitable techniques of identifying hand gestures of the user will be apparent.

In some examples, one or more processors 416 may be configured to receive data from the 6DOF headgear subsystem 404B, the IMU 409, the SLAM/visual odometry block 406, depth cameras 444, and/or the hand gesture tracker 411 of the wearable head device. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described herein with respect to FIGS. 2C and 3. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 220). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment that is, by presenting a virtual sound that matches the expectations of the user of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 4000. The auxiliary unit 4000 may include a battery 427 to power its components and/or to supply power to the wearable head device 400A or handheld controller 400B. Including such components in an auxiliary unit, which can be mounted to the waist of the user, can limit the size and weight of the wearable head device 400A, which can in turn reduce fatigue of the head and neck of the user.

While FIG. 4 presents elements corresponding to various components of an example mixed reality system, various other suitable arrangements of these components will become apparent to those skilled in the art. For example, elements presented in FIG. 4 as being associated with auxiliary unit 4000 could instead be associated with the wearable head device 400A or handheld controller 400B. Furthermore, some mixed reality systems may forgo entirely a handheld controller 400B or auxiliary unit 4000. Such changes and modifications are to be understood as being included within the scope of the disclosed examples.

Example Processes of User Interactions with a Wearable System

Figure 5:
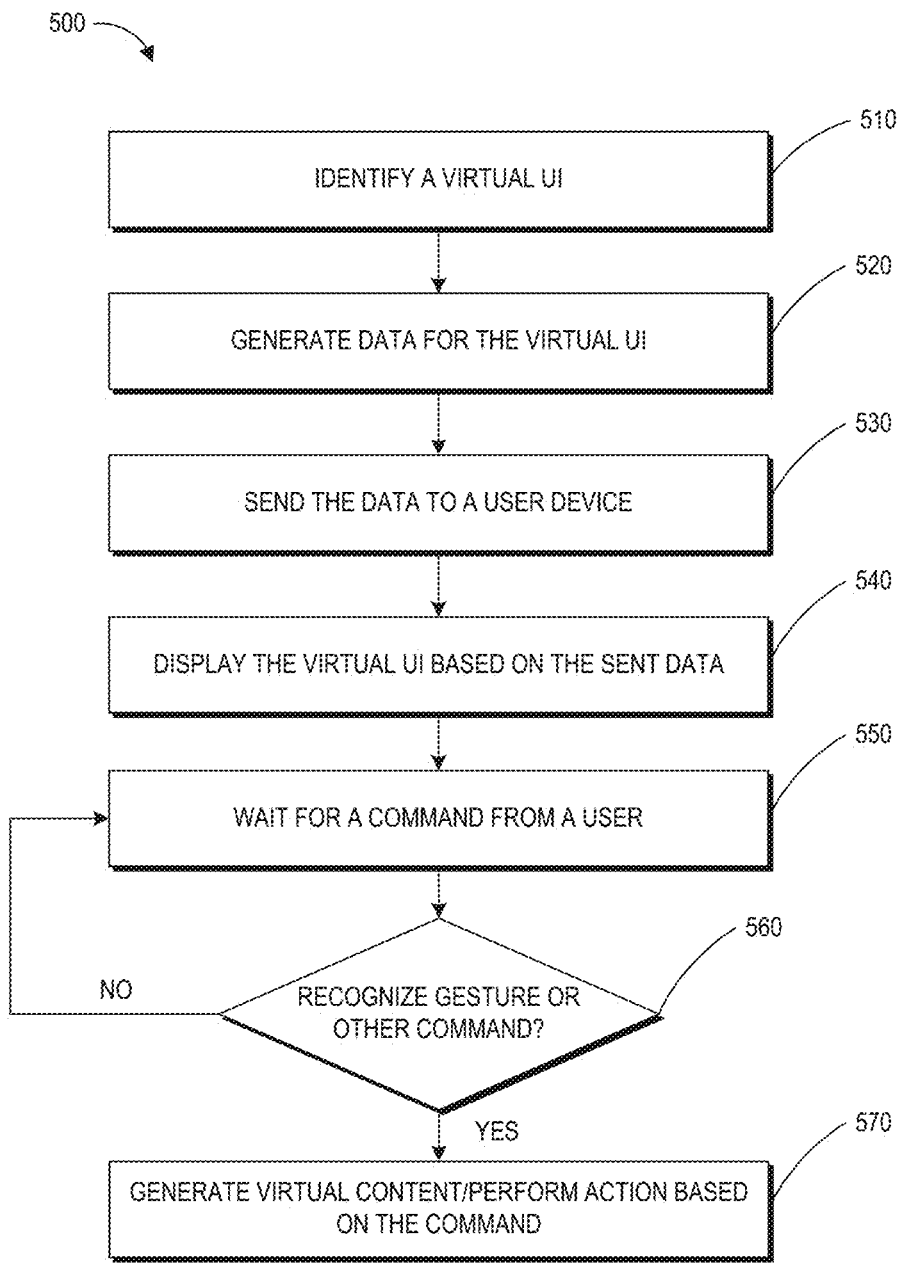
FIG. 5 is a process flow diagram of an example of a method for interacting with a virtual user interface, according to some embodiments.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the physical location of the user so that the wearable system can display the UI in relation to the physical location of the user. For example, if the UI is body centric, the wearable system may determine the coordinates of the physical stance, head pose, or eye pose of the user such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the documents of the traveler. If the UI is hand centric, the map coordinates of the hands of the user may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the eyes of the user. Once the virtual UI has been created, the wearable system may simply wait for a command from the user to generate more virtual content on the virtual UI at block 550. For example, the UI may be a body centric ring around the body of the user or the body of a person in the environment of the user (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
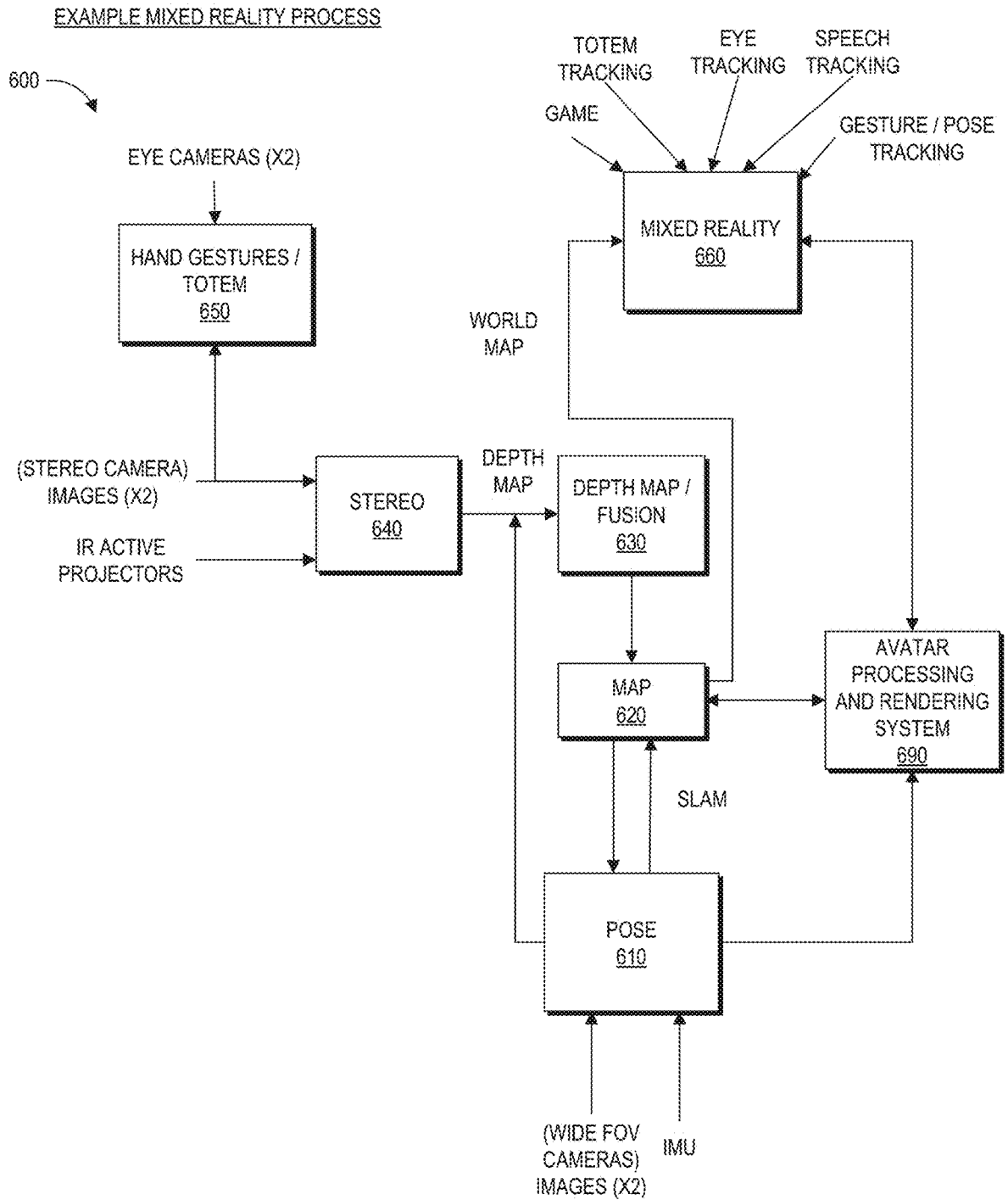
FIG. 6A is a block diagram of another example of a head-mounted display system which can comprise an avatar processing and rendering system, according to some embodiments.

FIG. 6A is a block diagram of another example of a wearable system which can comprise an avatar processing and rendering system 690 in a mixed reality environment. The wearable system 600 may be part of the wearable system 210 shown in FIGS. 1A, 1C, 2A, 2C, 3 and 4. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 230 or controller 460) and utilize data from the map process 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process 640 (e.g., a depth map) may be combined in the fusion process 630. The pose process 610 may provide an input to this fusion process 630 as well, and the output of the fusion process 630 may become an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g., a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 230 or the remote processing module 232 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 230 or the remote processing module 232 can also apply voice recognition algorithms which can identify the identity of the speaker, such as whether the speaker is the user 110 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 232 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the face of the user, a different pair of cameras oriented in front of the user to handle the stereo imaging process 640 and also to capture hand gestures and totem/object tracking in front of the face of the user. The FOV cameras and the pair of cameras for the stereo process 640 may be a part of the outward-facing imaging system 464 (shown in FIG. 3). The wearable system 600 can include eye tracking cameras (which may be a part of an inward-facing imaging system 462 shown in FIG. 3) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 230 or the remote processing module 232 alone or in combination. In various embodiments, multiple avatar processing and rendering systems 690 (e.g., as implemented on different wearable devices) can be used for rendering the virtual avatar 670. For example, a wearable device of the first user may be used to determine the intent of the first user, while a wearable device of the second user can determine the characteristics of an avatar and render the avatar of the first user based on the intent received from the wearable device of the first user. The wearable device of the first user and the wearable device (or other such wearable devices) of the second user can communicate via a network, for example, as will be described with reference to FIGS. 9A and 9B.

Figure 6B:
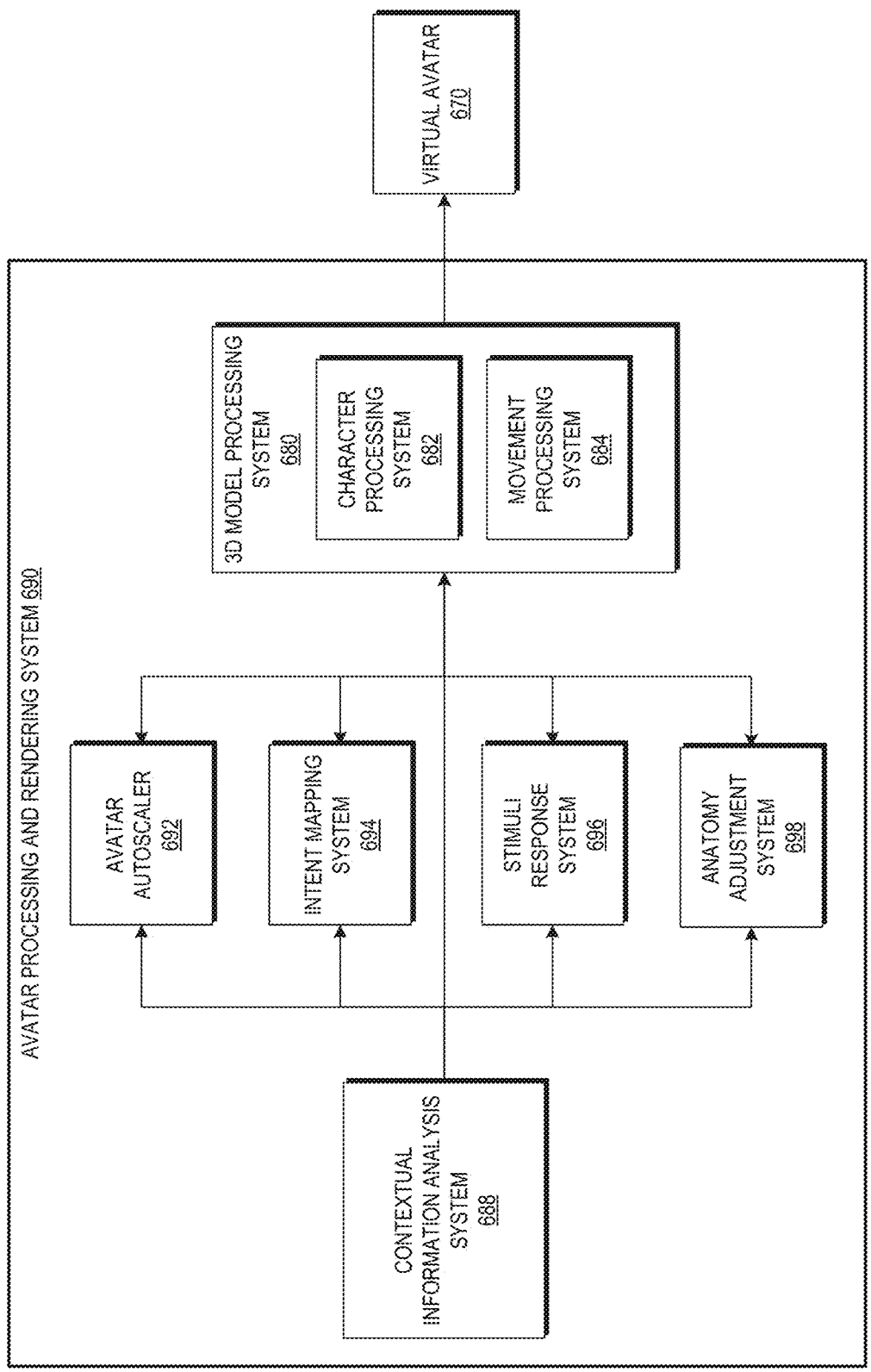
FIG. 6B illustrates example components of an avatar processing and rendering system, according to some embodiments.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 1A, 1C, 2A-C, 3 and 4. For example, the contextual information analysis system 688 can analyze environments and objects (including physical or virtual objects) of the environment of the user or an environment in which the avatar of the user is rendered, using images acquired by the outward-facing imaging system 464 of the user or the viewer of the avatar of the user. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the body of the avatar (e.g., the head) of the user is not at an uncomfortable (or unrealistic) position with respect to the other portions of the body of the user (e.g., the head of the avatar is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the characteristics of the avatar based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the eye level of the user such that the user does not need to look down at the avatar or look up at the avatar respectively. The intent mapping system 694 can determine an intent of the interaction of the user and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the wearable system of the first user can determine that such a face-to-face intent exists during the telepresence session and can cause the wearable system of the first user to render the avatar of the second user to be facing the first user. If the second user were to physically turn around, instead of rendering the avatar of the second user in a turned position (which would cause the back of the avatar of the second user to be rendered to the first user), the intent mapping system 694 of the first user can continue to render the face of the second avatar to the first user, which is the inferred intent of the telepresence session (e.g., face-to-face intent in this example).

The stimuli response system 696 can identify an object of interest in the environment and determine the response of an avatar to the object of interest. For example, the stimuli response system 696 can identify a sound source in an environment of the avatar and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the pose of the user based on biological features. For example, the anatomy adjustment system 698 can be configured to adjust relative positions between the head of the user and the torso of the user or between the upper body and lower body of the user based on a discomfort curve.

The 3D model processing system 680 can be configured to animate and cause the display 213 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the pose of the avatar, by moving the avatar around in the environment of the user, or by animating the facial expressions of the avatar, etc. As will further be described with reference to FIG. 10, the virtual avatar can be animated using rigging techniques (e.g., skeletal system or blendshape animation techniques) where an avatar is represented in two parts: a surface representation (e.g., a deformable mesh) that is used to render the outward appearance of the virtual avatar and a hierarchical set of interconnected joints (e.g., a skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping the Environment of a User

Figure 7:
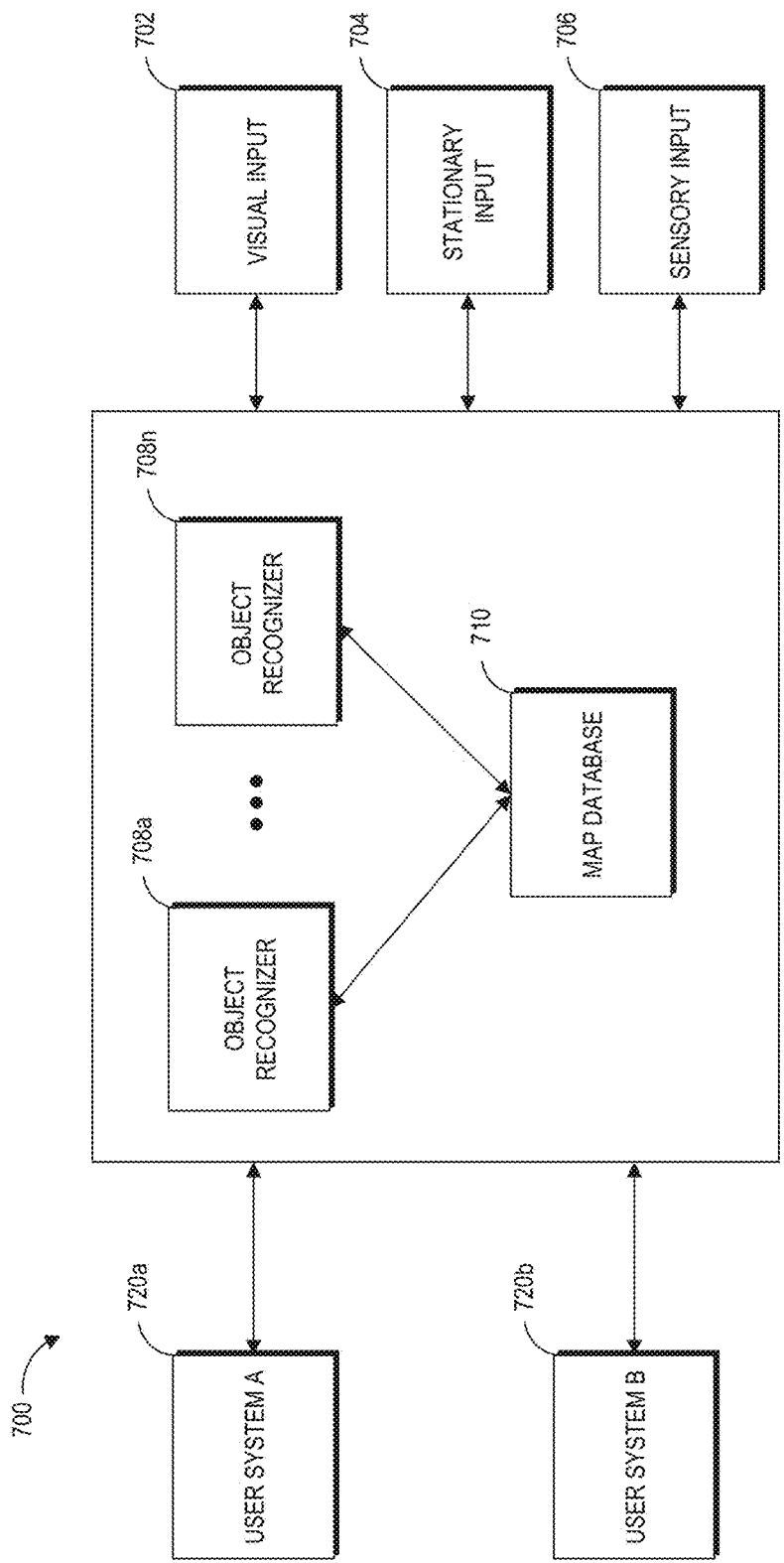
FIG. 7 is a block diagram of an example of a head-mounted display system including various inputs into the head-mounted display system, according to some embodiments.

FIG. 7 is a block diagram of an example of an MR environment 700. The MR environment 700 may be configured to receive input (e.g., visual input 702 from the wearable system, stationary input 704 such as room cameras, sensory input 706 from various sensors, gestures, totems, eye tracking, user input from the user input device 220, etc.) from one or more user wearable systems (e.g., head-mountable display MR system 210) or stationary room systems (e.g., room cameras, etc.) of the user. The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the environment of the user, etc. One or more object recognizers may be specialized for objects with certain characteristics. For example, the object recognizer 708a may be used to recognize faces, while another object recognizer may be used recognize documents.

The object recognitions may be performed using a variety of computer vision techniques. For example, the wearable system can analyze the images acquired by the outward-facing imaging system 464 (shown in FIG. 3) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the head-mounted display. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable head-mounted display can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
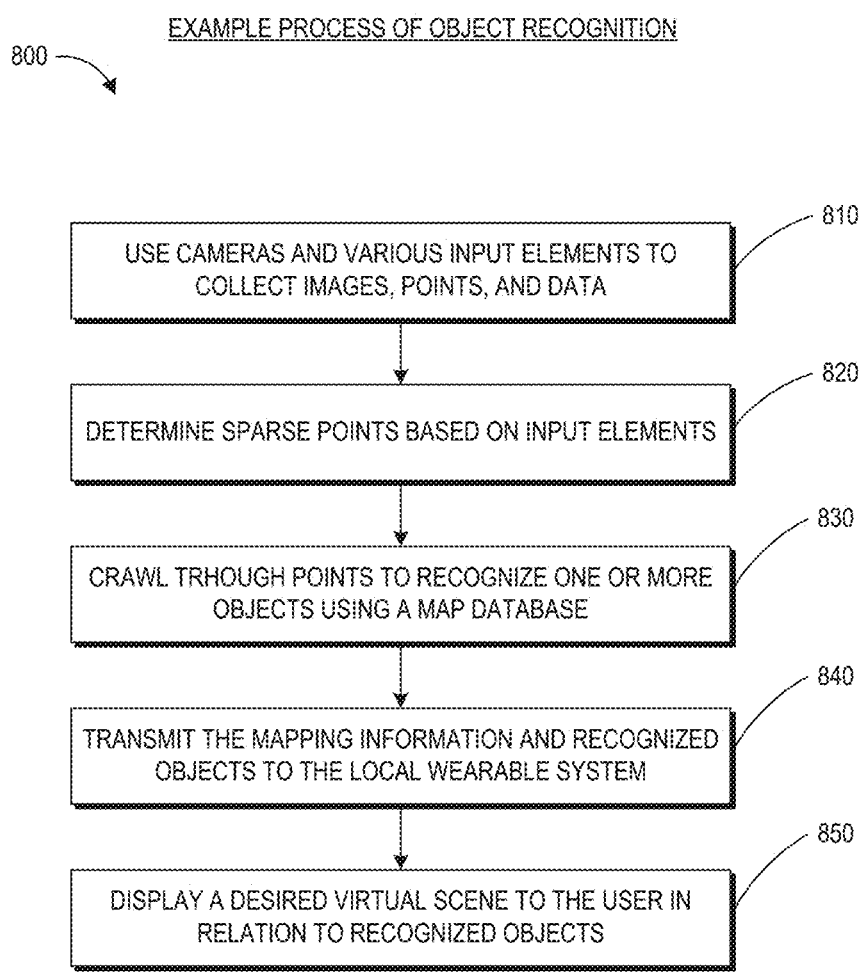
FIG. 8 is a process flow diagram of an example of a method of rendering virtual content in relation to recognized objects, according to some embodiments.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The FOV camera of the user, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the surroundings of the user. The object recognizers 708a-708n may crawl through these collected points and recognize one or more objects using a map database at block 830. This information may then be conveyed to the individual wearable system of the user at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications among Multiple Wearable Systems

Figure 9A:
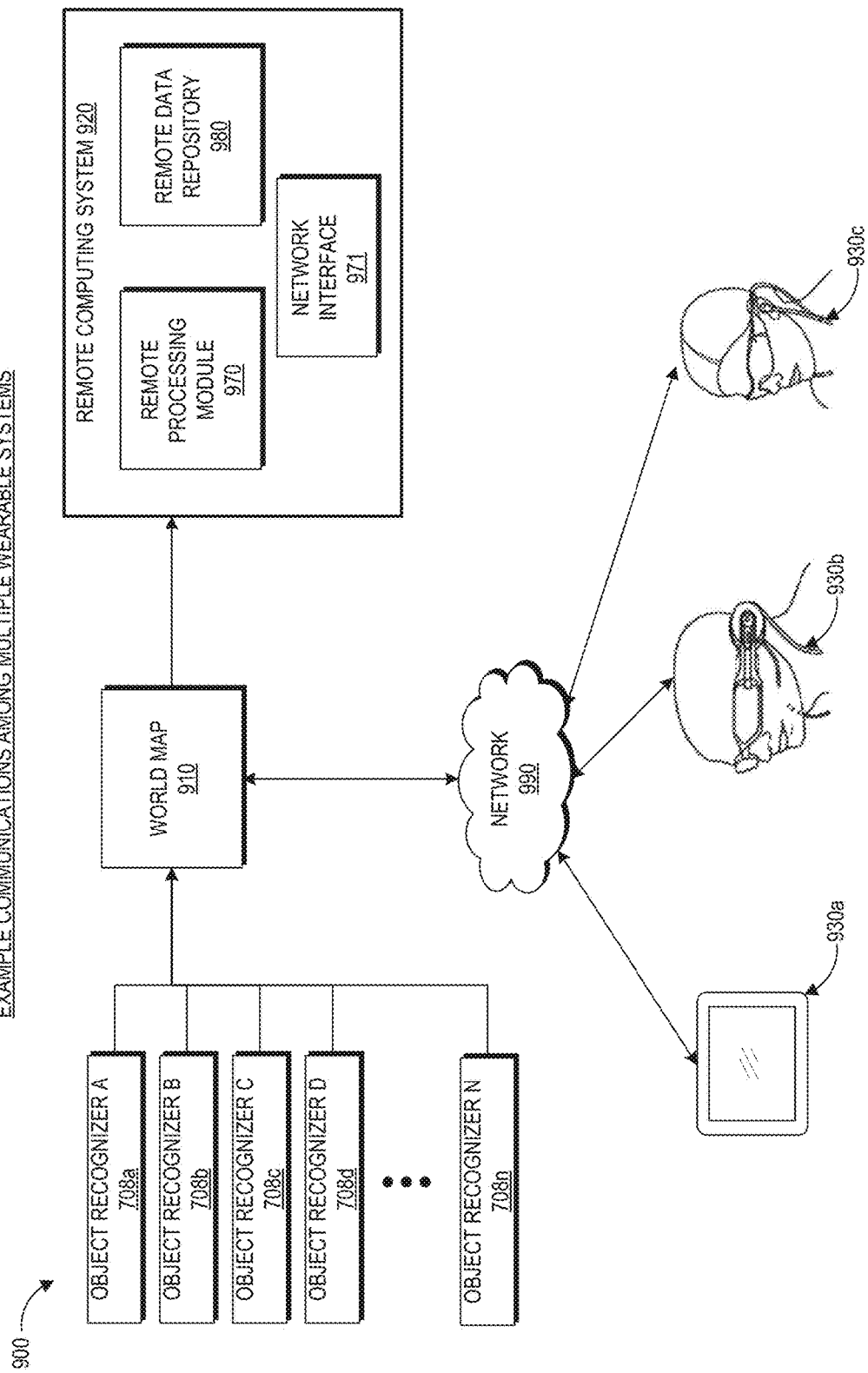
FIG. 9A schematically illustrates an overall system view depicting multiple head-mounted display systems interacting with each other, according to some embodiments.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about specific physical and/or virtual worlds of the user. Data storage 980 can store information related to users, users' environment (e.g., world maps of the environment of the user), or configurations of avatars of the users. The remote data repository may be an embodiment of the remote data repository 234 shown in FIG. 2A. The remote computing system 920 may also include a remote processing module 970. The remote processing module 970 may be an embodiment of the remote processing module 232 shown in FIG. 2A. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 230 (as shown in FIG. 2A). The remote computing system 920 may enable a given user to share information about the specific physical and/or virtual worlds of the user with another user.

The user device may be a wearable device (such as an HMD or an ARD), a computer, a mobile device, or any other devices alone or in combination. For example, the user devices 930b and 930c may be an embodiment of the wearable system 210 shown in FIGS. 2A, 2C (or the wearable system 300 shown in FIG. 3) which can be configured to present AR/VR/MR content.

One or more of the user devices can be used with the user input device 466 shown in FIG. 3. A user device can obtain information about the user and the environment of the user (e.g., using the outward-facing imaging system 464 shown in FIG. 3). The user device and/or remote computing system 920 can construct, update, and build a collection of images, points and other information using the information obtained from the user devices. For example, the user device may process raw information acquired and send the processed information to the remote computing system 920 for further processing. The user device may also send the raw information to the remote computing system 920 for processing. The user device may receive the processed information from the remote computing system 920 and provide final processing before projecting to the user. The user device may also process the information obtained and pass the processed information to other user devices. The user device may communicate with the remote data repository 980 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g., 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the environment of the user and receive information about the world map 910. The world map 910 may be created by the user or by someone else. As discussed herein, user devices (e.g., 930a, 930b, 930c) and remote computing system 920, alone or in combination, may construct and/or update the world map 910. For example, a user device may be in communication with the remote processing module 970 and the remote data repository 980. The user device may acquire and/or process information about the user and the environment of the user. The remote processing module 970 may be in communication with the remote data repository 980 and user devices (e.g., 930a, 930b, 930c) to process information about the user and the environment of the user. The remote computing system 920 can modify the information acquired by the user devices (e.g., 930a, 930b, 930c), such as, e.g., selectively cropping an image of a user, modifying the background of the user, adding virtual objects to the environment of the user, annotating speech of a user with auxiliary information, etc. The remote computing system 920 can send the processed information to the same and/or different user devices.

Examples of a Telepresence Session

Figure 9B:
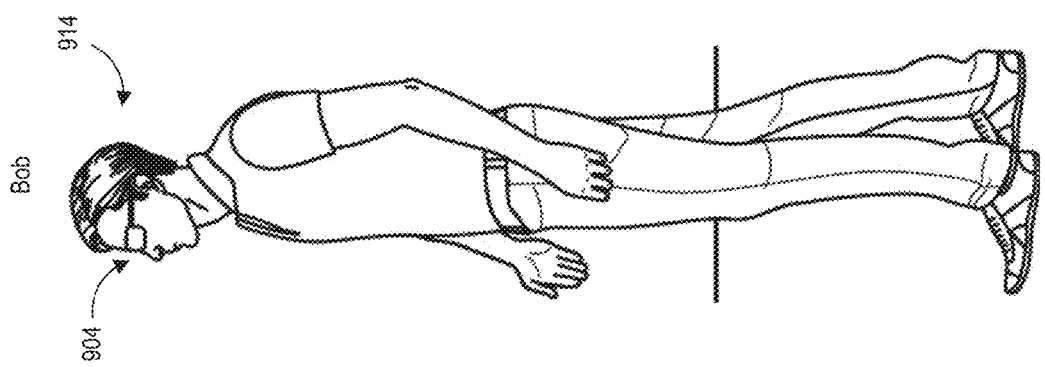
FIG. 9B illustrates an example telepresence session, according to some embodiments.
Figure 9B:
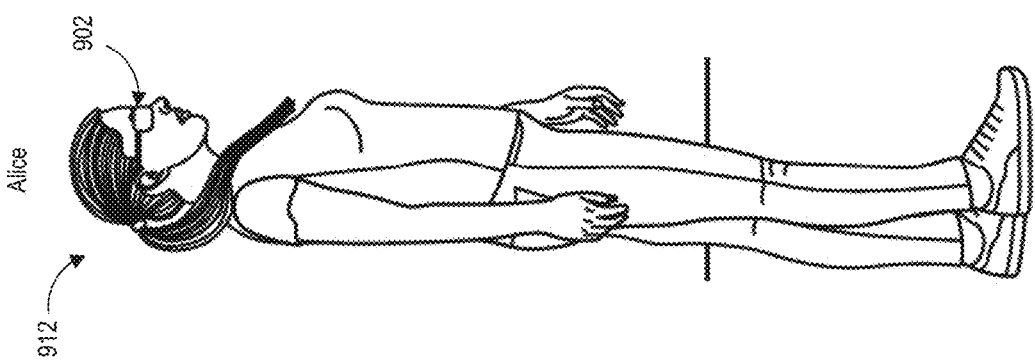

FIG. 9B depicts an example where two users of respective wearable systems are conducting a telepresence session. Two users (named Alice and Bob in this example) are shown in this figure. The two users are wearing their respective wearable devices 902 and 904 which can include a head-mounted display described with reference to FIG. 2A (e.g., the head-mounted display MR system 210) for representing a virtual avatar of the other user in the telepresence session. The two users can conduct a telepresence session using the wearable device. Note that the vertical line in FIG. 9B separating the two users is intended to illustrate that Alice and Bob may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464 with reference to FIG. 3, or one or more location sensors) and speech (e.g., via the respective audio sensor 217). The wearable devices 902 and 904 can also track the users' eye movements or gaze based on data acquired by the inward-facing imaging system 462. In some situations, the wearable device can also capture or track facial expressions or other body movements of a user (e.g., arm or leg movements) where a user is near a reflective surface and the outward-facing imaging system 464 can obtain reflected images of the user to observe the facial expressions or other body movements of a user.

A wearable device can use information acquired of a first user and the environment to animate a virtual avatar that will be rendered by a wearable device of a second user to create a tangible sense of presence of the first user in the environment of the second user. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., intent of a user, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular wearable device of a user can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective head-mounted displays in the telepresence session. For example, Alice may use other image acquisition and display devices such as a webcam and computer screen while Bob wears the wearable device 904.

Examples of a Virtual Avatar

Figure 10:
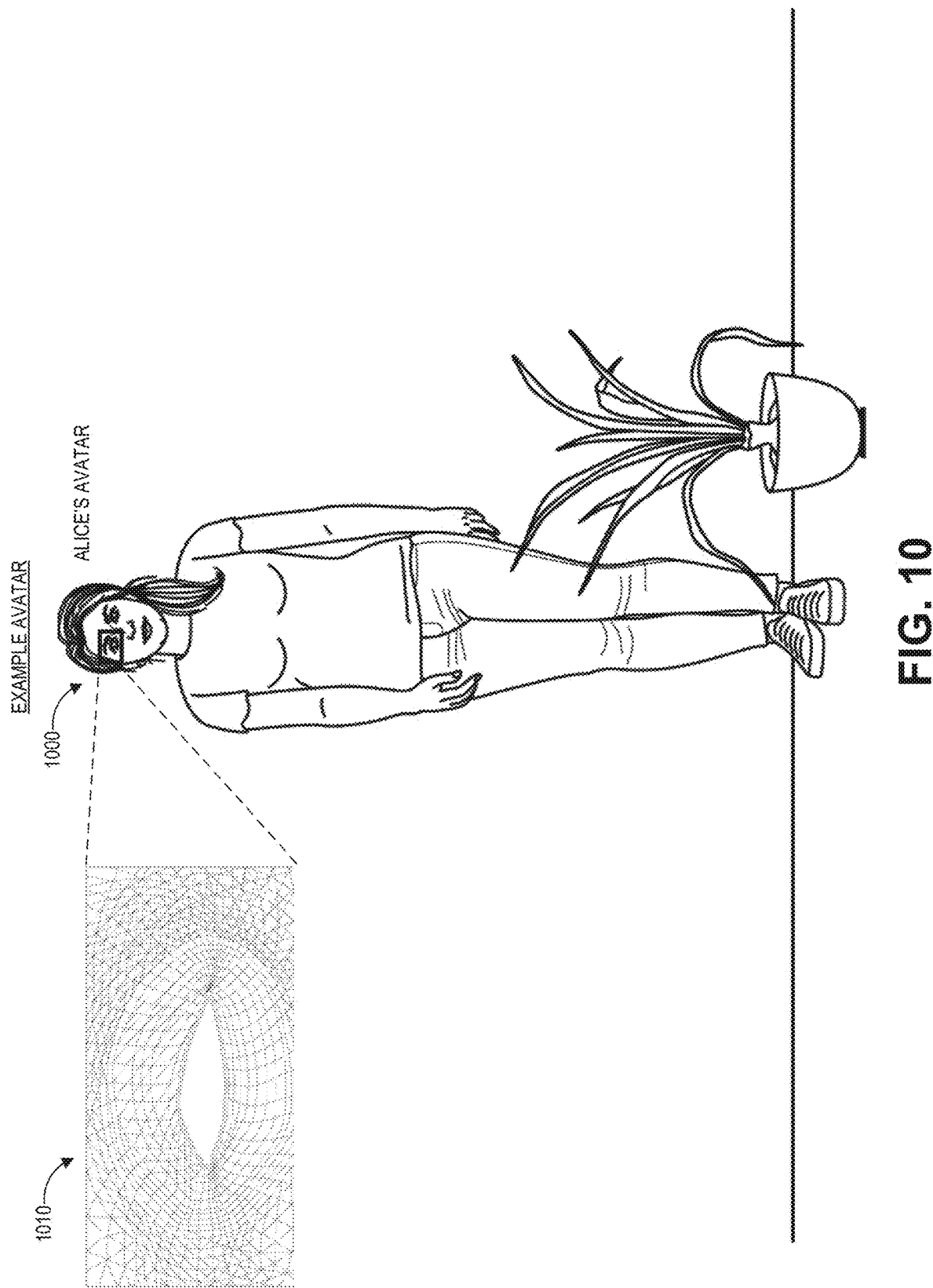
FIG. 10 illustrates an example of an avatar as perceived by a user of a head-mounted display system, according to some embodiments.

FIG. 10 illustrates an example of an avatar as perceived by a user of a wearable system. The example avatar 1000 shown in FIG. 10 can be an avatar of Alice (shown in FIG. 9B) standing behind a physical plant in a room. An avatar can include various characteristics, such as for example, size, appearance (e.g., skin color, complexion, hair style, clothes, facial features (e.g., wrinkle, mole, blemish, pimple, dimple, etc.)), position, orientation, movement, pose, expression, etc. These characteristics may be based on the user associated with the avatar (e.g., the avatar 1000 of Alice may have some or all characteristics of the actual person Alice). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Example Control Systems for Animating an Avatar

As described with reference to FIG. 6B, an avatar can be animated by the wearable system using rigging techniques. A goal of rigging is to provide pleasing, high-fidelity deformations of an avatar based upon simple, human-understandable controls. Generally, the most appealing deformations are based at least partly on real-world samples (e.g., photogrammetric scans of real humans performing body movements, articulations, facial contortions, expressions, etc.) or art-directed development (which may be based on real-world sampling). Real-time control of avatars in a mixed reality environment can be provided by embodiments of the avatar processing and rendering system 690 described with reference to FIG. 6B.

Rigging includes techniques for transferring information about deformation of the body of an avatar (e.g., facial contortions) onto a mesh. A mesh can be a collection of 3D points (e.g., vertices) along with a set of polygons that share these vertices. FIG. 10 shows an example of a mesh 1010 around an eye of the avatar 1000. Animating a mesh includes deforming the mesh by moving some or all of the vertices to new positions in 3D space. These positions can be influenced by the position or orientation of the underlying bones of the rig (described below) or through user controls parameterized by time or other state information for animations such as facial expressions. The control system for these deformations of the mesh is often referred to as a rig. The example avatar processing and rendering system 690 of FIG. 6B includes a 3D model processing system 680, which can implement the rig.

Since moving each vertex independently to achieve a desired deformation may be quite time-consuming and effort-intensive, rigs typically provide common, desirable deformations as computerized commands that make it easier to control the mesh. For high-end visual effects productions such as movies, there may be sufficient production time for rigs to perform massive mathematical computations to achieve highly realistic animation effects. But for real-time applications (such as in mixed reality), deformation speed can be very advantageous and different rigging techniques may be used. Rigs often utilize deformations that rely on skeletal systems and/or blendshapes.

Example Skeletal Systems

Skeletal systems represent deformations as a collection of joints in a hierarchy. Joints (also called bones) primarily represent transformations in space including translation, rotation, and change in scale. Radius and length of the joint may be represented. The skeletal system is a hierarchy representing parent-child relationships among joints, e.g., the elbow joint is a child of the shoulder and the wrist is a child of the elbow joint. A child joint can transform relative to the joint of the parent such that the child joint inherits the transformation of the parent. For example, moving the shoulder results in moving all the joints down to the tips of the fingers. Despite its name, a skeleton need not represent a real world skeleton but can describe the hierarchies used in the rig to control deformations of the mesh. For example, hair can be represented as a series of joints in a chain, skin motions due to facial contortions of an avatar (e.g., representing expressions of an avatar such as smiling, frowning, laughing, speaking, blinking, etc.) can be represented by a series of facial joints controlled by a facial rig, muscle deformation can be modeled by joints, and motion of clothing can be represented by a grid of joints.

Skeletal systems can include a low level (also referred to as low order in some situations) core skeleton that might resemble a biological skeleton of an avatar. This core skeleton may not map exactly to a real set of anatomically correct bones, but can resemble the real set of bones by having at least a sub-set of the bones in analogous orientations and locations. For example, a clavicle bone can be roughly parallel to the ground, roughly located between the neck and shoulder, but may not be the exact same length or position. Higher order joint structures representing muscles, clothing, hair, etc. can be layered on top of the low level skeleton. The rig may animate only the core skeleton, and the higher order joint structures can be driven algorithmically by rigging logic based upon the animation of the core skeleton using, for example, skinning techniques (e.g., vertex weighting methods such as linear blend skinning (LBS)). Real-time rigging systems (such as the avatar processing and rendering system 690) may enforce limits on the number of joints that can be assigned to a given vertex (e.g., 8 or fewer) to provide for efficient, real-time processing by the 3D model processing system 680.

Blendshapes

Blendshapes include deformations of the mesh where some or all vertices are moved in 3D space by a desired amount based on a weight. Each vertex may have its own custom motion for a specific blendshape target, and moving the vertices simultaneously will generate the desired shape. Degrees of the blendshape can be applied by using blendshape weights. The rig may apply blendshapes in combination to achieve a desired deformation. For example, to produce a smile, the rig may apply blendshapes for lip corner pull, raising the upper lip, lowering the lower lip, moving the eyes, brows, nose, and dimples.

Example Rigging Techniques

A rig is often built in layers with lower, simpler layers driving higher order layers, which produce more realistic mesh deformations. The rig can implement both skeletal systems and blendshapes driven by rigging control logic. The control logic can include constraints among the joints (e.g., aim, orientation, and position constraints to provide specific movements or parent-child joint constraints); dynamics (e.g., for hair and clothing); pose-based deformations (PSDs, where the pose of the skeleton is used to drive a deformation based on distances from defined poses); machine learning techniques (e.g., those described with reference to FIG. 7) in which a desired higher level output (e.g., a facial expression) is learned from a set of lower level inputs (of the skeletal system or blendshapes); etc. Some machine learning techniques can utilize radial basis functions (RBFs).

In some embodiments, the 3D model processing system 680 animates an avatar in the mixed reality environment in real-time to be interactive (with users of the MR system) and to provide appropriate, contextual avatar behavior (e.g., intent-based behavior) in the environment of the user. The system 680 may drive a layered avatar control system comprising a core skeletal hierarchy, which further drives a system of expressions, constraints, transforms (e.g., movement of vertices in 3D space such as translation, rotation, scaling, shear), etc. that control higher level deformations of the avatar (e.g., blendshapes, correctives) to produce a desired movement and expression of the avatar.

Realistically and Dynamically Rendering a Virtual Avatar

FIGS. 11A-11D illustrate example scenes of an avatar in various environments, where the virtual avatar may have an unnatural appearance or cause an unrealistic interaction. The avatar 1100 may be an avatar of Bob. As described with reference to FIG. 9B, the avatar 1100 may be animated based on Bob's characteristics including, e.g., intentions, poses, movements, expressions, or actions.

Figure 11A:
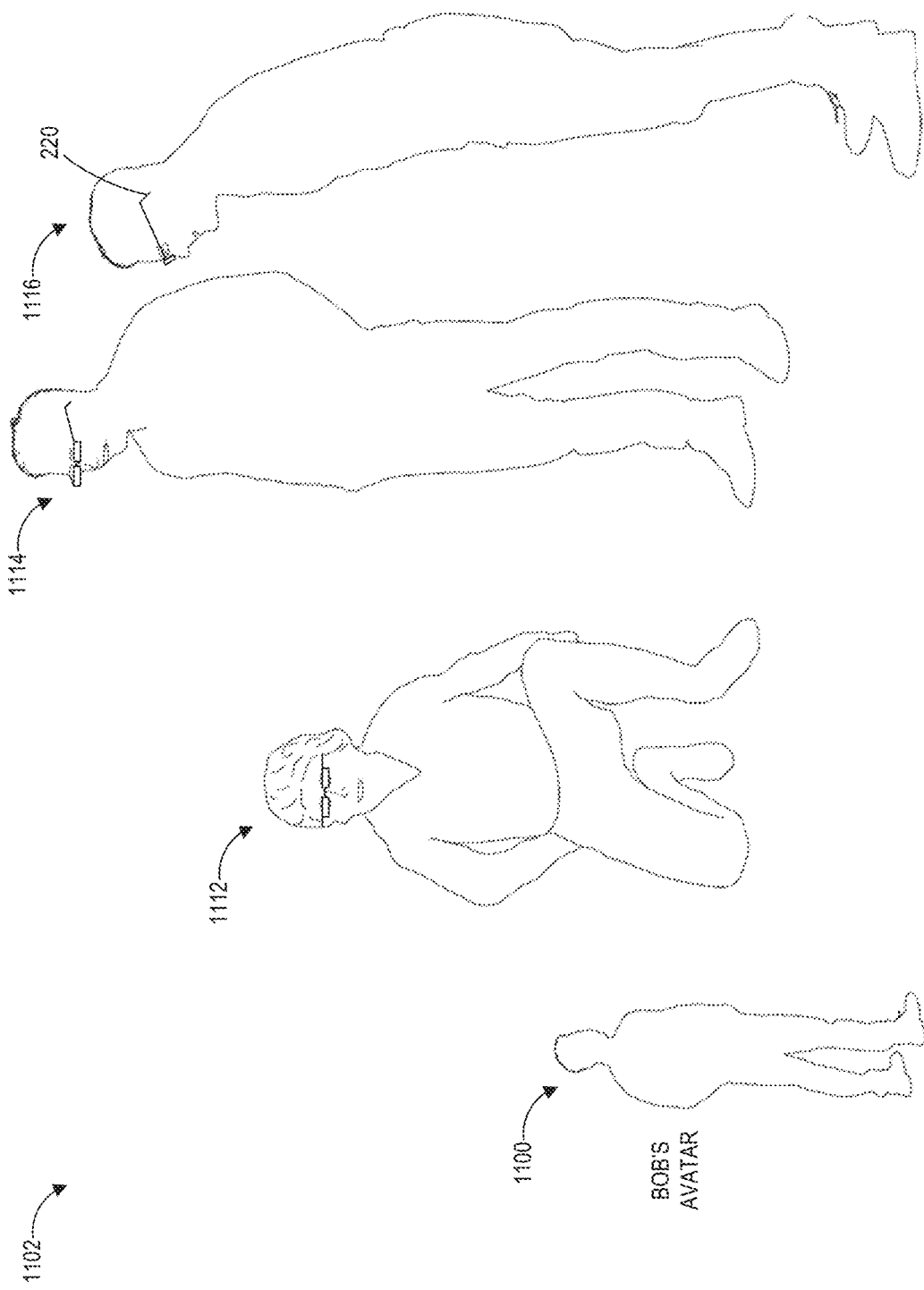

FIG. 11A illustrates an example scene 1102 where three users 1112, 1114, and 1116 are interacting with the avatar 1100 during a telepresence session. However, as shown in this example, Bob's avatar 1100 is relatively small compared to the three users 1112, 1114, and 1116, which may be lead to awkward interactions, because humans often feel most comfortable communicating with each other while maintaining eye contact and approximate eye height with each other. Thus, due to the difference in sight lines between the avatar and the three users, the three users may need to pose themselves at uncomfortable positions in order to look at the avatar 1100, or maintain (or alter) social dynamics in a conversation. For example, the user 1112 is kneeling down in order to look at the eyes of the avatar; the user 1114 is looking down at the avatar; and the user 1116 bends his body forward to engage in conversation with the avatar 1100. To reduce physical strain of a user caused by an improperly sized avatar, advantageously, in some implementations, the wearable system can automatically scale the avatar to increase or decrease the size of the avatar based on contextual information such as, e.g., the height level of the eyes of the other user. Such adjustment can be implemented in a manner that increases or maximizes direct eye contact between the avatar and the others, and therefore facilitates avatar-human communication. For example, the avatar can be scaled such that the wearable device can render the head of the avatar at a eye level of the viewer, and thus the user may not have to experience physical strain while interacting with the avatar. Detailed descriptions and examples of dynamically scaling an avatar based on contextual information are further described with reference to FIGS. 12A-13.

As described with reference to FIGS. 6B and 10, an avatar of a user can be animated based on characteristics of the user. However, a one-to-one mapping of the characteristics of the user into characteristics of an avatar can be problematic because it can create unnatural user interactions or convey the wrong message or intent of the user to a viewer.

Figure 11C:
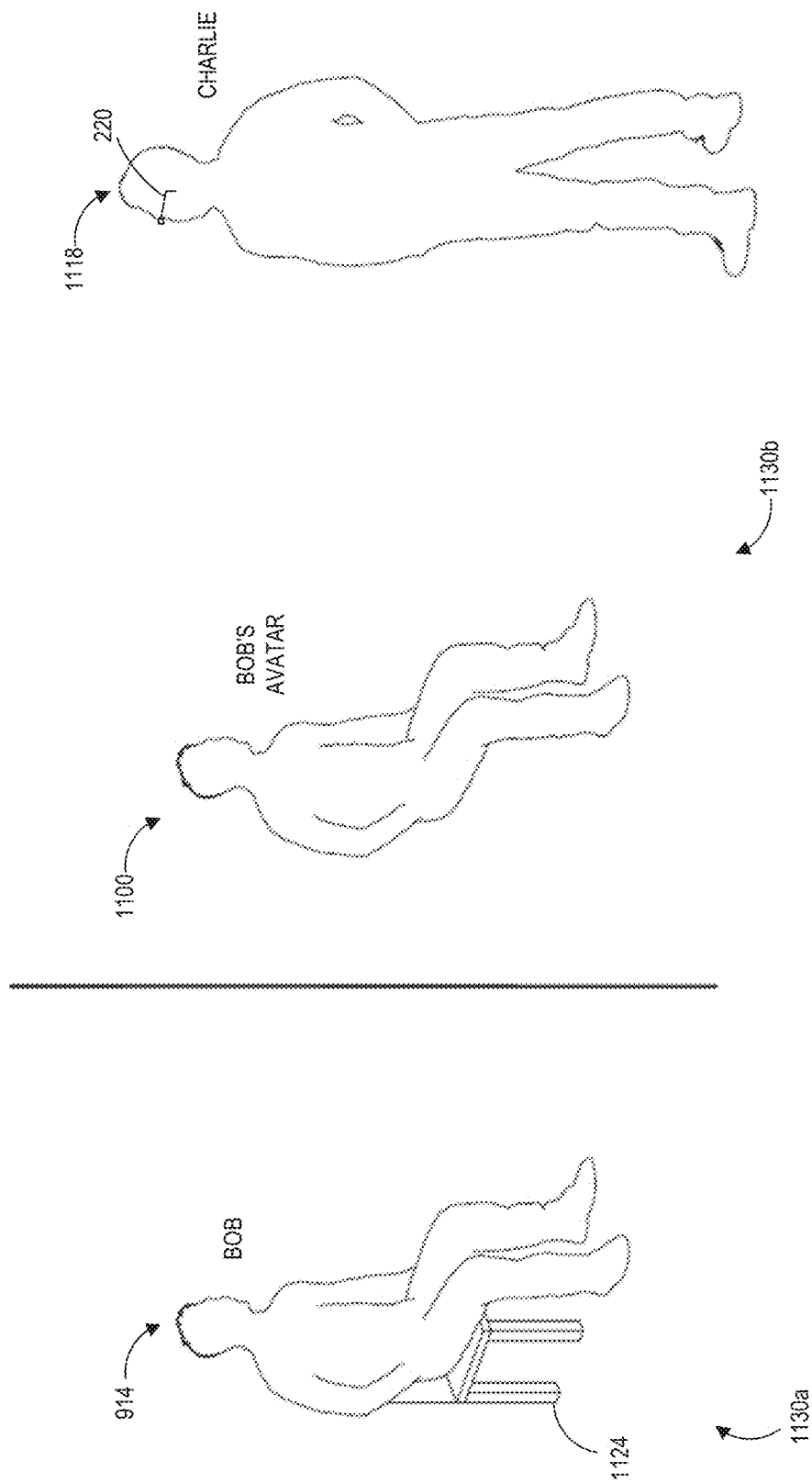

FIGS. 11B-11D illustrates some example scenarios where a one-to-one mapping (which animates between a user and an avatar) can create problems.

FIG. 11B illustrates a scene where Bob is talking to Charlie during a telepresence session. The scene in this figure includes two environments 1120a and 1120b. The environment 1120a is where Bob resides. The environment 1120b is where Charlie 1118 resides and includes a physical table 1122 with Charlie 1118 sitting on a chair next to the table 1122. Charlie 1118 can perceive, e.g., via the MR display system 210, Bob's avatar 1100. In the environment 1120a, Bob is facing west (as shown by the coordinate 1128). To animate Bob's avatar 1100, Bob's 914 characteristics are mapped as one-to-one to Bob's avatar 1100 in FIG. 11B. This mapping, however, is problematic because it does not take into account Charlie's environment and it creates an unnatural or unpleasant user interaction experience with the avatar 1100. For example, Bob's avatar is taller than Charlie 1118 because Charlie 1118 is sitting on a chair, and Charlie 1118 may need to strain his neck to maintain communication with Bob's avatar 1100. As another example, Bob's avatar 1100 is facing to the west because Bob is facing to the west. However, Charlie 1118 is to the east of Bob's avatar 1100. Thus, Charlie 1118 perceives the back of Bob's avatar and cannot observe Bob's facial expressions as reflected by Bob's avatar 1100. This orientation of Bob's avatar 1100 relative to Charlie may also convey an inaccurate social message (e.g., Bob does not want to engage with Charlie or Bob is angry at Charlie), even though Bob intends to be in a friendly conversation with Charlie.

FIG. 11C illustrates a scene where Bob's avatar 1100 is rendered without taking into account physical objects in Charlie 1118 environment. This scene illustrates two environments 1130a and 1130b. Bob is located in the environment 1130a and Charlie is in the environment 1130b. As illustrated, Bob is sitting on a chair 1124 in the environment 1130a. Due to one-to-one mapping of Bob's pose to Bob's avatar's pose that is illustrated in this example, Bob's avatar 1100 is also rendered with a sitting pose in Charlie's environment 1130b. However, there is no chair in Charlie's environment. As a result, Bob's avatar 1100 is rendered as sitting in mid-air which can create an unnatural appearance of Bob's avatar 1100.

FIG. 11D illustrates an example scene where one-to-one mapping causes unrealistic movement of a virtual avatar. The scene in FIG. 11D illustrates two environments 1140a and 1140b. Bob is moving eastbound in his environment 1140a. To map Bob's movement 1142 to the environment 1140b where Bob's avatar 1100 is rendered, Bob's avatar 1100 also moves eastbound (e.g., from position 1142a to position 1142b). However, the environment 1140b has a table 1126. By directly mapping Bob's 1142 movement to Bob's avatar's 1100 movement, Bob's avatar 1100 moves straight into the table and appears to be trapped in table 1126, which creates an unnatural and unrealistic movement and appearance of Bob's avatar 1100.

Advantageously, in some implementations, the wearable system 210 can be configured to render an avatar based on contextual information relating to the environment where the avatar is displayed or to convey the intent of a user (rather than a direct, one-to-one mapping), and thus may avoid unnatural or unrealistic appearances or interactions by an avatar. For example, the wearable system 210 can analyze the contextual information and Bob's action to determine the intent of Bob's action. The wearable system 210 can adjust the characteristics of Bob's avatar to reflect Bob's intent in view of Bob's action and contextual information about the environment in which Bob's avatar is to be rendered.

For example, with reference to FIG. 11B, rather than rendering the avatar 1100 facing westward, the wearable system 210 can turn the avatar around to face Charlie 1118 because Bob intends to converse with Charlie 1118 in a friendly manner, which normally occurs face-to-face. However, if Bob is angry at Charlie 1118 (e.g., as determined by the tone, content, volume of Bob's speech as detected by a microphone on Bob's system, or Bob's facial expression), the wearable system 210 can keep Bob's 914 orientation such that Bob faces away from Charlie 1118.

As another example, rather than rendering Bob's avatar 1100 sitting in mid-air (as shown in FIG. 11C), the wearable system 210 can automatically identify an object with a horizontal surface suitable for sitting (e.g., a bed or a sofa) in Charlie's environment and can render Bob's avatar 1100 as sitting on the identified surface (rather than in mid-air). If there is no place in Charlie's environment 1130b that Bob's avatar 1100 can sit (e.g., all chairs have been occupied by either human or other avatars or there are no sit-table surfaces), the wearable system may instead render Bob's avatar as standing or render a virtual chair for the virtual avatar to sit in.

As yet another example, with reference to FIG. 11D, rather than rendering Bob's avatar as walking into or through the table, the wearable system can detect the presence of the table 1126 as an obstacle on the route of Bob's avatar in the environment 1140b (e.g., based on a world map 910 of the environment 1140b or based on images acquired by the outward-facing imaging system 464 of a wearable device of a viewer in the environment 1140b). The wearable system 210 can accordingly reroute the avatar 1100 to circumvent the table 1126 or to stop prior to the table.

Examples of Intent Based Rendering of a Virtual Avatar

As described with reference to FIGS. 11B-11D, the one-to-one mapping of a user interaction (such as, e.g., a head or body pose, a gesture, movement, eye gaze, etc.) into an avatar action can be problematic because it may create awkward or unusual results that do not make sense in the environment where the avatar is rendered. Advantageously, in some embodiments, the wearable system 210 can determine which part of an interaction is a world component (e.g., movements or interactions with an object of interest) that may be different in a remote environment, and which part of the interaction is a local component which does not require interactions with the environment (such as, e.g., nodding yes or no). The wearable system 210 (such as, e.g., the avatar processing and rendering system 690 or the intent mapping system 694) can decompose a user interaction into two parts: the world component and the local component. The world component can be rendered (for an avatar) in the environment of the other user based on the intent of the user such that the intent of the world component is preserved but the action of the avatar for carrying out the intent may be modified in the environment of the other user (e.g., by walking on a different route, sitting on a different object, facing a different direction, etc.). The local component can be rendered as a backchannel communication such that the local motion is preserved.

As an example, Alice may be actively moving around in her environment, the wearable system may convey some of her translational motion to Bob's environment (in which Alice's avatar is rendered). The wearable system can re-interpret Alice's movement in Alice's world frame to match the motion in Bob's world frame as suggested by the intent of the user. For example, Alice may walk forward toward Bob's avatar in Alice's environment. Decomposing intent from Alice's and Bob's head poses can allow a wearable system to determine which direction is "forward" in each of Alice's and Bob's environments. As another example, if Alice walks to a chair and sits down, it will look unusual if there is no chair in Bob's environment and Alice's avatar is suddenly sitting in mid-air. The wearable system can be configured to focus on the intent of Alice's motion (sitting), identify a "sit-able" surface in Bob's environment (which may be a chair, sofa, etc.), move Alice's avatar to the sit-able surface, and render the avatar as sitting on the sit-able surface, even if the physical location, height of the sit-table surface in Bob's environment is different than the one Alice sits in. As another example, Alice may be looking down at Bob's avatar, while in the remote environment, Bob may be looking up at Alice's avatar.

In certain implementations, such remapping of intent can occur in real-time (e.g., when two users are conducting a telepresence session) the human counterpart of the avatar performs the interaction. In other situations, the remapping may not occur in real-time. For example, an avatar may serve as a messenger and delivers a message to a user. In this situation, the remapping of the avatar may not need to occur at the same time as the message is crafted or sent. Rather, the remapping of the avatar can occur when the avatar delivers the message (such as, e.g., when the user turns on the wearable device). The remapping may cause the avatar to look at the user (rather than a random location in the space) when delivering the message. By rendering the world motion based on the intent, the wearable system can advantageously reduce the likelihood of unnatural human-avatar interactions.

Examples of Scaling a Virtual Avatar Based on Contextual Information

As described with reference to FIG. 11A, an improperly scaled avatar can result in physical strain for a viewer of the avatar and may increase the likelihood of an inappropriate social interaction between the avatar and the user. For example, improperly scaling an avatar may incur discomfort or pain (e.g., neck pain) for a user (e.g., because the user has to look up or look down at the avatar). Such improper scaling may also provide for an awkward social dynamic for a user. As an example, an improperly sized avatar (e.g., an avatar shorter than the viewer) may be rendered as looking at an improper or inappropriate region of the body of the viewer. As another example, differing sight lines or eye levels between the user and the avatar may improperly imply social inferiority or superiority.

For example, in friendly conversations, the eyes of a user are typically directed toward a region called the social triangle of the face of the other user. The social triangle is formed with a first side on a line between the eyes of the user and a vertex at the mouth of the user. Eye contact within the social triangle is considered friendly and neutral, whereas eye gaze directed outside the social triangle can convey a power imbalance (e.g., eye gaze directed above the social triangle, toward the forehead of the other person), anger, or that the conversation is serious. Thus, an avatar rendered taller than the viewer may be tend to be viewed as looking at a region above the social triangle of the viewer, which can create a psychological effect for the viewer that the avatar is superior to the viewer. Thus, incorrect-sizing of the avatar can lead to awkward or unpleasant encounters between a human and an avatar that were not intended between the actual human participants of the conversation.

In some wearable devices, a user can manually scale an avatar so that the size of the avatar is at a comfortable height. However, such manual control may take more time to complete and require the user to make refined adjustments to the avatar, which can cause muscle fatigue of a user and require more expert control from the user. Other wearable devices may use scaling methods that seek to maintain a 1:1 scale between the avatar and the user (e.g., an avatar is automatically scaled at the same height as the user). However, this technique can produce inappropriate sight lines if the avatar is standing on a surface higher than the surface on which the user is sitting or standing (e.g., where the avatar looks over the head of the user).

Advantageously, in some embodiments, the wearable system 210 can automatically scale the virtual avatar based on contextual information regarding the rendering position of the avatar in the environment and the position or eye-height of the user in the environment. The wearable system 210 can calculate the size of the virtual avatar based on contextual factors such as, e.g., the rendering location of the avatar, the position of the user, the height of the user, the relative positions between the user and the avatar, the height of surface that the avatar will be rendered on, the height of the surface the user is standing or sitting on, alone or in combination. The wearable system 210 can make the initial rendering of the avatar (called spawning) such that the avatar is rendered with the appropriate height based at least in part on such contextual factors. The wearable system 210 can also dynamically scale the size of the virtual avatar in response to a change in the contextual information, such as, e.g., as the avatar or the user moves around in the environment.

For example, prior to or at the time of spawning an avatar, the wearable system can determine the head height of the user (and therefore the eye height, since the eyes are typically about halfway between top and bottom of the head or about 4 to 6 inches below the top of the head) and compute a distance from the base surface of the avatar (e.g., the surface that the avatar will be spawned on) to the eye height of the user. This distance can be used to scale the avatar so that its resulting head and sight lines are the same height as the user. The wearable system can identify environment surfaces (e.g., the surface the user is on or the surface the avatar will be spawned on) and adjust the avatar height based on these surfaces or the relative height difference between the user and avatar surfaces. For example, the wearable system can scan for the floor and measure the height of the head with respect to the floor plane. The wearable system can determine a head pose of the user (e.g., via data from IMUs) and compute environment surfaces relative to the head pose of the user or a common coordinate system shared by both the environment and the head pose. Based on this information, the wearable system can calculate a size of the avatar and instruct the display 213 to display the avatar as superimposed on the environment.

In certain implementations, as the user moves (or the avatar moves) around in the environment, the wearable system can continuously track the head pose of the user and environment surfaces and dynamically adjust the size of the avatar based on these contextual factors in a similar fashion as when the avatar is originally spawned. In some embodiments, these techniques for automatically scaling an avatar (either at spawning or in real-time as the avatar moves) can advantageously allow direct eye contact to be made while minimizing neck strain, facilitate user-avatar communication, and minimize the amount of manual adjustments a user needs to make when placing avatars in the local environment of the user, thereby allowing both participants (e.g., avatar and its viewer) to communicate eye-to-eye, creating a comfortable two-way interaction.

In some implementations, the wearable system 210 can allow a user to turn-off (temporarily or permanently) automatic, dynamic re-scaling of the avatar. For example, if the user frequently stands up and sits down during a telepresence session, the user may not wish the avatar to correspondingly re-scale, which may lead to an uncomfortable interaction since humans do not dynamically change size during conversations. The wearable system can be configured to switch among different modes of avatar scaling options. For example, the wearable system may provide three scaling options: (1) automatic adjustment based on contextual information, (2) manual control, and (3) 1:1 scaling (where the avatar is rendered as the same size as the viewer or its human counterpart). The wearable system can set the default to be automatically adjustable based on contextual information. The user can switch this default option to other options based on user inputs (such as, e.g., via the user input device 466, poses, or hand gestures, etc.). In other implementations, the wearable system may smoothly interpolate between size changes so that the avatar is rendered as smoothly changing size over a short time period (e.g., a few to tens of seconds) rather than abruptly changing size.

Examples of Spawning a Scaled Avatar

The wearable system can automatically scale an avatar based on contextual information to allow eye-to-eye communication between the avatar and a viewer. The calculation of the height of the avatar can be performed upon initial spawning of the avatar into the environment of the viewer. The wearable system can identify a rendering location of the avatar at the spawning site. The rendering location of the avatar can be a horizontal support platform (or surface), such as, e.g., a ground, table, a sitting surface of a chair, etc. In some situation, the support platform is not horizontal and may be inclined or vertical (if the user is laying down, for example).

The wearable system can calculate the height of the avatar based on the current head position of the user (regardless of whether the user is standing or sitting) and the location of the horizontal support platform at the spawning site for the avatar. The wearable system can compute the estimated height of eyes above this platform (which may be a distance perpendicular and vertical to the platform) for computing a scale factor for adjusting the size of the avatar. The estimated height of the eyes above the platform can be based on a distance between the eyes and the platform. In some implementations, the wearable system can compute an eye level which may be a 1 D, 2D, 3D, or other mathematical representations of a level where the eyes are looking straight ahead. The estimated height of the avatar can be calculated based on the difference between the eye level and the level of the platform.

Figure 12B:
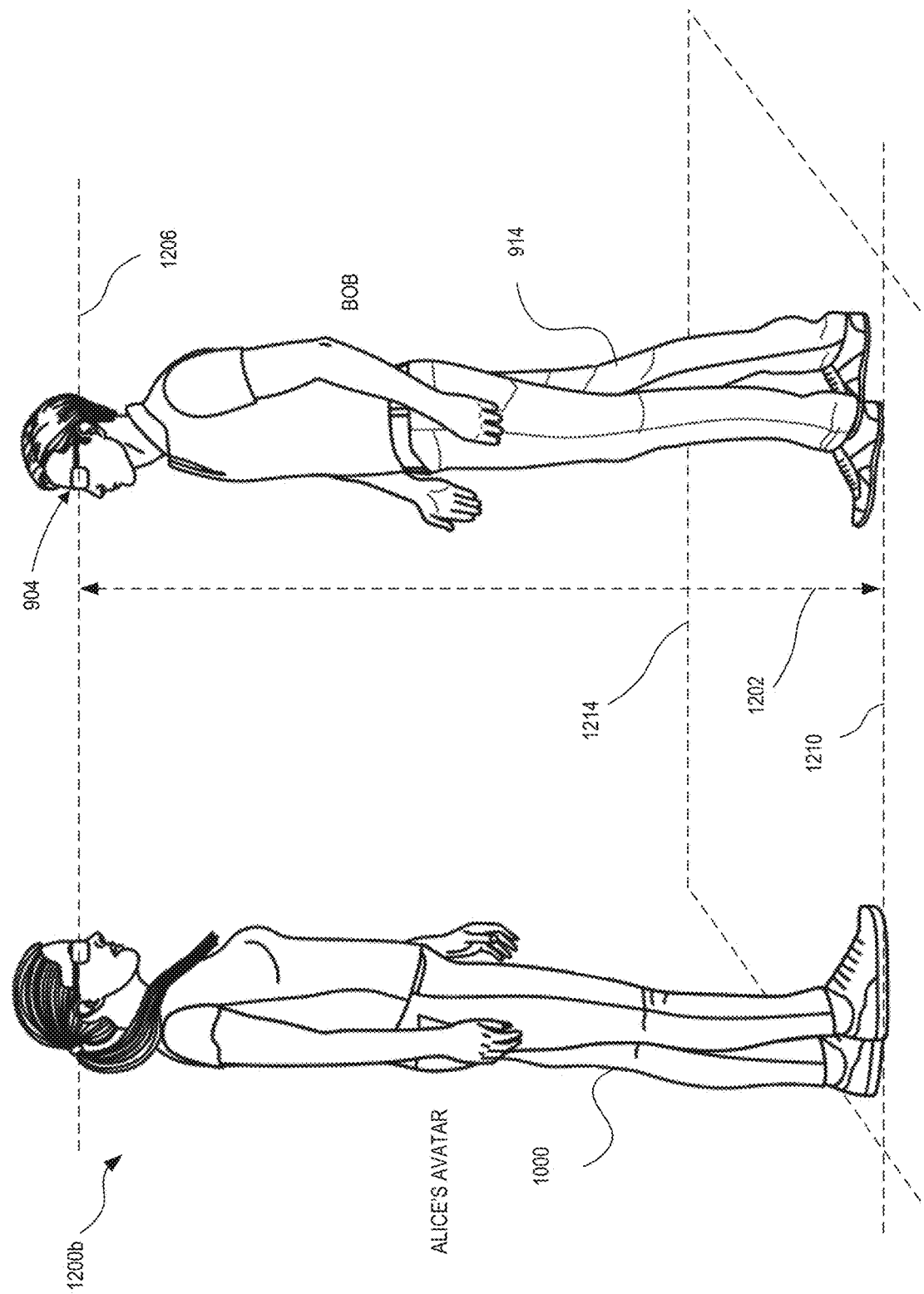

FIGS. 12A and 12B illustrate two scenes of scaling avatar, where the avatar is spawned on the same surface as the viewer. The scene 1200a in FIG. 12A shows an improperly scaled avatar while the scene 1200b in FIG. 12B shows a scaled avatar that maintains roughly the same eye height as the viewer. In these two figures, the example virtual avatar 1000 can be Alice's 912 avatar while the user 914 may be Bob as identified in FIG. 9B. Both Alice and Bob may wear the wearable device as described with reference to FIGS. 1A, 1C, 2A, 2C, 3, and 4. In these examples, Bob is standing on the ground (as represented by the ground plane 1214) while Alice's avatar 912 will also be spawned on the ground in this example.

FIG. 12A illustrates an example where Alice's avatar 1000 is too small such that the viewer (Bob) needs to look down when interacting with the Alice's avatar 1000. The height of Alice's avatar 100 and Bob can be measured from a common ground position line 1210, which may be part of the ground plane 1214. The ground position line 1210 may connect a position of the user 914 and a position of the virtual avatar 1000 along the ground plane 1214.

FIG. 12A also shows Bob's 914 eye level (as illustrated by the user eye line 1206) and the eye level of the avatar (as illustrated by the avatar eye line 1228), which is below Bob's eye level 1206. The avatar eye line 1228 and user eye line 1206 are shown as parallel to the ground position line 1210 and intersecting an eye of the virtual avatar 1000 and the user 914, respectively, but other types of eye lines or representations illustrating a line of sight are also possible in various implementations. Each of the user eye line 1206 and avatar eye line 1228 may correspond to respective planes (not shown) that encompass the corresponding eye line and that are parallel to the ground plane 1214. One or both of the user eye line 1206 and the avatar eye line 1228 may be parallel to the ground plane 1214.

To determine the size of the avatar, the wearable system (e.g., the avatar autoscaler 692 in the avatar processing and rendering system 690 of the wearable system 210) can calculate a height of the viewer 914 and a height 1224 of the avatar 1000. The height of the avatar and the height of the viewer can be measured from the avatar and the respective eye lines of the user vertically to the ground surface 1214 on which the avatar is rendered and on which the viewer stands. As illustrated in FIG. 12A, an avatar eye height 1224 may be determined between the avatar eye line 1228 and the ground position line 1210. Similarly, a user eye height 1202 may be determined between the user eye line 1206 and the ground position line 1210. The user eye height 1202 intersects the eye of the user 914 as illustrated in FIG. 12A, however, in other implementations, the user (or avatar) height may be referenced to the top of the head of the user (or avatar) or some other convenient reference position.

In certain implementations, the system may be configured to determine a distance 1242 between the user 914 and the rendering position of the virtual avatar 1000. The distance 1242 may be used to display the virtual avatar 1000 at a more comfortable position or apparent depth for the user 914. For example, the wearable system may increase the size of the avatar if the avatar is relatively far away from the viewer so that the viewer may have a better view of the avatar.

In the example shown in FIG. 12A, the avatar 1000 is not properly sized because the user eye line 1206 is not collinearly aligned with an avatar eye line 1228, since the avatar eye line 1228 is lower than the user eye line 1206. This suggests that the avatar 1000 is too small, causing Bob to tilt his head downward to interact with Alice's avatar. Although this shows that the avatar is shorter than the viewer, the avatar size may also be improper if the avatar is taller than the viewer, which would cause Bob to tilt his head upward to interact with Alice's avatar.

FIG. 12B shows a virtual avatar 1000 whose size is properly rendered relative to Bob in the sense that their respective eye heights are comparable. In this example, the virtual avatar 1000 is scaled based on the eye height of the viewer 914. Scaling the virtual avatar 1000 may include matching the avatar eye height 1224 and the user eye height 1202.

Examples of Analyzing Contextual Factors for Selection of Avatar Characteristics As described herein, the wearable system 210 can be configured to automatically identify contextual factors to calculate a target height for a virtual avatar for spawning the virtual avatar or for dynamically adjusting the size of the virtual avatar in real-time.

Figure 13:
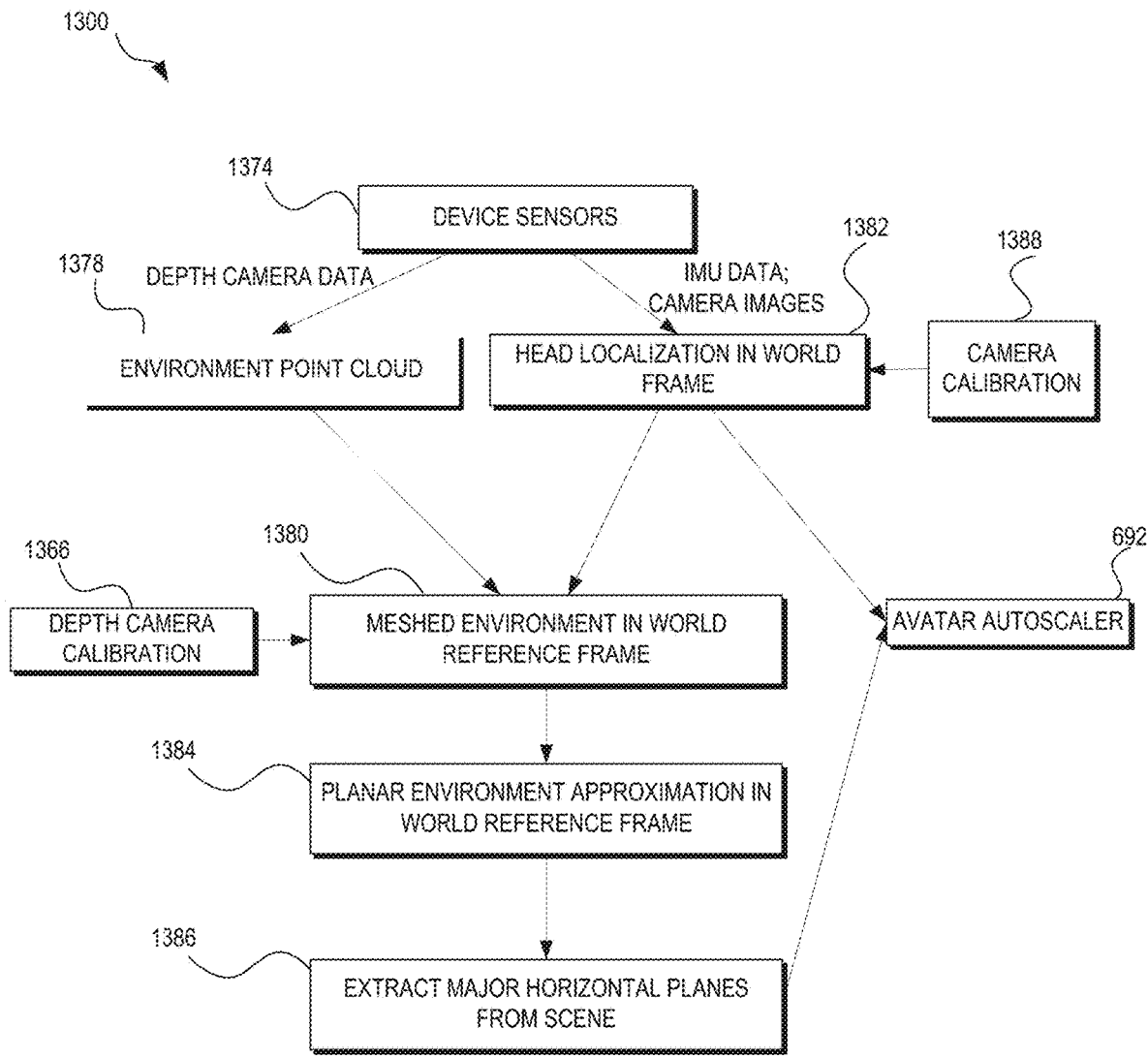
FIG. 13 illustrates an example data flow diagrams for automatically scaling the avatar based on contextual factors, according to some embodiments.

FIG. 13 illustrates an example data flow diagrams for automatically scaling the avatar based on contextual factors. Some example contextual factors can include the head position of the user, a rendering location of the avatar, a body position of the user (e.g., the foot position of the user), heights of surfaces the user and the avatar are positioned on (or a relative height difference between them), etc. The example data flow diagram 1300 can be implemented by the wearable system 210 described herein, for example, by the avatar autoscaler 692 of the avatar processing and rendering system 690 of FIG. 6B.

The wearable system can include one or more device sensors 1374, such as those described with reference to FIGS. 2A-2C, 3, and 4. The data acquired from the device sensors 1374 can be used to determine the environment of the user (e.g., to identify objects in the environment of the user or to detect surfaces in the environment of the user) as well as to determine the position of the user with respect to the environment.

For example, the IMUs can acquire user data such as, e.g., the head pose or body movements of the user. The outward-facing imaging system 464 can acquire images of the environment of the user. The data from the IMUs and the outward-facing imaging system 464 may be an input for determining head position. The wearable system can detect a position, orientation, or movement of the head with respect to a reference frame associated with the environment of the user (also referred to as a world frame). The reference frame may be a set of map points based on which the wearable system can translate the movement of the user to an action or command. In some implementations, camera calibration 1388 may be performed for determining the head localization 1382 in the world frame. The camera calibration 1388 may result in a mapping of a head pose of the user as determined from the IMUs (or other hardware sensors of a wearable device) to a head location in the world frame. As further described with reference to the avatar autoscaler 692, such head localization 1382 in the world frame can be fed into the avatar autoscaler 692 and can be utilized as an input for determining a head position 1304 of the user for automatically scaling an avatar.

The device sensors can include one or more depth sensors (e.g., lidar, time of flight sensors, or ultrasound sensors), or world cameras (which may be part of the outward-facing imaging system 464) where the world cameras have depth sensing ability (e.g., an RGB-D camera). For example, a depth sensor can acquire depth data of objects in the environment, such as, for example, how far away the objects are from the user. The depth data can be used to create an environment point cloud 1378 which can comprise 3D mathematical representations of the environment of the user (which may take into account objects in the environment of the user). This environment point cloud 1378 may be stored in (or accessed from) the map database 710 shown in FIG. 7.

The wearable system can identify major horizontal planes (such as, e.g., tabletops, grounds, walls, chair surfaces, platforms, etc.) based on the environment point cloud 1378. The major horizontal planes can include environment surfaces on which the user or the avatar may be positioned.

The wearable system can convert the point cloud to a meshed environment, such as, e.g., a polygon (e.g., triangle) mesh, and extract major horizontal planes from the mesh. In certain implementations, the wearable system can estimate planes directly from the point cloud without converting the cloud of points to a mesh. As an example of estimating planes directly from the point cloud, the wearable system can determine one or more depth points based on images acquired by the outward-facing imaging system alone or in combination with the depth sensors. The depth points may be mapped by the system onto a world reference frame (for representing the environment of the user). The depth points may correspond to one or more points in the environment of the user. The wearable system may be configured to extract one or more surfaces from the one or more depth points. The one or more surfaces extracted from the depth point(s) may include one or more triangles. Vertices of each of the one or more triangles may comprise neighboring depth points.

As shown in FIG. 13, with depth camera calibration 1388 the wearable system can convert this point cloud 1378 into meshed environment in a world reference frame (which can be used for head localization in block 1382) as shown in the block 1380. Depth camera calibration 1366 can include information on how to relate the positions of the point cloud obtained from the depth camera to positions in the frame of reference of the wearable system or the frame of reference of the environment. Depth camera calibration may be advantageous, because it can permit locating the points in the same reference frame as the environment and camera frames, so that the wearable system knows where those points are located in the working coordinate system.

The meshed environment may be a 3D meshed environment. The meshed environment may comprise one or more surface triangles. Each surface triangle may comprise vertices corresponding to adjacent depth points. The wearable system can be configured to construct a signed distance field function from the point cloud and use a triangulation algorithm, such as, e.g., the Marching Cubes algorithm to convert the point cloud into a surface representation of triangles, such as a polygon (e.g., triangle) mesh. In some embodiments, the surface representation can be determined directly from the point cloud rather than from the meshed environment.

At block 1384 the wearable system can approximate a planar environment in a world reference frame, which may include plane extractions from the mesh. Plane extractions can group the triangles into areas of similar orientation. Further processing can be done of these meshed areas (as identified from plane extractions) to extract pure planar regions representing flat areas in the environment.

At block 1386, the wearable system can perform further processing to extract major horizontal planes from the environment. The wearable system may be configured to determine major horizontal planes based on the orientation, size, or shape of the surfaces from the regions identified from block 1384. For example, the wearable system can identify horizontal surfaces that are large enough to allow a user or an avatar to stand on as the major horizontal planes. In some implementations, the wearable system can identify a major horizontal plane by finding a first intersection point of a ray with a physical horizontal surface whose normal at the intersection point is closely aligned to the gravity vector (which can be determined by an IMU on the wearable system).

Example Network Architecture for Colocation

Figure 14:
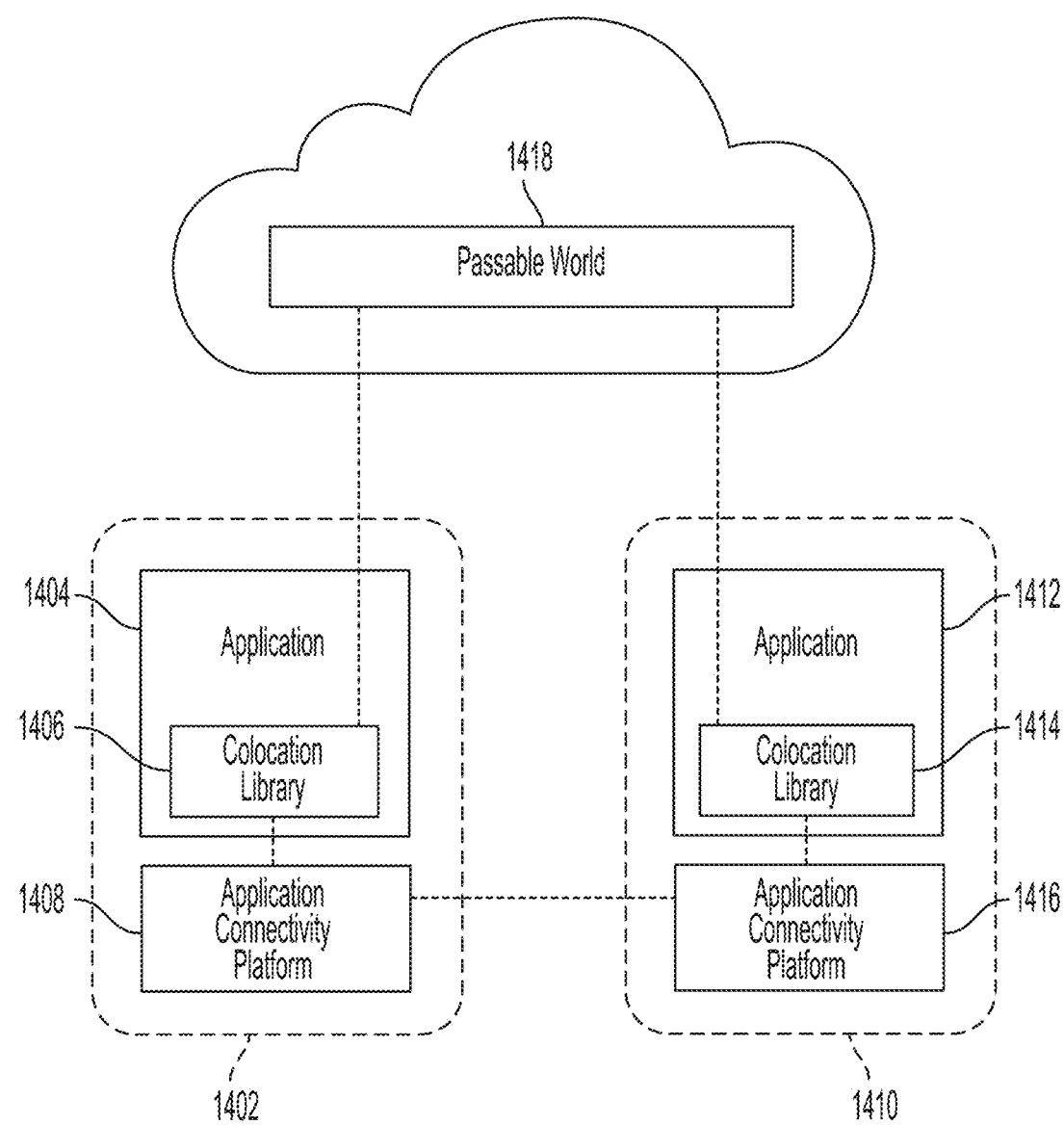
FIG. 14 illustrates an example network architecture for virtual object colocation, according to some embodiments.

FIG. 14 illustrates an example network architecture for virtual object (e.g., virtual avatar) colocation, according to some embodiments. MR system 1402 (e.g., head-mounted display MR system 210) may run and/or host application 1404 (e.g., including collaborative application 1710 as described with reference to FIG. 17). In some embodiments, application 1404 may include colocation library 1406. In some embodiments, colocation library 1406 can be configured to receive persistent coordinate data (e.g., a unique identifier for a particular persistent coordinate system) from a remote server and/or from MR systems in a colocation session. In some embodiments, colocation library 1406 can be configured to broadcast persistent coordinate data (e.g., persistent coordinate systems in use by host MR system 1402) to other MR systems in a colocation session. In some embodiments, colocation library 1406 can compare persistent coordinate data received from other MR systems in a colocation session with persistent coordinate data in use by a host MR system to determine if common persistent coordinate systems exist. In some embodiments, colocation library 1406 can be a client of passable world service 1418, which may run in a remote server. In some embodiments, passable world service 1418 may store canonical persistent coordinate systems and/or receive observed persistent coordinate systems and unify observations with corresponding canonical persistent coordinate systems. In some embodiments, colocation library 1406 may receive canonical persistent coordinate systems in use by host MR system 1402 from passable world service 1418. In some embodiments, passable world service 1418 can run locally as a background service on a host MR system.

Colocation library 1406 can be configured to execute a process, which may run in a run-time environment. In some embodiments, colocation library 1406 can be configured to execute a sub-process of a parent process. In some embodiments, colocation library 1406 can be configured to execute a thread of a parent process. In some embodiments, colocation library 1406 can be configured to operate a service (e.g., as a background operating system service). In some embodiments, a process, sub-process, thread, and/or service executed by colocation library 1406 can be configured to continually run (e.g., in the background) while an operating system of a host system is running. In some embodiments, a service executed by colocation library 1406 can be an instantiation of a parent background service, which may serve as a host process to one or more background processes and/or sub-processes. In some embodiments, colocation library 1406 may be distributed among and/or execute on a plurality of systems. In some embodiments, each component of colocation library 1406 may execute in parallel, sequentially, or in any combination of the two or more systems of the plurality of systems.

In some embodiments, colocation library 1406 can receive persistent coordinate data from other MR systems via application connectivity platform 1408 (e.g., colocation library 1406 can be a client of application connectivity platform 1408). In some embodiments, application connectivity platform 1408 can provide a low-latency communication pathway between MR systems in a colocation session to enable real-time virtual object colocation. In some embodiments, application connectivity platform 1408 can include one or more implementations of Web Real-Time Communication ("WebRTC"). For example, data may be transmitted via one or more Twilio tracks for low-latency communication.

Application connectivity platform 1408 can be configured to execute a process, which may run in a run-time environment. In some embodiments, application connectivity platform 1408 can be configured to execute a sub-process of a parent process. In some embodiments, application connectivity platform 1408 can be configured to execute a thread of a parent process. In some embodiments, application connectivity platform 1408 can be configured to operate a service (e.g., as a background operating system service). In some embodiments, a process, sub-process, thread, and/or service executed by application connectivity platform 1408 can be configured to continually run (e.g., in the background) while an operating system of a host system is running. In some embodiments, a service executed by application connectivity platform 1408 can be an instantiation of a parent background service, which may serve as a host process to one or more background processes and/or sub-processes. In some embodiments, application connectivity platform 1408 may be distributed among and/or execute on a plurality of systems. In some embodiments, each component of application connectivity platform 1408 may execute in parallel, sequentially, or in any combination of the two or more systems of the plurality of systems.

In some embodiments, host MR system 1410 (e.g., head-mounted display MR system 210) may be in a colocation session with host MR system 1402. In some embodiments, host MR system 1402 may run application 1412 (e.g., collaborative application 1710), which may be a separate but identical instantiation of application 1404. In some embodiments, application 1412 may include colocation library 1414, which may be configured to receive persistent coordinate data from a remote server and/or from other MR systems in a colocation session. In some embodiments, colocation library 1414 can be configured to broadcast persistent coordinate data (e.g., persistent coordinate systems in use by host MR system 1410) to other MR systems in a colocation session. In some embodiments, colocation library 1414 may utilize application connectivity platform 1416 to send and/or receive low-latency colocation data (e.g., relational transform data as a colocated virtual object moves) from MR systems in a colocation session. In some embodiments, application connectivity platform 1416 can be configured to communicate with other application connectivity platforms running on other MR systems (e.g., application connectivity platform 1408).

Example Virtual Object Colocation Process

Figure 15:
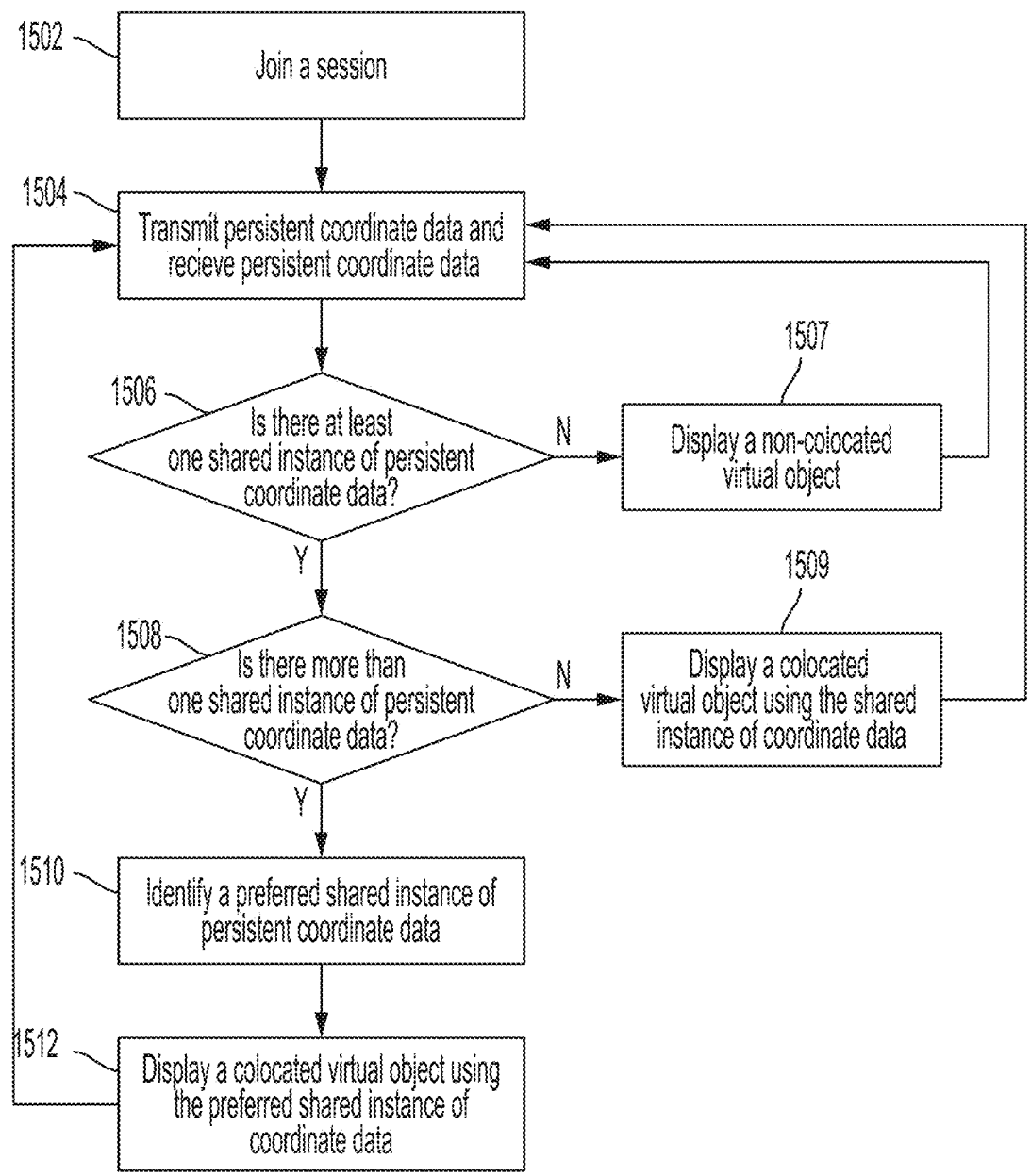
FIG. 15 illustrates an example process for colocating virtual content, according to some embodiments.

FIG. 15 illustrates an exemplary process for colocating virtual content (e.g., virtual avatars) via an MR system (e.g., head-mounted display MR system 210). At block 1502, an MR system joins a colocation session. In some embodiments, an MR system may be invited to join an existing colocation session. In some embodiments, an MR system may initiate a colocation session.

At block 1504, an MR system transmits persistent coordinate data and receives persistent coordinate data. In some embodiments, an MR system may transmit persistent coordinate data (and/or relational data) to other MR systems in a colocation session. In some embodiments, an MR system may transmit persistent coordinate data (and/or relational data) to one or more remote servers, which may transmit the data to other MR systems in a colocation session. In some embodiments, an MR system may receive persistent coordinate data (and/or relational data) from one or more MR systems in a colocation session. In some embodiments, an MR system may receive persistent coordinate data (and/or relational data) corresponding to one or more MR systems from one or more remote servers.

At block 1506, an MR system determines if at least one shared instance of persistent coordinate data exists. For example, a first MR system may compare persistent coordinate data received from other MR systems against persistent coordinate data corresponding to the first MR system (which may have been transmitted at block 1504). In some embodiments, each instance of persistent coordinate data may include a unique identifier, and unique identifiers may be compared. In some embodiments, any MR systems that recognize their location as a previously mapped room may receive persistent coordinate data corresponding to that room. In some embodiments, any MR systems in the same room may share at least one instance of persistent coordinate data.

If no shared instances of persistent coordinate data exist between the received persistent coordinate data and the transmitted persistent coordinate data (e.g., an MR system is not in the same room as other MR systems), at block 1507 a non-colocated virtual object may be displayed. In some embodiments, a non-colocated virtual object may be an object whose movement may not be reflected for other MR systems in a colocation session.

If at least one shared instance of persistent coordinate data is identified, at block 1508 it can be determined if more than one shared instances of persistent coordinate data can be identified. For example, a first MR system may be located in the same room as a second MR system, and the room may include two or more instances of persistent coordinate data. In some embodiments, the first and second MR systems may therefore have two or more instances of shared persistent coordinate data.

If it is determined that only one shared instance of persistent coordinate data exists, at block 1509 a colocated virtual object may be displayed using the shared instance of persistent coordinate data. For example, a first and second colocated MR system may both display the colocated virtual object relative to the shared instance of persistent coordinate data. In some embodiments, the first and second colocated MR systems may use the same relational data (e.g., a transformation matrix) to relate a position (e.g., a location and/or an orientation) of the virtual object to the shared instance of persistent coordinate data.

If it is determined that more than one shared instance of persistent coordinate data exists, at block 1510 a preferred shared instance of persistent coordinate data can be identified. In some embodiments, an instance of persistent coordinate data closest to an MR system may be considered a preferred instance of shared persistent coordinate data. For example, a first and second colocated MR system may be located in the same room. In some embodiments, the room may include a first and second instance of persistent coordinate data, and both instances may be shared across the first and second MR systems (e.g., because they are in the same room). In some embodiments, the first MR system may be closer to the first instance of persistent coordinate data, and the second MR system may be closer to the second instance of persistent coordinate data. In some embodiments, a closer instance of persistent coordinate data may display virtual content more accurately than a farther instance of persistent coordinate data.

At block 1512, colocated virtual content may be displayed using a preferred instance of shared persistent coordinate data. In some embodiments, each MR system may display colocated virtual content relative to its preferred (e.g., closest) instance of shared persistent coordinate data. In some embodiments, although different instances of shared persistent coordinate data may be used, the colocated virtual content may appear in the same spot to users of the first and second MR systems (e.g., because different relational data may be used to present the object in the same location).

After block 1507, 1509, and/or 1512, an MR system may return to block 1504, which may enable dynamic colocation. For example, an MR system may continually monitor whether it shares persistent coordinate data with other MR systems in a colocation session. In some embodiments, an MR system may poll persistent coordinate data once every ten seconds if the MR system does not recognize its current location. In some embodiments, an MR system may poll persistent coordinate data once every thirty seconds if the MR system recognizes its current location. In some embodiments, a trigger (e.g., a geofencing trigger) may cause an MR system to poll persistent coordinate data.

Example Connection Process for a Colocation Session

Figure 16:
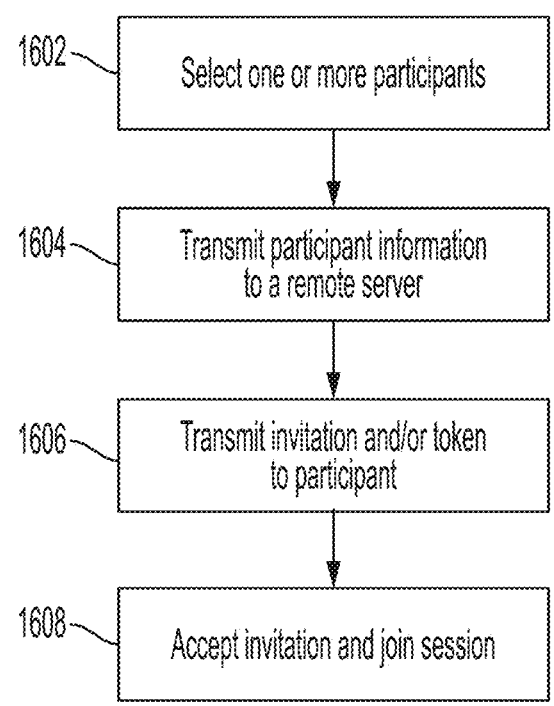
FIG. 16 illustrates an example process for connecting with one or more MR systems to initiate a colocation session, according to some embodiments.

FIG. 16 illustrates an exemplary process for connecting with one or more MR systems (e.g., head-mounted display MR system 210) to initiate a colocation session, according to some embodiments. In some embodiments, a process for connecting with one or more MR systems may utilize an application connectivity platform (e.g., application connectivity platform 1408 of FIG. 14). At block 1602, one or more colocation session participants (e.g., MR system users) are selected. In some embodiments, one or more participants may be selected using a user interface of an application (e.g., application 1404, collaborative application 1710).

At block 1604, participant information is transmitted to a remote server. In some embodiments, an application (e.g., application 1404, collaborative application 1710) may transmit participant information to an application connectivity platform (e.g., application connectivity platform 1408). In some embodiments, the application connectivity platform may transmit participant information to a remote server. In some embodiments, a remote server may begin a session.

At block 1606, a remote server transmits an invitation and/or a token (e.g., an authentication token) to one or more participants based on the participant information. In some embodiments, a remote server may transmit an invitation and/or a token to an application connectivity platform running on an invited MR system (e.g., application connectivity platform 1416). In some embodiments, the application connectivity platform may communicate with an application (e.g., application 1412, collaborative application 1710). In some embodiments, an application running on an invited MR system may indicate to a user that the user has been invited to a colocation session.

At block 1606, an invitation to join a colocation session is accepted, and a user and/or an MR system joins the colocation session. In some embodiments, a user may accept an invitation using a user interface (e.g., of application 1412, collaborative application 1710). In some embodiments, the application may indicate to an application connectivity platform (e.g., application connectivity platform 1416) that the invitation has been accepted. In some embodiments, the application connectivity platform may join the colocation session (e.g., by using a provided authentication token). In some embodiments, once one or more participants have joined a session, one or more pipes (e.g., Twilio tracks) may be created. In some embodiments, a pipe may be permissioned. For example, only designated users may transmit data using a permissioned pipe. In some embodiments, any user may transmit and/or receive data along a pipe. In some embodiments, one or more pipe can be reserved for specific types of data (e.g., a pipe for audio, video, and/or generic data).

Example System for Colocation and Audiovisual Presence Transitions

Figure 17:
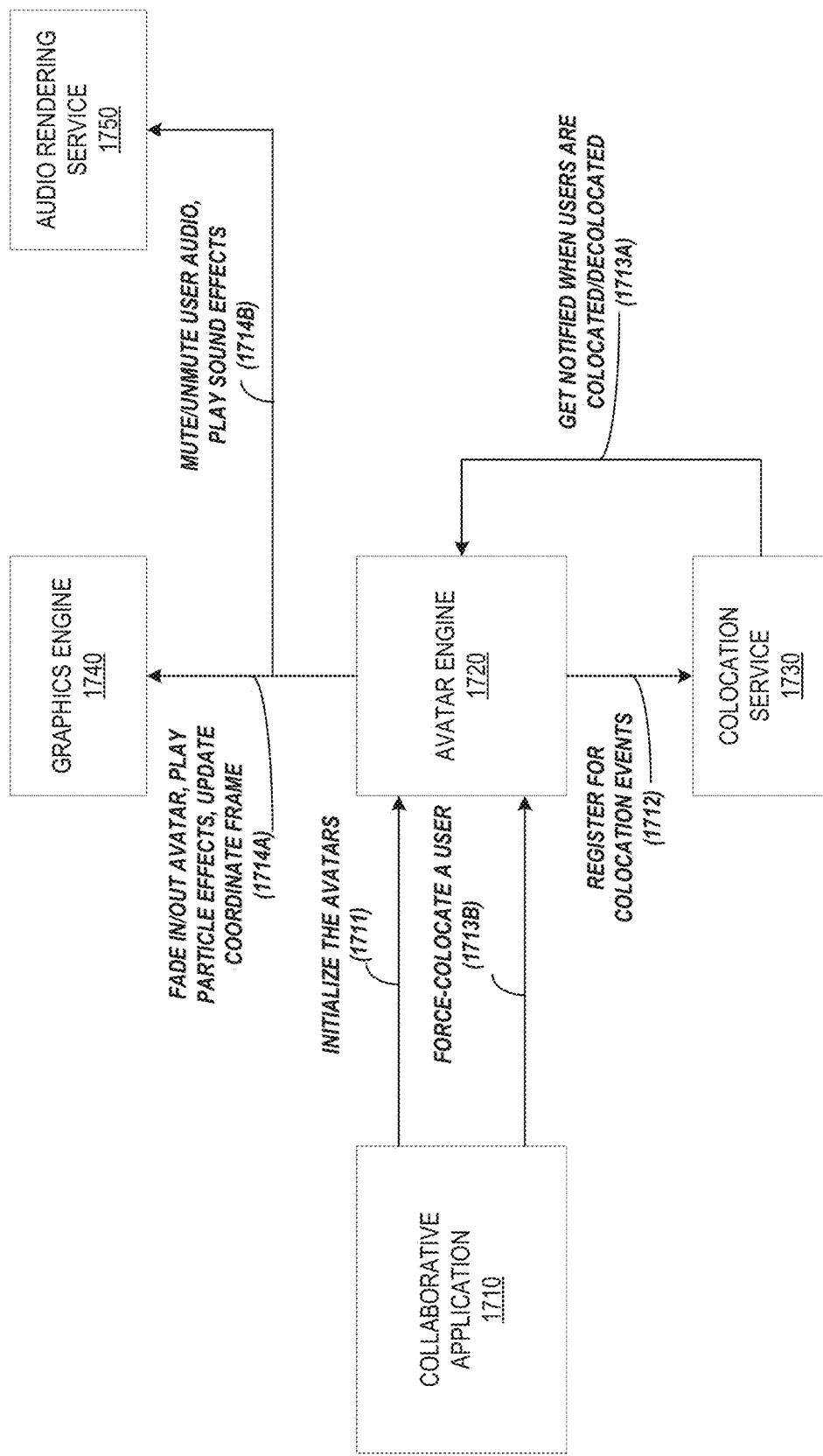
FIG. 17 is a flow chart of an example mixed reality system performing audiovisual presence transitions, according to some embodiments.

FIG. 17 illustrates an example flow diagram of a MR system (e.g., head-mounted display MR system 210) for performing audiovisual presence transitions, according to some embodiments as described herein (e.g., the audiovisual presence transitions as described with reference to FIGS. 18A-18G). The MR system may provide mixed reality collaboration that supports both avatar-mediated and physically copresent users. The MR system may include components for avatar animation, user sensing, graphics rendering, audio rendering, session management, networking, among other components as described herein.

The flow diagram of the MR system focuses on components relevant to colocation and audiovisual presence. However, the MR system is not intended to be limited to only components relevant to colocation and audiovisual presence. In this example implementation, the MR system includes a collaborative application 1710, a colocation service 1730, an avatar engine 1720, a graphics engine 1740, and an audio rendering service 1750. The collaborative application 1710 may implement a user interface, MR session initialization, MR session shutdown, force colocation or decolocation, and/or application specific collaboration logic. The colocation service 1730 may notify other components of the MR system (e.g., avatar engine 1720) when another user has become colocated or decolocated with the current user. The avatar engine 1720 may create, delete, and/or animate avatars related to users in the MR session. Audiovisual presence transitions may also be implemented via avatar engine 1720. The graphics engine 1740 may render the avatars and particle effects surrounding and/or a part of the avatars. The audio rendering service 1750 may account for sound playback such as sound effects, musical tones, noise, songs or the like.

Referring to FIG. 17, action 1711 indicates that the collaborative application 1710 initializes the avatar engine 1720 and the virtual avatars representing each MR user. At action 1712, the avatar engine 1720 registers for colocation events with the colocation service 1730. These colocation events help the MR system detect when MR users are physically copresent and ensure the instances of the collaborative application 1710 for each MR user employs a shared coordinate frame for the placement of the virtual avatars and shared virtual content. After action 1712, the MR system receives notifications at action 1713A when the user becomes colocated and/or decolocated with another user.

In some embodiments, the colocation and/or decolocation may be established automatically via the MR system and then the colocation service 1730 notifies the avatar engine 1720 (e.g., action 1713A). In some embodiments, the user manually flags another user as colocated and/or decolocated, such as by providing an indication via an MR headset to the collaborative application 1710, to force colocate and/or decolocate the user and then the collaborative application 1710 notifies the avatar engine 1720 (e.g., action 1713B). In some embodiments, the manual flagging may be achieved by having each MR user drag a virtual handle to an agreed-upon location in the physical space. In some embodiments, the manual flagging may be achieved by employing image registration (e.g., point cloud registration and/or scan matching) with a fiducial marker.

Depending on the colocation and/or decolocation scenario, avatar engine 1720 executes the appropriate audiovisual transitions on the avatars involved (e.g., actions 1714A and/or 1714B) and invokes the appropriate functionalities of the graphics engine 1740 and the audio rendering service 1750. For example, transition effects handled by graphics engine 1740 may include fading the avatars in (e.g., to full opacity) or out (e.g., to no opacity), showing or hiding the avatars, rendering materialization or dematerialization particle effects, and rigidly transforming (e.g., translating, rotating, and/or scaling) the avatar to handle coordinate frame changes. Transition effects handled by audio rendering service 1750 may include muting or unmuting user audio, and rendering materialization or dematerialization sound effects.

Example Audiovisual Presence Transitions and Effects

As described herein, the avatar engine 1720 executes various audiovisual transitions (e.g., actions 1714A and/or 1714B) on one or more virtual avatars. There are a plurality of scenarios where MR users may become colocated and/or decolocated as described herein. Depending on the scenario presented, the avatar engine 1720 of the MR system (e.g., MR system 210) may produce one or more of the following three types of audiovisual presence transitions to the MR user and/or avatar: (1) disappearance, (2) appearance, and (3) reappearance. A table that specifies examples of how these audiovisual effects may be employed for each transition and outlines the scenarios in which the audiovisual transitions and effects occur is presented:

| Transition | Effects | Scenario |
|---|---|---|
| Disappearance | (1) Mute user audio<br>(2) Fade out the avatar<br>(3) Play dematerialization particle effect<br>(4) Play dematerialization sound effect<br>(5) Hide the avatar<br>(6) Transform the avatar to the new location | MR users A and B become colocated. Each user observes the other's avatar disappear and their voice audio becomes muted. |
| Appearance | (1) Show the avatar<br>(2) Unmute user audio<br>(3) Play materialization particle effect<br>(4) Play materialization sound effect<br>(5) Fade in the avatar | MR users A and B are initially colocated and they become decolocated. Their respective avatars appear and they can hear each other's voice audio. |
| Reappearance (Example 1) | (1) Fade out the avatar<br>(2) Play dematerialization particle effect<br>(3) Play dematerialization sound effect<br>(4) Hide the avatar<br>(5) Transform the avatar to the new location<br>(6) Show the avatar<br>(7) Play materialization particle effect<br>(8) Play materialization sound effect<br>(9) Fade in the avatar | MR users A, B, and C are remote. MR users A and B become colocated. The coordinate frame of MR user B changes so it matches that of MR user A. MR user C observes the avatar of MR user B disappear from its old |

| Transition | Effects | Scenario |
| --- | --- | --- |
| | | location and reappear in the new location. MR user B observes the same for the avatar of MR user C. |
| Reappearance (Example 2) | (1) Clone the avatar<br>(2) Hide the cloned avatar<br>(3) Transform the cloned avatar to the new location<br>(4) Fade out the original avatar<br>(5) Play dematerialization particle effect on the original avatar<br>(6) Play dematerialization sound effect on the original avatar<br>(7) Show the cloned avatar<br>(8) Play materialization particle effect on the cloned avatar<br>(9) Play materialization sound effect on the cloned avatar<br>(10) Fade in the cloned avatar<br>(11) Destroy the original avatar | MR users A, B, and C are remote. MR users A and B become colocated. The coordinate frame of MR user B changes so it matches that of MR user A. MR user C observes the avatar of MR user B disappear from its old location and reappear in the new location. MR user B observes the same for the avatar of MR user C. |

From left to right for each row, the table describes a transition, followed by example processes associated with the transition, as well as example details regarding the effect that may be shown during the transition and an example scenario of the transition. In some embodiments, the processes associated with the transition in the "effects" column may be executed in sequential order, such as by the avatar engine 1720 and/or other components of an MR system. In some embodiments, some or all of processes of the transition in the "effects" column may be executed in parallel, or substantially concurrently, such as by the avatar engine 1720 and/or other components of an MR system. For example, in some implementations of the disappearance transition, processes 1-4 may be executed in parallel followed by processes 5-6 executed sequentially. As another example, in some implementations of the appearance transition, processes 1-5 may be executed in parallel. In some example implementations of the first reappearance example transition, processes 1-3 may be executed in parallel, then processes 4-5 may be executed sequentially, and lastly processes 6-9 may be executed in parallel. In some example implementations of the second reappearance example transition, processes 1-3 may be executed in parallel, then processes 4-10 may be executed in parallel, and lastly process 11 may be executed. In other implementations, other sets of processes may be performed concurrently or separately to achieve the goals of the MR system.

In some embodiments, the ordering of processes and sequential vs. parallel execution of the processes by the avatar engine 1720 may be important to the behavior, look, and feel of the audiovisual transition. For example, transforming the avatar should be done after the avatar has faded out and become hidden, otherwise the MR users will see the avatar abruptly jump from one location to another. In some embodiments, effects may have a temporal duration that can be adjusted depending on the desired aesthetics.

In some embodiments, effects may be instantaneous or have no predetermined duration (e.g., particle effects, which are physically simulated). In some embodiments of the disappearance transition, fading out the avatar to no opacity (e.g., process 2) may take from 0.5 to 2.5 seconds, or in a particular implementation, 1.06 seconds. In some embodiments of the appearance transition, fading in the avatar to full opacity (e.g., process 5) may take from 0.2 to 2.0 seconds, or in a particular implementation, 0.4 seconds. In some embodiments of the first reappearance example transition, fading out the avatar to no opacity (e.g., process 1) may take from 0.5 to 2.5 seconds, or in a particular implementation, 1.06 seconds and fading in the avatar to full opacity (e.g., process 9) may take from 0.2 to 2.0 seconds, or in a particular implementation, 0.4 seconds. In some embodiments of the second reappearance example transition, fading out the original avatar to no opacity (e.g., process 4) may take from 0.5 to 2.5 seconds, or in a particular implementation, 1.06 seconds and fading in the cloned avatar to full opacity (e.g., process 10) may take from 0.2 to 2.0 seconds, or in a particular implementation, 0.4 seconds. Though example predetermined durations of various effects are listed the duration of the various effects is not intended to be limited.

In some embodiments, the reappearance transition effect of the avatar is fully faded out and dematerialized, moved to the new location (by updating the coordinate frame), and then faded back in and rematerialized (e.g., reappearance example one). In some embodiments, the reappearance transition effect of the avatar is cloned, the clone is moved to the new location, while the original is left in the old location; the clone is faded in and materialized, while the original is simultaneously faded out and dematerialized (e.g., reappearance example two). An advantage of the second reappearance example may be that the transition may be only half as long as the first reappearance example, since materialization and dematerialization occur simultaneously. A disadvantage of the second reappearance example may be that the avatar needs to be duplicated and twice as many particle effects need to be spawned, which may unacceptably harm rendering performance. However, performance may be improved via instancing (e.g., geometry instancing based on coordinate data of the avatars) as described herein.

In some embodiments, the avatar fading effect may be implemented via alpha blending performed by the avatar engine 1720. Alpha is a factor that controls the transparency of a 3D object (e.g., a virtual avatar), where alpha=1 means the object is fully opaque (e.g., full opacity), and alpha=0 means it is fully transparent (e.g., no opacity). In embodiments in which the avatar is faded out, alpha may be changed from 1 to 0 over a duration of time (e.g., 1-2 seconds) using either linear or cubic Hermitian interpolation. The updated alpha value may then be sent to the graphics engine 1740 per frame, which in turn may render the avatar with alpha blending enabled. When alpha reaches 0, the avatar may be hidden, so that the avatar is no longer rendered. In embodiments in which fade-in of the avatar is implemented, the avatar fades in an analogous manner to how it fades out (e.g., alpha blending may be used, with alpha changing from 0 to 1 over a duration of time using either linear or cubic Hermitian interpolation, and the updated alpha value may then be sent to the graphics engine 1740 per frame so that the avatar may be visible).

In some embodiments, materialization and dematerialization effects may be implemented as animated particle effects. In embodiments in which the materialization effect is triggered, particles of light are spawned via the graphics engine 1740. The materialization effects then attract towards a triangle mesh approximating the outline of the avatar. As the particles land upon the mesh, they may come to rest and may eventually disappear. The dematerialization effect is the inverse of materialization. In embodiments in which the dematerialization effect is triggered, the particles are spawned via the graphics engine 1740 on the outline of the avatar, from which they fly out before eventually disappearing. Materialization and dematerialization effects may convey the idea that the avatar is being physically formed out of light and vice versa.

In some embodiments, when a MR user B becomes colocated with a MR user A, the coordinate frame of user B may change and become the same as the coordinate frame of MR user A. This implies that all the avatars and/or shared virtual content seen by MR user B is transformed so that all the avatars and/or shared virtual content seen by MR user B appears in the same location for both users. Moreover, the avatar of MR user B may be transformed for all other users in the MR session so that the avatar of MR user B appears in a consistent location for all other users in the MR session. This may also true for MR user A; even though MR user A may no longer see the avatar of MR user B (because of colocation), the avatar may need to be shown again if the MR users become decolocated. Therefore the hidden avatar of MR user B may be moved to the correct location on the side of MR user A.

In some embodiments, the difference between the coordinate frames of MR user A and B is expressed as a rigid 3D transformation (e.g., $T_{BA}=(t_{BA}, R_{BA})$, where $T_{BA}$ is the rigid 3D transformation of MR user B with MR user A, $t_{BA}$ is a 3D vector representing the translation, and $R_{BA}$ is a 3×3 matrix representing the rotation). In order for avatars to appear correctly for all users following the colocation of MR user B with MR user A, the inverse transformation (e.g., $T_{BA}^{-1}=(-t_{BA}, R_{BA}^{-1})$) is computed by the avatar engine 1720. Then the inverse transformation may be applied to all the avatars and content viewed by MR user B, as well as the avatar of MR user B viewed by other MR users in the MR session. As used herein, "transforming the avatar", relates to applying the inverse transformation to the avatar where the avatar transformation (e.g., $T_{BA}^{-1}$) is computed by the avatar engine 1720 when colocation of MR user B with MR user A occurs.

Other colocation change scenarios to consider that the audiovisual presence transitions and effects outlined herein take into account and that one skilled in the art will appreciate may include the following scenarios. Scenario one: MR users A and B are physically copresent and they start a collaborative session. The MR system cannot immediately establish colocation, so each MR user sees the avatar of the other user initially. Colocation is eventually established and the avatars for each MR user become hidden. Scenario two: MR users A and B are in a collaborative session. The MR users are remote, can see the avatar of each MR user in the session, but MR users A and B are located in neighboring rooms. MR user B walks over to the room of MR user A. The system establishes colocation and the avatar for each user becomes hidden. Scenario three: MR users A and B are colocated. MR user B leaves the room, but stays in the collaborative session. The MR system terminates colocation between the MR users A and B, so their avatars become shown. Scenario four: MR users A and B are physically copresent, but the MR system has failed to colocate them. The MR users manually mark each as colocated in the collaborative application. Each avatar for the MR users becomes hidden. Scenario five: remote MR users A, B, and C are collaborating. MR users A and B are in adjoining rooms. As in scenario two, M user B walks over to user A; the MR system determines that MR users A and B are now colocated. Since the coordinate frame of MR user B has changed, MR users B and C each observe their respective avatars disappear and reappear in a new location. Though these five colocation change scenarios have been identified, this is not intended to be limiting and as such the audiovisual transitions and effects may apply to numerous other colocation change scenarios.

Exemplary Colocation and Audiovisual Presence Transition Scenarios

FIGS. 18A-18G illustrate an example top-down view of audiovisual presence transition scenarios, where three remote MR users 1814A, 1824B, 1832C are collaborating and two of the three remote MR users 1814A, 1824B become colocated. Starting with FIG. 18A, MR user 1814A, MR user 1824B, and MR user 1832C are located in room 1810A, room 1810B, and room 1810C, respectively. Room 1810A and room 1810B are adjacent and there is a door 1813 between them. As will be discussed with reference to later figures, MR user 1824B will walk over to room 1810A and become colocated with MR user 1814A. MR user 1814A will then observe a disappearance transition of the avatar 1824A of user 1824B, whereas MR user 1832C observes a reappearance transition of the avatar 1824C of user 1824B. In some embodiments, the audiovisual presence of the MR users 1814A, 1824B, 1832C may be adjusted via their respective embodied collaboration MR system (e.g., head-mounted display MR system 210) such that the MR users 1814A, 1824B, 1832C can dynamically switch between being physically copresent or remote (e.g., a virtual avatar representation of a user). In some embodiments, the audiovisual presence transitions illustrated in FIGS. 18A-18G relate to the table that specifies and outlines the scenarios in which audiovisual transitions and effects occur via avatar engine 1720, as described herein.

A legend 1802 is illustrated in FIGS. 18A-18G to provide further clarity to the reader. For example, the legend 1802 indicates that any user in FIGS. 18A-18G without a dotted and/or dashed circular indicator is a real physical user in the MR session. Further, the legend 1802 indicates that a user with a dashed circle indicator around them is a virtual avatar representing a physical user in the MR session (e.g., a physical user 1814A in room 1810A is remote/isolated from room 1810B and room 1810C. Physical user 1814A is represented via virtual avatars 1814B, 1814C in room 1810B and room 1810C, respectively). Further still, the legend 1802 indicates a 16-point circular star which represents a disappearance transition of a virtual avatar and a 32-point circular star which represents a reappearance transition of a virtual avatar in the MR session.

Figure 18A:
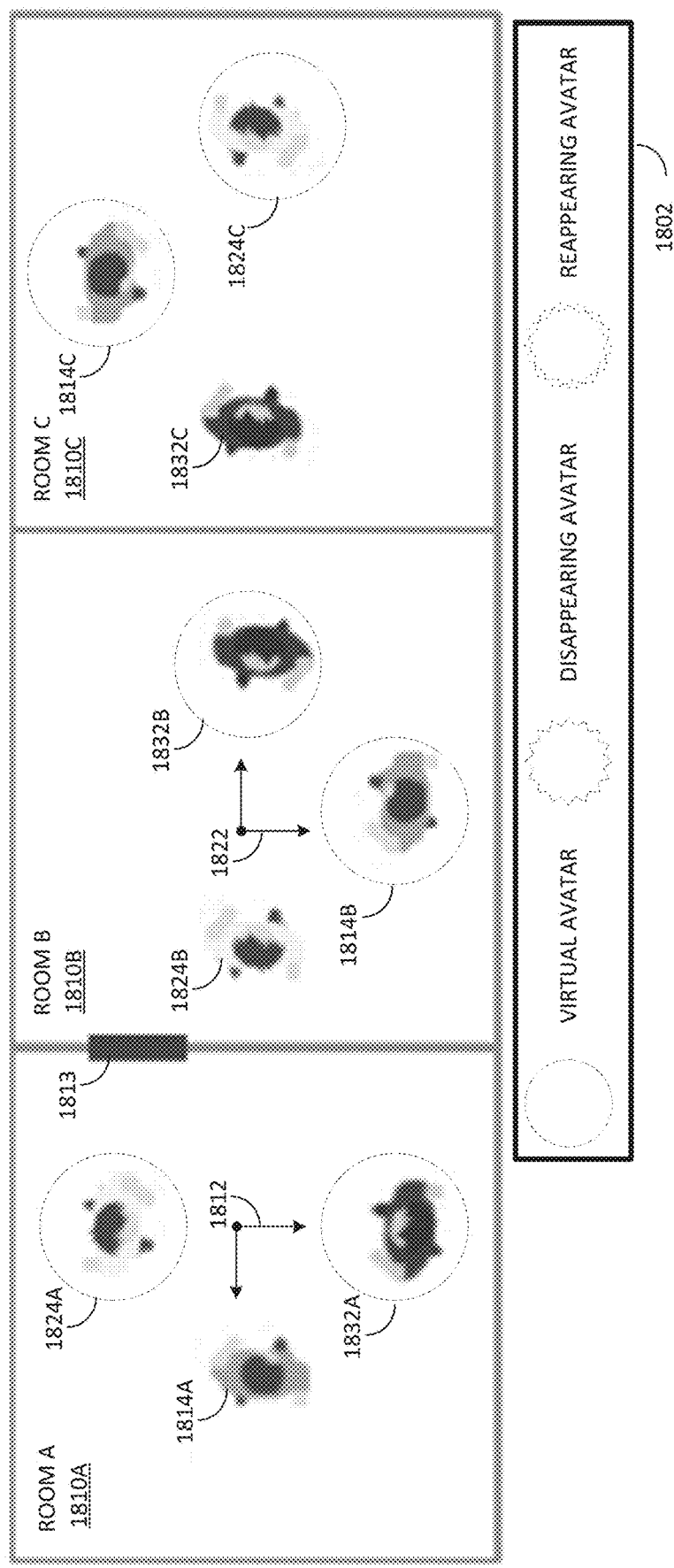
FIGS. 18A-G illustrate an example top down view of an audiovisual presence transition, where three remote users are collaborating and two of them become colocated, according to some embodiments.

Referring to FIG. 18A, the initial state of the scenario is such that the layout of physical users 1814A, 1824B, 1832C and the respective avatars in each room 1810, 1820, 1830 are relatively spatially consistent. For example, virtual and/or physical users B and C face each other in all three rooms 1810, 1820, 1830, and they are located to the left and right of virtual and/or physical user A, respectively. However, physical user 1824B is only physically present in room 1810B and is remotely represented as virtual avatars 1824A, 1824C in room 1810A and room 1810C, respectively. Physical user 1832C is only physically present in room 1810C and is remotely represented as virtual avatars 1832A, 1832B in room 1810A and room 1810B, respectively. Lastly, physical user 1814A is only physically present in room 1810A and is remotely represented as virtual avatars 1814B, 1814C in room 1810B and room 1810C, respectively. Moreover, the positions and orientations of user 1814A and user 1824B are indicated by coordinate frames 1812 (e.g., $CF_A$), 1822 (e.g., $CF_B$), respectively.

Figure 18B:
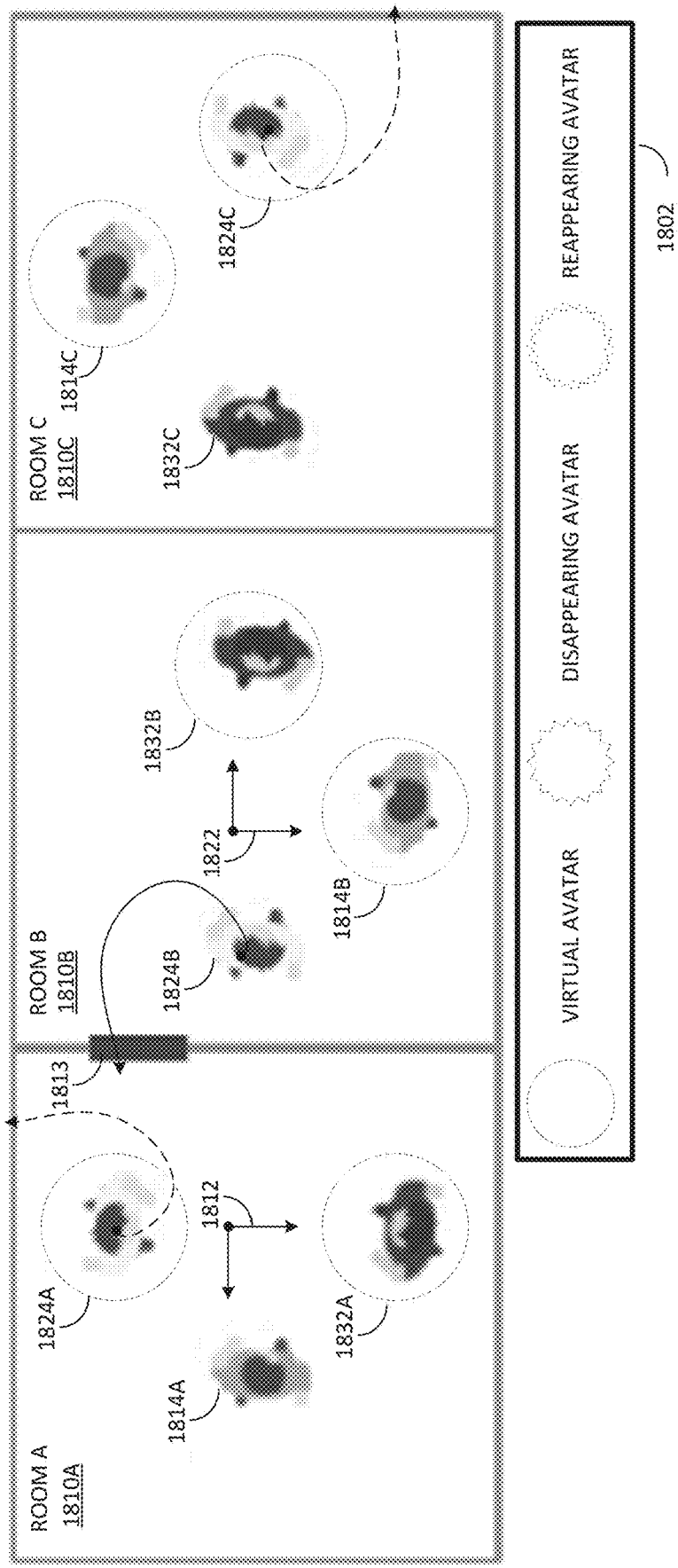

Referring to FIG. 18B, user 1824B begins walking from room 1810B through door 1813 and into room 1810A. User 1814A in room 1810 observes virtual avatar 1824A of user B seemingly walk into a wall of room 1810. User 1832C in room 1830 observes virtual avatar 1824C of user B seemingly walk into a wall of room 1810C. The virtual avatars 1824A, 1824C appear to seemingly walk into the walls of room 1810A and room 1810C, respectively as colocation has not been established yet.

Figure 18C:
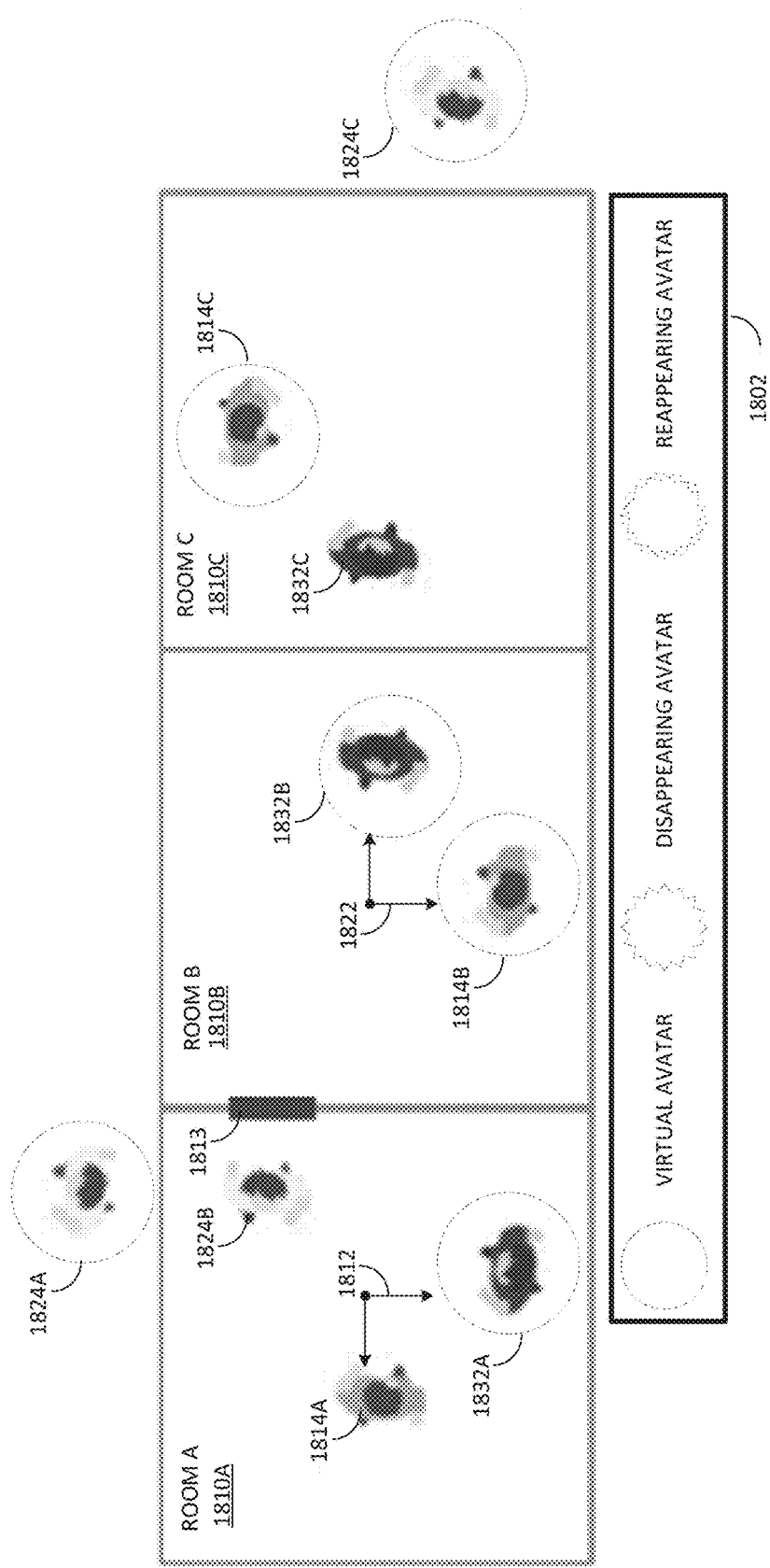

Referring to FIG. 18C, user 1824B arrives in room 1810A by walking through door 1813 from room 1810B and is now colocated with user 1814A. Virtual avatars 1824A and 1824C are illustrated in FIGS. 18C-F as appearing outside of the walls of rooms 810A and 1810C, respectively. However, this is not intended to be limited. In some embodiments, virtual avatars 1824A and 1824C are at, near and/or partially embedded into the walls inside of rooms 1810A and 1810C, respectively.

Figure 18D:
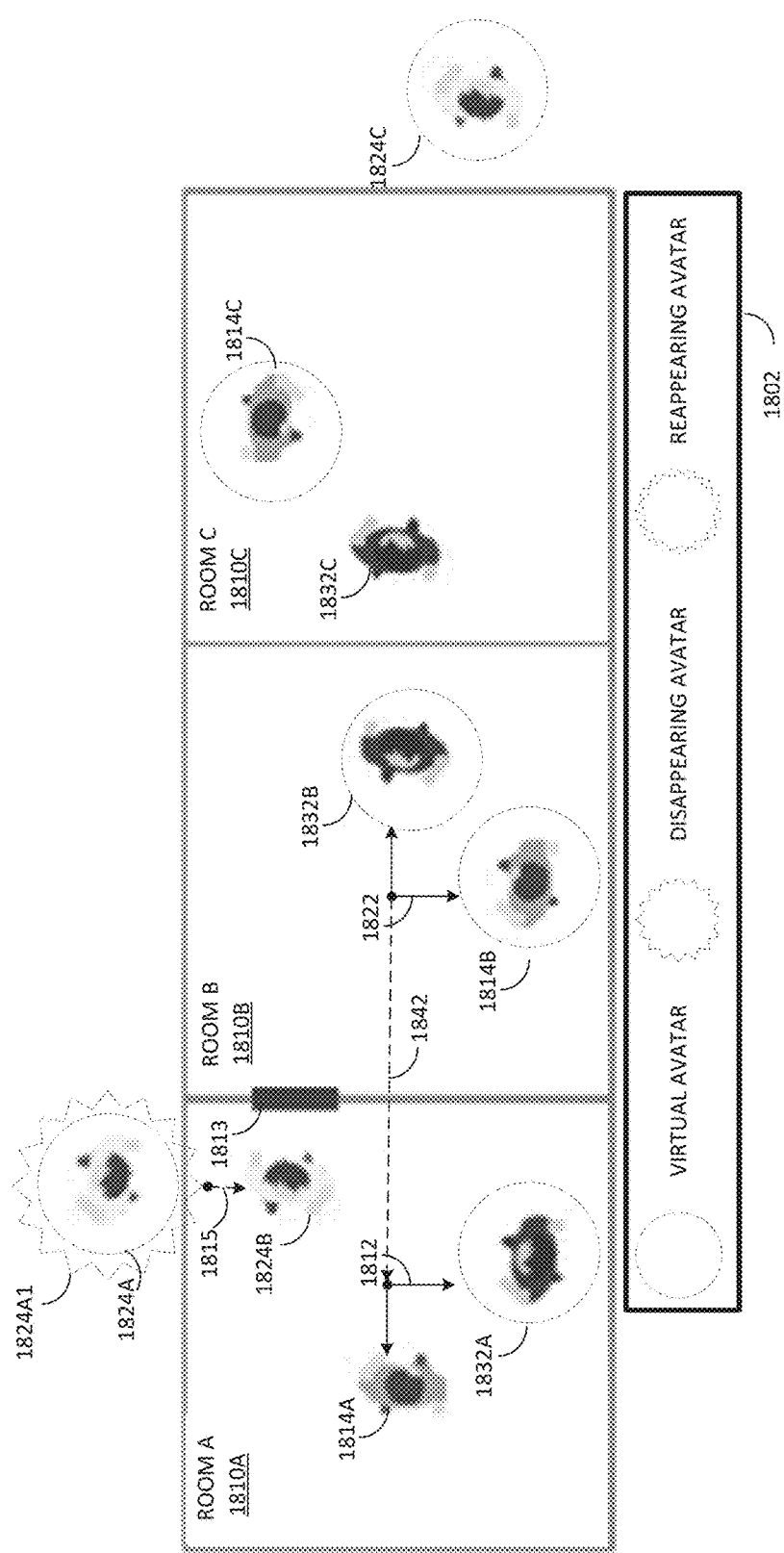

Referring to FIG. 18D, each MR system associated with each physical user 1814A, 1824B, 1832C determines that user 1824B has become colocated with user 1814A. The MR system of user 1824B receives a new coordinate frame from the MR system of user 1814A. For example, the avatar engine 1720 may compute the rigid transform 1842 $T_{BA}$ representing the difference between $CF_A$ 1812 and $CF_B$ 1822. User 1814A now observes a disappearance transition 1824A1 on the avatar 1824A of user B, which is appropriate, since user 1814A can now see physical user 1824B. The disappearance effects of the disappearance transition 1824A1 may include: muting the audio of user 1824B, fading out the avatar 1824A of user B (e.g., using alpha blending and transitioning from alpha=1 to alpha=0 over a duration of time), playing dematerialization particle effects on avatar 1824A of user B, playing dematerialization sound effects on avatar 1824A of user B, hiding avatar 1824A of user B, transforming 1815 the avatar 1824A of user B by $T_{BA}^{-1}$ to new location for the user 1824B in Room A 1810A, and/or other transition effects.

Figure 18E:
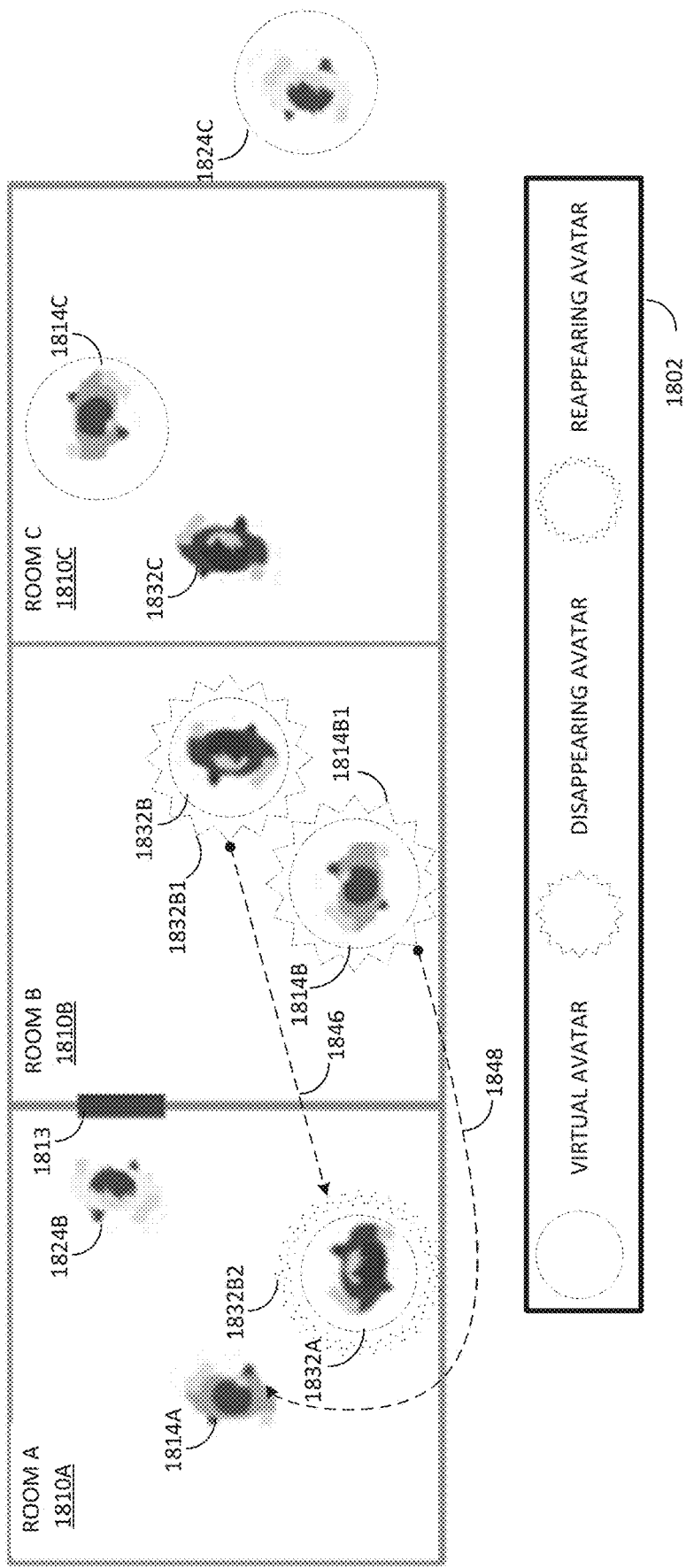

Referring to FIG. 18E, likewise, user 1824B observes a disappearance transition 1814B1 with disappearance effects on the avatar 1814B of user A. The disappearance effects of the disappearance transition 1814B1 may include: muting the audio of user 1814A, fading out the avatar 1814B of user A (e.g., using alpha blending and transitioning from alpha=1 to alpha=0 over a duration of time), playing dematerialization particle effects on avatar 1814B of user A, playing dematerialization sound effects on avatar 1814B of user A, hiding avatar 1814B of user A, transforming 1848 the avatar 1814B of user A by $T_{BA}^{-1}$ to new location of the user 1814A in Room A 1810A, and/or other transition effects. Moreover, since the coordinate frame of user 1824B is changing, a reappearance transition 1832B2 is applied to the avatar 1832B of user C.

In some embodiments, the reappearance effects of the reappearance transition 1832B2 may include: at least part of a disappearance transition 1832B1 (e.g., fading out avatar 1832B of user C (e.g., using alpha blending and transitioning from alpha=1 to alpha=0), playing dematerialization particle effects on avatar 1832B of user C, playing dematerialization sound effects on avatar 1832B of user C, hiding the avatar 1832B of user C, transforming 1846 the avatar 1832B of user C by TBA-1 to the new location of the avatar 1832A, respectively), showing the avatar 1832B of user C (e.g., starting at alpha=0), playing materialization particle effects on avatar 1832B of user C, playing materialization sound effects on avatar 1832B of user C, fading in avatar 1832B of user C (e.g., using alpha blending and transitioning from alpha=0 to alpha=1 over a duration of time), and/or other transition effects.

In some embodiments, the reappearance effects of the reappearance transition 1832B2 may include: cloning the avatar 1832B of user C, hiding the cloned avatar, transforming 1846 the cloned avatar 1832A to the new location in Room A 1810A, fading out the original avatar 1832B of user C (e.g., using alpha blending and transitioning from alpha=1 to alpha=0 over a duration of time), playing dematerialization particle effects on the original avatar 1832B of user C, playing dematerialization sound effects on the original avatar 1832B of user C, showing the cloned avatar (e.g., starting at alpha=0), playing materialization particle effects on the cloned avatar, playing materialization sound effects on the cloned avatar, fading in the cloned avatar (e.g., using alpha blending and transitioning from alpha=0 to alpha=1 over a duration of time), destroying the original avatar 1832B of user C, and/or other transition effects.

Figure 18F:
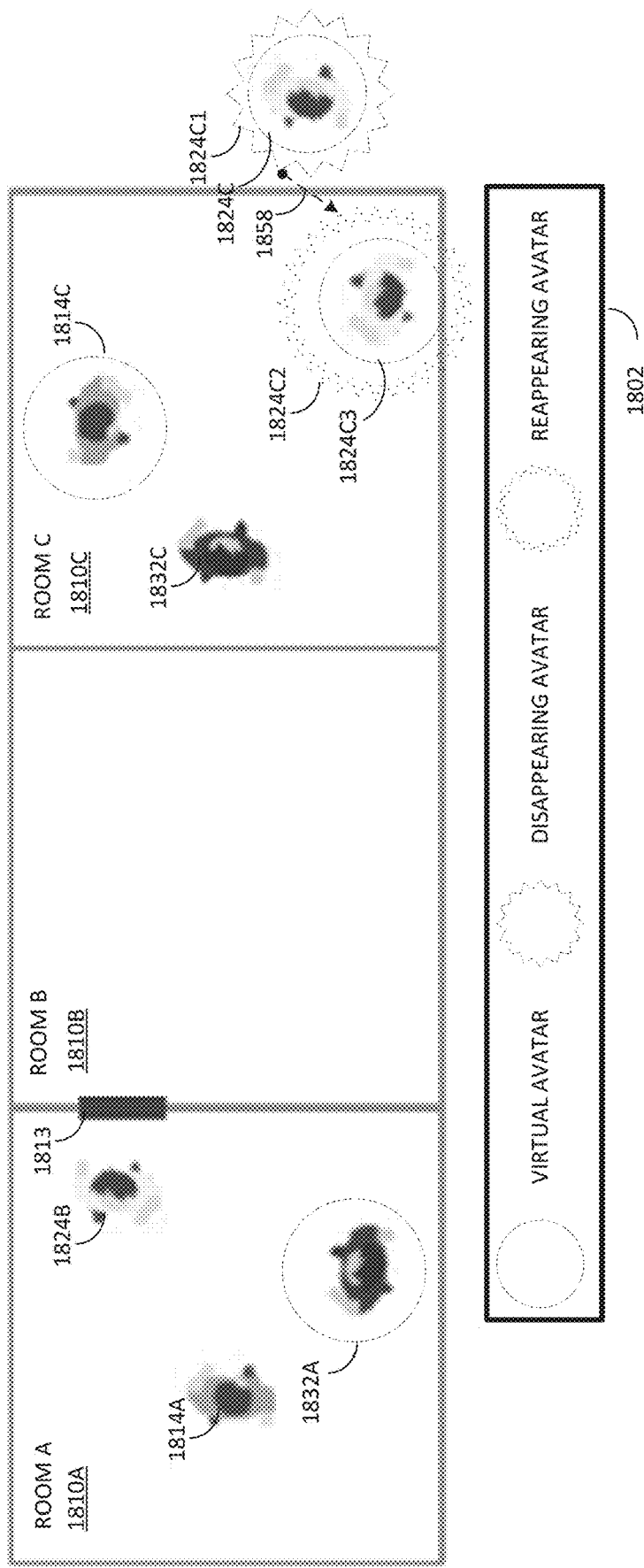

Referring to FIG. 18F, user 1832C observes a reappearance transition 1824C2 applied to avatar 1824C of user B. The reappearance 1824C2 of the avatar 1824C of user B occurs at a location of the user 1824C3 in room 1810C to maintain the same relative spatial consistency as room 1810A. As expected, the avatar 1814C of user A remains unaffected.

In some embodiments, the reappearance effects of the reappearance transition 1824C2 may include: at least part of a disappearance transition 1824C1 (e.g., fading out avatar 1824C of user B (e.g., using alpha blending and transitioning from alpha=1 to alpha=0 over a duration of time), playing dematerialization particle effects on avatar 1824C of user B, playing dematerialization sound effects on avatar 1824C of user B, hiding the avatar 1824C of user B, and transforming 1858 the avatar 1824C of user B by $T_{BA}^{-1}$ to the new location of the user 1824C3 in Room C 1810C, respectively), showing the avatar 1832B of user C (e.g., starting at alpha=0), playing materialization particle effects on avatar 1832B of user C, playing materialization sound effects on avatar 1832B of user C, fading in avatar 1832B of user C (e.g., using alpha blending and transitioning from alpha=0 to alpha=1 over a duration of time), and/or other transition effects.

In some embodiments, the reappearance effects of the reappearance transition 1824C2 may include: cloning the avatar 1824C of user B, hiding the cloned avatar, transforming 1858 the cloned avatar to the new location of the user 1824C3 in Room C 1810C, fading out the original avatar 1824C of user B (e.g., using alpha blending and transitioning from alpha=1 to alpha=0 over a duration of time), playing dematerialization particle effects on the original avatar 1824C of user B, playing dematerialization sound effects on the original avatar 1824C of user B, showing the cloned avatar (e.g., starting at alpha=0), playing materialization particle effects on the cloned avatar, playing materialization sound effects on the cloned avatar, fading in the cloned avatar (e.g., using alpha blending and transitioning from alpha=0 to alpha=1 over a duration of time), destroying the original avatar 1824C of user B, and/or other transition effects.

Figure 18G:
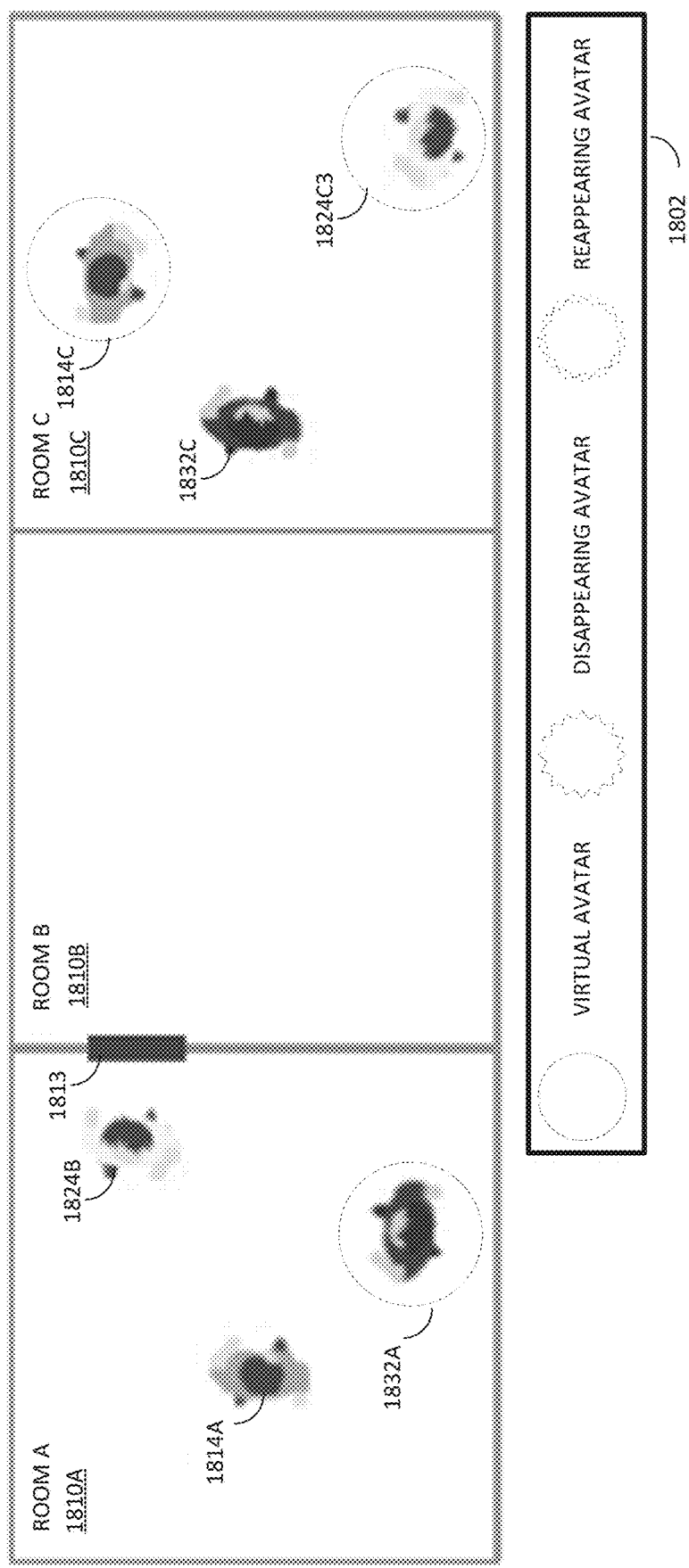

Referring to FIG. 18G, the final state of the MR session is illustrated wherein absolute spatial consistency is achieved in room 1810A which includes: copresent MR user 1824B, copresent MR user 1814A, and avatar 1832A representing remote user 1832C; and relative spatial consistency is achieved in room 1810C which includes: MR user 1832C, avatar 1814C representing remote user 1814A and avatar 1824C3 representing remote user 1824B.

Exemplary Colocation and Audiovisual Presence Transition Process

Figure 19:
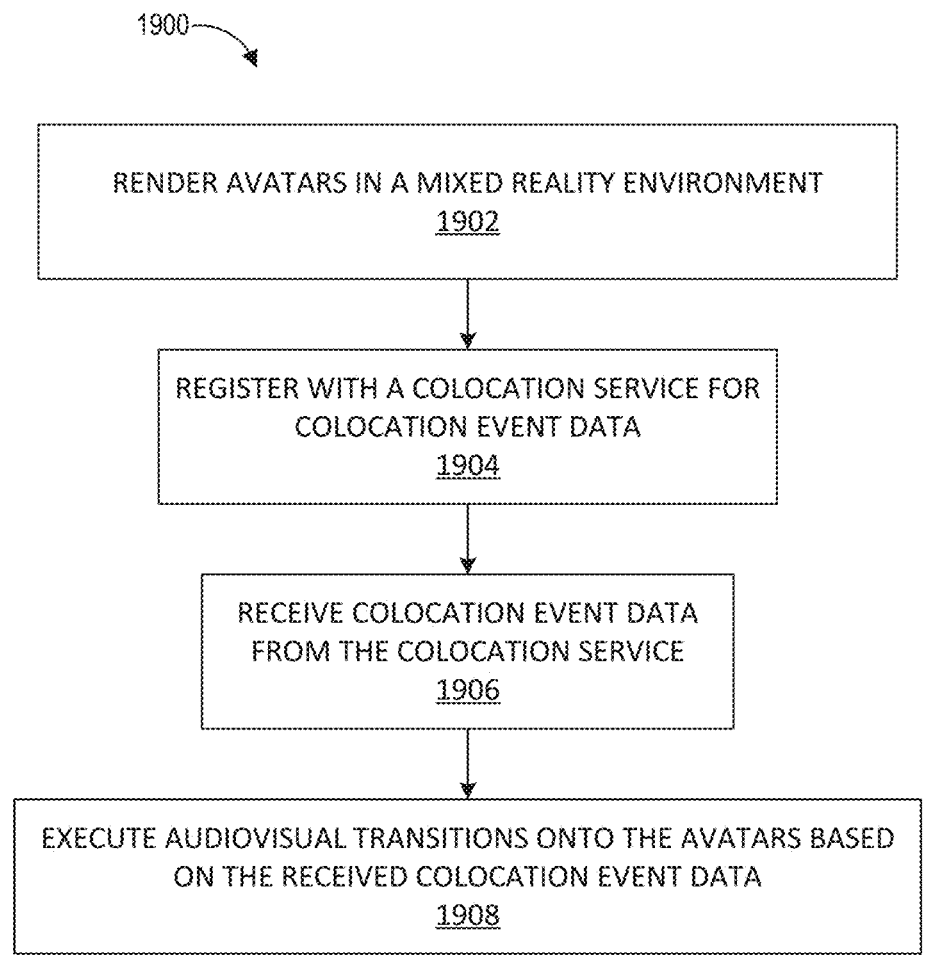
FIG. 19 illustrates an example flow chart of the colocation and audiovisual transition process.

FIG. 19 illustrates an example flow chart 1900 of the colocation and audiovisual transition process. Starting at block 1902 one or more virtual avatars representing one or more remote MR users are rendered in a mixed reality environment of a physical MR user (e.g., physical MR user 1814A and virtual avatars 1824A, 1832A in room 1810A as described with reference to FIG. 18A). At block 1904 the MR systems (e.g., MR system 210) of the physical and remote users register with a colocation service (e.g., colocation service 1730) to detect colocation event data. At block 1906 the MR systems receive colocation event data from the colocation service. At block 1908 audiovisual transitions (e.g., audiovisual presence transitions illustrated in FIGS. 18A-18G that relate to the table that specifies and outlines the scenarios in which audiovisual transitions and effects occur via avatar engine 1720) are executed onto the one or more virtual avatars based on the received colocation event data (e.g., copresence states of the MR users) from the colocation service.

EXAMPLE IMPLEMENTATIONS

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A computerized method, performed by a computing device having one or more hardware computer processors and one or more non-transitory computer readable storage device storing software instructions executable by the computing system to perform the computerized method comprising: display, on a display of the computing device of a first user in a first environment, a second avatar of a second user in a second environment, wherein the first and second environments are part of a shared collaboration environment; register with a colocation service for colocation event data indicative of when the first user and second user are colocated; in response to receiving colocation event data indicating that the first user and second user are colocated, initiating one or more audiovisual transitions to the second avatar including at least fading of the second avatar.

Example Two: The computerized method of Example One, further comprising: in response to receiving colocation event data indicating that the first user and second user are colocated, updating a second coordinate frame of the second user to match a first coordinate frame of the first user.

Example Three: The computerized method of Example One, further comprising: causing display on a second computing device of the second user fading of a first avatar of the first user.

Example Four: The computerized method of Example Two, further comprising: causing display on a third computing device of a third user that is not colocated with the first and second user, disappearance of the first avatar and reappearance of the first avatar at an updated location according to the updated coordinate frame.

Example Five: The computerized method of Example Four, wherein the disappearance and reappearance comprises: fading out to no opacity the first avatar; rendering a dematerialization particle effect onto the first avatar; rendering a dematerialization sound effect for the first avatar; hiding the first avatar; transforming the first avatar to the updated location; displaying the first avatar at the updated location; rendering a materialization particle effect onto the first avatar; rendering a materialization sound effect for the first avatar; and fading into full opacity the displayed first avatar at the updated location.

Example Six: The computerized method of Example Four, wherein the disappearance and reappearance transition comprises: cloning the first avatar; hiding the cloned avatar; transforming the cloned avatar to the new location; fading out to no opacity the first avatar; rendering a dematerialization particle effect on to the first avatar; rendering a dematerialization sound effect for the first avatar; displaying the cloned avatar; rendering a materialization particle effect onto the cloned avatar; rendering a materialization sound effect for the cloned avatar; fading into full opacity the displayed cloned avatar; and destroying the first avatar.

Example Seven: The computerized method of Example One, wherein the colocation event data indicates that the first and second user are colocated based on a determination that the first and second user are physically positioned within a same room.

Example Eight: The computerized method of Example One, wherein the colocation event data indicates that the first and second user are colocated based on a determination that the first and second user are physically positioned within a threshold distance from one another.

Example Nine: The computerized method of Example One, wherein the one or more audiovisual transitions further comprises fading of audio from the second user playing on the computing device.

Example Ten: The computerized method of Example One, further comprising: in response to receiving colocation event data indicating that the first user and second user are no longer colocated, initiating one or more audiovisual transitions to cause the second avatar to reappear on the display of the computing device.

Example Eleven: A method, performed by a computing system having one or more hardware computer processors and one or more non-transitory computer readable storage devices storing software instructions executable by the computing system to: render one or more avatars in a mixed reality environment; register with a colocation service for colocation event data; receive colocation event data from the colocation service; and execute one or more audiovisual transitions onto the one or more avatars based on the received colocation event data.

Example Twelve: The method of Example Eleven, wherein a collaborative application initializes the computing system and the one or more avatars in the mixed reality environment.

Example Thirteen: The method of Example Twelve, wherein the colocation event data is determined from a first user manually flagging a second user as colocated in the collaborative application.

Example Fourteen: The method of Example Thirteen, wherein the collaborative application sends a notification of the colocation event data to the computing system.

Example Fifteen: The method of Example Thirteen, wherein the manual flagging occurs via image registration and a fiducial marker.

Example Sixteen: The method of Example Eleven, wherein the one or more audiovisual transitions use alpha blending to fade the one or more avatars.

Example Seventeen: The method of Example Sixteen, wherein the one or more avatars fade in to full opacity.

Example Eighteen: The method of Example Sixteen, wherein the one or more avatars fade out to no opacity.

Example Nineteen: The method of Example Eleven, wherein the computing system renders particles effects for the one or more audiovisual transitions.

Example Twenty: The method of Example Eleven, wherein the computing system renders sound effects for the one or more audiovisual transitions.

Example Twenty One: The method of Example Eleven, wherein the one or more audiovisual transitions is a reappearance transition.

Example: Twenty Two: The method of Example Twenty One, wherein the reappearance transition comprises: fading out to no opacity an avatar representing a user in the mixed reality environment; rendering a dematerialization particle effect on to the avatar; rendering a dematerialization sound effect for the avatar; hiding the avatar; transforming the avatar to a new location in the mixed reality environment; displaying the avatar at the new location; rendering a materialization particle effect on to the avatar; rendering a materialization sound effect for the avatar; and fading in to full opacity the displayed avatar.

Example Twenty Three: The method of Example Twenty One, wherein the reappearance transition comprises: cloning an avatar representing a user in the mixed reality environment; hiding the cloned avatar; transforming the cloned avatar to a new location in the mixed reality environment; fading out to no opacity the avatar; rendering a dematerialization particle effect on to the avatar; rendering a dematerialization sound effect for the avatar; displaying the cloned avatar; rendering a materialization particle effect on to the cloned avatar; rendering a materialization sound effect for the cloned avatar; fading in to full opacity the displayed cloned avatar; and destroying the avatar.

Example Twenty Four: The method of Example Eleven, wherein the one or more audiovisual transitions is a disappearance transition.

Example Twenty Five: The method of Example Twenty Four, wherein the disappearance transition comprises: muting audio from the computing system of a user in a mixed reality session; fading out to no opacity an avatar representing the user in the mixed reality session; rendering a dematerialization particle effect on to the avatar; rendering a dematerialization sound effect for the avatar; hiding the avatar; and transforming the avatar to a new location in the mixed reality environment.

Example Twenty Six: The method of Example Eleven, wherein the one or more audiovisual transitions is an appearance transition.

Example Twenty Seven: The method of Example Twenty Six, wherein the appearance transition comprises: displaying an avatar representing a user in a mixed reality session; unmuting audio from the computing system of the user; rendering a materialization particle effect on to the avatar; rendering a materialization sound effect for the avatar; and fading into full opacity the displayed avatar.

Example Twenty Eight: A computing system comprising: one or more hardware computer processors; one or more non-transitory computer readable storage devices storing software instructions executable by the computing system to: render one or more virtual avatars in a mixed reality environment; register with a colocation service for colocation event data; receive colocation event data from the colocation service; and execute one or more audiovisual transitions onto the one or more virtual avatars based on the received colocation event data.

Example Twenty Nine: The computing system Example Twenty Eight, wherein the computing system further comprises a graphics engine configured to alpha blend.

Example Thirty: The computing system of Example Twenty Nine, wherein the graphics engine is configured to fade the one or more virtual avatars.

Example Thirty One: The computing system of Example Twenty Nine, wherein the graphics engine is configured to render particle effects for the one or more audiovisual transitions.

Example Thirty Two: The computing system of Example Twenty Eight, wherein the computing system further comprises an audio rendering service configured to either mute or unmute user audio.

Example Thirty Three: The computing system of Example Thirty Two, wherein the audio rendering service is configured to render sound effects for the one or more audiovisual transitions.

As noted herein, implementations of the described examples provided herein may include hardware, a method or process, and/or computer software on a computer-accessible medium.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the mentioned processors, and/or devices incorporating any of the mentioned processors, may be referred to herein as, for example, "computers," "computer devices," "computing devices," "hardware computing devices," "hardware processors," "processing units," and/or the like. Computing devices of the embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described herein, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

Many variations and modifications may be made to the described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed herein could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

While the detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments described herein may be embodied within a form that does not provide all of the features and benefits set forth herein, as some features may be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer device, comprising:
   one or more processors; and
   one or more non-transitory computer readable storage devices coupled to the one or more processors and storing programming instructions executable by the computer device to:
   display, on a display of the computing device of a first user in a first mixed reality environment, a second avatar of a second user in a second mixed reality environment, wherein the first mixed reality environment and the second mixed reality environment are part of a shared collaboration environment, and wherein the first user and the second user are remotely located from each other, being in separate rooms of a physical environment;
   register with a colocation service for colocation event data indicative of when the first user and the second user become colocated in either the first mixed reality environment or the second mixed reality environment; and
   in response to receiving colocation event data indicating that the first user and the second user are colocated, initiate one or more audiovisual transitions to the second avatar.

2. The computer device of claim 1, wherein the programming instructions are executable by the computer device to:
   in response to receiving colocation event data indicating that the first user and the second user are colocated, update, as an updated coordinate frame, a second coordinate frame of the second user to match a first coordinate frame of the first user.

3. The computer device of claim 2, wherein the programming instructions are executable by the computer device to:
   cause display on a second computing device of the second user fading of a first avatar of the first user.

4. The computer device of claim 3, wherein the programming instructions are executable by the computer device to:
   cause display on a third computing device of a third user that is not colocated with the first user and the second user, disappearance of the first avatar and reappearance of the first avatar at an updated location according to the updated coordinate frame.

5. The computer device of claim 4, wherein the disappearance and reappearance comprise one or more of:
   fading out to no opacity the first avatar;
   rendering a dematerialization particle effect onto the first avatar;
   rendering a dematerialization sound effect for the first avatar;
   hiding the first avatar;
   transforming the first avatar to the updated location;
   displaying, as a displayed first avatar, the first avatar at the updated location;
   rendering a materialization particle effect onto the first avatar;
   rendering a materialization sound effect for the first avatar; or
   fading into full opacity the displayed first avatar at the updated location.

6. The computer device of claim 4, wherein the disappearance and reappearance transition comprise one or more of:
   cloning, as a cloned avatar, the first avatar;
   hiding the cloned avatar;
   transforming the cloned avatar to the updated location;
   fading out to no opacity the first avatar;
   rendering a dematerialization particle effect on to the first avatar;
   rendering a dematerialization sound effect for the first avatar;
   displaying, as a displayed cloned avatar, the cloned avatar;
   rendering a materialization particle effect onto the cloned avatar;
   rendering a materialization sound effect for the cloned avatar;
   fading into full opacity the displayed cloned avatar; or
   destroying the first avatar.

7. The computer device of claim 1, wherein the colocation event data indicates that the first and the second user are colocated based on a determination that the first and the second user are physically positioned within a same room.

8. The computer device of claim 1, wherein the colocation event data indicates that the first user and the second user are colocated based on a determination that the first user and the second user are physically positioned within a threshold distance from one another.

9. The computer device of claim 1, wherein the one or more audiovisual transitions further comprises fading of audio from the second user playing on the computing device.

10. The computer device of claim 1, wherein the programming instructions are executable by the computer device to:
in response to receiving colocation event data indicating that the first user and the second user are no longer colocated, initiate one or more audiovisual transitions to cause the second avatar to reappear on the display of the computing device.

11. A computer system, comprising:
one or more processors; and
one or more non-transitory computer readable storage devices coupled to the one or more processors and storing programming instructions executable by the computing system to:
render one or more avatars in a mixed reality environment, wherein the one or more avatars represent one or more users in one or more mixed reality environments, respectively, of a shared collaboration environment, and wherein the one or more users are remotely located from each other, being in separate rooms of a physical environment;
register with a colocation service for colocation event data;
receive, as received colocation event data, colocation event data from the colocation service; and
execute one or more audiovisual transitions onto the one or more avatars based on the received colocation event data.

12. The computer system of claim 11, wherein a collaborative application initializes the computing system and the one or more avatars in the mixed reality environment.

13. The computer system of claim 12, wherein the colocation event data is determined from a first user manually flagging a second user as colocated in the collaborative application.

14. The computer system of claim 13, wherein the collaborative application sends a notification of the colocation event data to the computing system.

15. The computer system of claim 13, wherein manually flagging occurs via image registration and a fiducial marker.

16. The computer system of claim 11, wherein the one or more audiovisual transitions comprise software instructions executable by the computing system to generate a fade of the one or more avatars by using alpha blending.

17. The computer system of claim 16, wherein the fade is into full opacity.

18. The computer system of claim 16, wherein the fade is out to no opacity.

19. The computer system of claim 11, wherein the computing system renders particles effects for the one or more audiovisual transitions.

20. The computer system of claim 11, wherein the computing system renders sound effects for the one or more audiovisual transitions.

21. One or more non-transitory computer readable storage devices storing programming instructions executable by a computing device to:
display, on a display of the computing device of a first user in a first mixed reality environment, a second avatar of a second user in a second mixed reality environment, wherein the first mixed reality environment and the second mixed reality environment are part of a shared collaboration environment, and wherein the first user and the second user are remotely located from each other, being in separate rooms of a physical environment;
register with a colocation service for colocation event data indicative of when the first user and the second user become collocated in either the first mixed reality environment or the second mixed reality environment; and
in response to receiving colocation event data indicating that the first user and the second user are colocated, initiate one or more audiovisual transitions to the second avatar.

22. The one or more non-transitory computer readable storage devices of claim 21, wherein the programming instructions are executable by the computing device to:
in response to receiving colocation event data indicating that the first user and the second user are colocated, updating, as an updated coordinate frame, a second coordinate frame of the second user to match a first coordinate frame of the first user.

23. The one or more non-transitory computer readable storage devices of claim 22, wherein the programming instructions are executable by the computing device to:
cause display on a second computing device of the second user fading of a first avatar of the first user.

24. The one or more non-transitory computer readable storage devices of claim 23, wherein the programming instructions are executable by the computing device to:
cause display on a third computing device of a third user that is not colocated with the first user and the second user, disappearance of the first avatar and reappearance of the first avatar at an updated location according to the updated coordinate frame.

25. The one or more non-transitory computer readable storage devices of claim 24, wherein the disappearance and reappearance comprise one or more of:
fading out to no opacity the first avatar;
rendering a dematerialization particle effect onto the first avatar;
rendering a dematerialization sound effect for the first avatar;
hiding the first avatar;
transforming the first avatar to the updated location;
displaying, as a displayed first avatar, the first avatar at the updated location;
rendering a materialization particle effect onto the first avatar;
rendering a materialization sound effect for the first avatar; or
fading into full opacity the displayed first avatar at the updated location.

26. The one or more non-transitory computer readable storage devices of claim 24, wherein the disappearance and reappearance transition comprise one or more of:
cloning, as a cloned avatar, the first avatar;
hiding the cloned avatar;
transforming the cloned avatar to the updated location;
fading out to no opacity the first avatar;
rendering a dematerialization particle effect on to the first avatar;
rendering a dematerialization sound effect for the first avatar;
displaying, as a displayed cloned avatar, the cloned avatar;
rendering a materialization particle effect onto the cloned avatar;
rendering a materialization sound effect for the cloned avatar;
fading into full opacity the displayed cloned avatar; or
destroying the first avatar.

27. The one or more non-transitory computer readable storage devices of claim 21, wherein the colocation event data indicates that the first and the second user are colocated based on a determination that the first and the second user are physically positioned within a same room.

28. The one or more non-transitory computer readable storage devices of claim 21, wherein the colocation event data indicates that the first user and the second user are colocated based on a determination that the first user and the second user are physically positioned within a threshold distance from one another.

29. The one or more non-transitory computer readable storage devices of claim 21, wherein the one or more audiovisual transitions further comprise fading of audio from the second user playing on the computing device.

30. The one or more non-transitory computer readable storage devices of claim 21, wherein the programming instructions are executable by the computing device to:
in response to receiving colocation event data indicating that the first user and the second user are no longer colocated, initiate one or more audiovisual transitions to cause the second avatar to reappear on the display of the computing device.

31. One or more non-transitory computer readable storage devices storing programming instructions executable by a computing system to:
render one or more avatars in a mixed reality environment, wherein the one or more avatars represent one or more users in one or more mixed reality environments, respectively, of a shared collaboration environment, and wherein the one or more users are remotely located from each other, being in separate rooms of a physical environment;
register with a colocation service for colocation event data;
receive, as received colocation event data, colocation event data from the colocation service; and
execute one or more audiovisual transitions onto the one or more avatars based on the received colocation event data.

32. The one or more non-transitory computer readable storage devices of claim 31, wherein a collaborative application initializes the computing system and the one or more avatars in the mixed reality environment.

33. The one or more non-transitory computer readable storage devices of claim 32, wherein the colocation event data is determined from a first user manually flagging a second user as colocated in the collaborative application.

34. The one or more non-transitory computer readable storage devices of claim 33, wherein the collaborative application sends a notification of the colocation event data to the computing system.

35. The one or more non-transitory computer readable storage devices of claim 33, wherein manually flagging occurs via image registration and a fiducial marker.

36. The one or more non-transitory computer readable storage devices of claim 31, wherein the one or more audiovisual transitions comprise software instructions executable by the computing system to generate a fade of the one or more avatars by using alpha blending.

37. The one or more non-transitory computer readable storage devices of claim 36, wherein the fade is into full opacity.

38. The one or more non-transitory computer readable storage devices of claim 36, wherein the fade is out to no opacity.

39. The one or more non-transitory computer readable storage devices of claim 31, wherein the computing system renders particles effects for the one or more audiovisual transitions.

40. The one or more non-transitory computer readable storage devices of claim 31, wherein the computing system renders sound effects for the one or more audiovisual transitions.

* * * * *